US007908634B2

(12) United States Patent
Keady et al.

(10) Patent No.: US 7,908,634 B2
(45) Date of Patent: Mar. 15, 2011

(54) HIGH-SPEED CABLE WITH EMBEDDED POWER CONTROL

(75) Inventors: Aidan Gerard Keady, Celbridge (IE);
John Anthony Keane, Douglas (IE);
Judith Ann Rea, Rochestown (IE);
Benjamin Griffin, Midleton (IE); John Martin Horan, Blackrock (IE)

(73) Assignee: Redmere Technology Ltd., Balbriggan, co. Dublin (IE)

( * ) Notice: Subject to any disclaimer, the term of this patent is extended or adjusted under 35 U.S.C. 154(b) by 0 days.

(21) Appl. No.: 12/461,046

(22) Filed: Jul. 30, 2009

(65) Prior Publication Data

US 2009/0289681 A1    Nov. 26, 2009

Related U.S. Application Data

(63) Continuation-in-part of application No. 11/826,713, filed on Jul. 18, 2007, now Pat. No. 7,861,277.

(60) Provisional application No. 60/856,032, filed on Nov. 2, 2006, provisional application No. 60/858,353, filed on Nov. 13, 2006.

(51) Int. Cl.
  *H04N 7/173* (2006.01)
(52) U.S. Cl. ......... 725/127; 725/118; 725/128; 327/530
(58) Field of Classification Search .................. 327/530; 725/118, 127, 128
  See application file for complete search history.

(56) References Cited

U.S. PATENT DOCUMENTS

| 6,393,110 | B1 | 5/2002 | Price |
| 7,565,530 | B2 | 7/2009 | Kwak |
| 7,680,840 | B2 | 3/2010 | Jung |
| 7,706,692 | B2 | 4/2010 | Tatum |
| 2002/0143485 | A1 | 10/2002 | Chen |
| 2002/0159548 | A1* | 10/2002 | Evans et al. ............... 375/346 |
| 2004/0081232 | A1* | 4/2004 | Scott et al. ............... 375/220 |
| 2004/0161070 | A1 | 8/2004 | Yin |
| 2005/0073608 | A1 | 4/2005 | Stone |
| 2005/0132087 | A1 | 6/2005 | Glinski |
| 2007/0164802 | A1* | 7/2007 | Rea et al. ............... 327/266 |
| 2007/0206643 | A1* | 9/2007 | Egan et al. ............... 370/479 |
| 2007/0291938 | A1* | 12/2007 | Rao et al. ............... 380/210 |

OTHER PUBLICATIONS

Long Reach™, www.gennum.com/ip/pdffiles/gs8101.pdf, Product description from Gennum Corporation, p. 1-2, 2006.
HDMI Super Booster, http://wvvw.gefen.com/pdf/EXT-HDMI-141SB.pdf, the manual for the standalone HDMI "super booster" from Gefen Inc., 2006.
An advertisement for a cable with an integrated HDMI "super booster" from Gefen Inc., http://www.gefen.com/kvm/cables/hdmicables.jsp#hdmisb, 2006.

(Continued)

*Primary Examiner* — Lincoln Donovan
*Assistant Examiner* — Ryan C Jager
(74) *Attorney, Agent, or Firm* — IP-MEX Inc.; Victoria Donnelly

(57) ABSTRACT

A High-Definition Multimedia Interface (HDMI) cable carries high speed encoded data which are transmitted differentially over data channels, along with a clock. High-frequency loss and differential skew within a differential signal may be compensated by analog circuits embedded in the cable. These embedded circuits are tuned at production for best performance by observing the quality of the recovered analog signal. The embedded circuits are powered by a combination of power sources, both carried within the cable, and harvested from the high-speed signals themselves.

20 Claims, 40 Drawing Sheets

OTHER PUBLICATIONS

Favrat et al, "A High-Efficiency CMOS Voltage Doubler", IEEE J. Solid State Circuits, vol. 33, No. 3, pp. 410-416, Mar. 1998.

A. Rezayee and K. Martin "A 10-Gb/s Clock Recovery Circuit with Linear Phase Detector and Coupled Two-stage Ring Oscillator", SSCIRC, Italy, 2002, p. 419-422.

HDMI Specification, www.hdmi.org/manufacturer/specification.asp, version 1.3, Jun. 22, 2006.

TDK Semiconductor Corp.,"78P2341JAT E3/DS3/STS-1 LIU with Jitter Attenuator", http:/datasheet.digchip.com/471/471-391-0-78P2341JAT.pdf Aug. 2003.

Razavi, Behzad "Design of analog CMOS Integrated Circuits", published by McGraw-Hill, New York, 2001.

\* cited by examiner

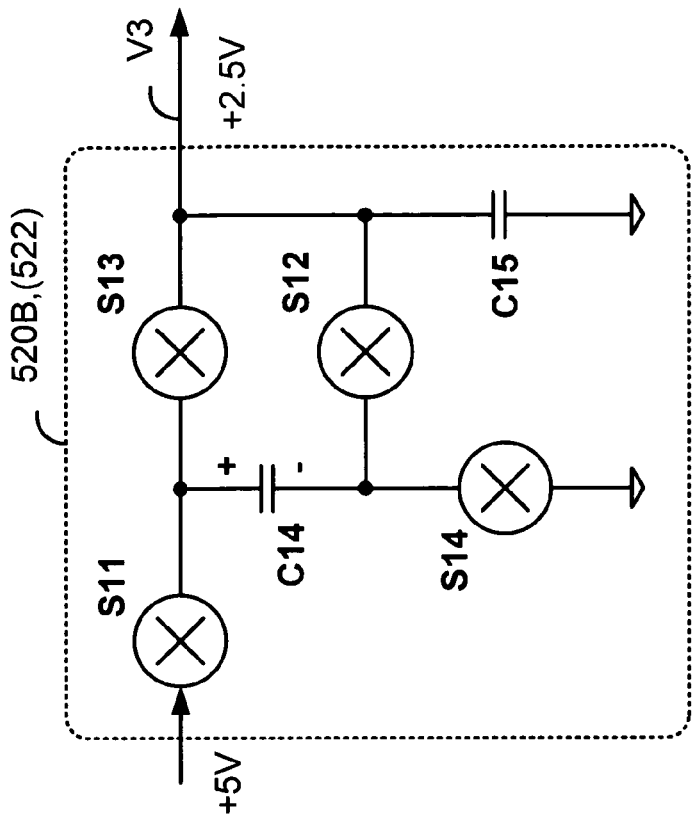
FIG. 27C
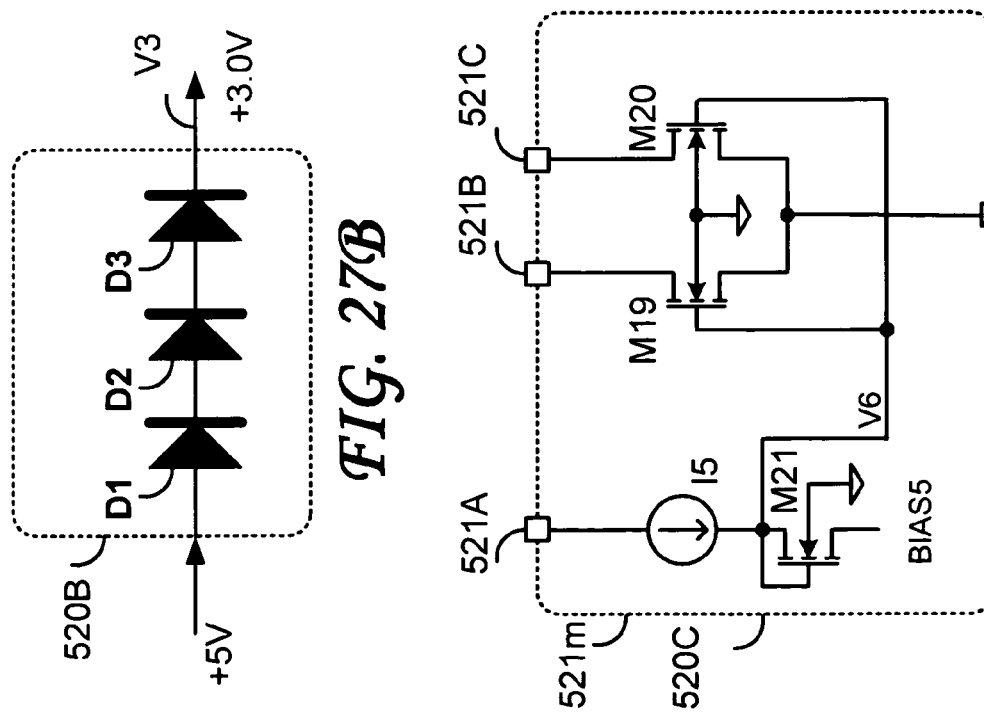
FIG. 27B
FIG. 27D

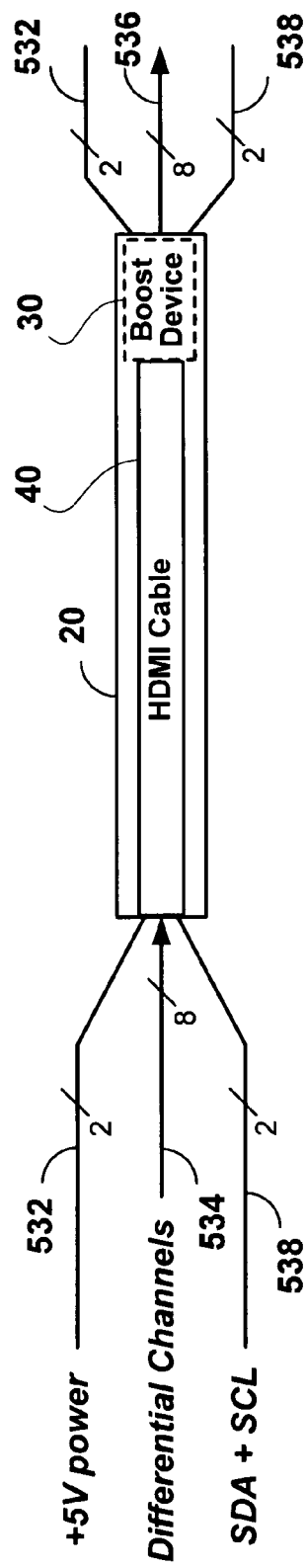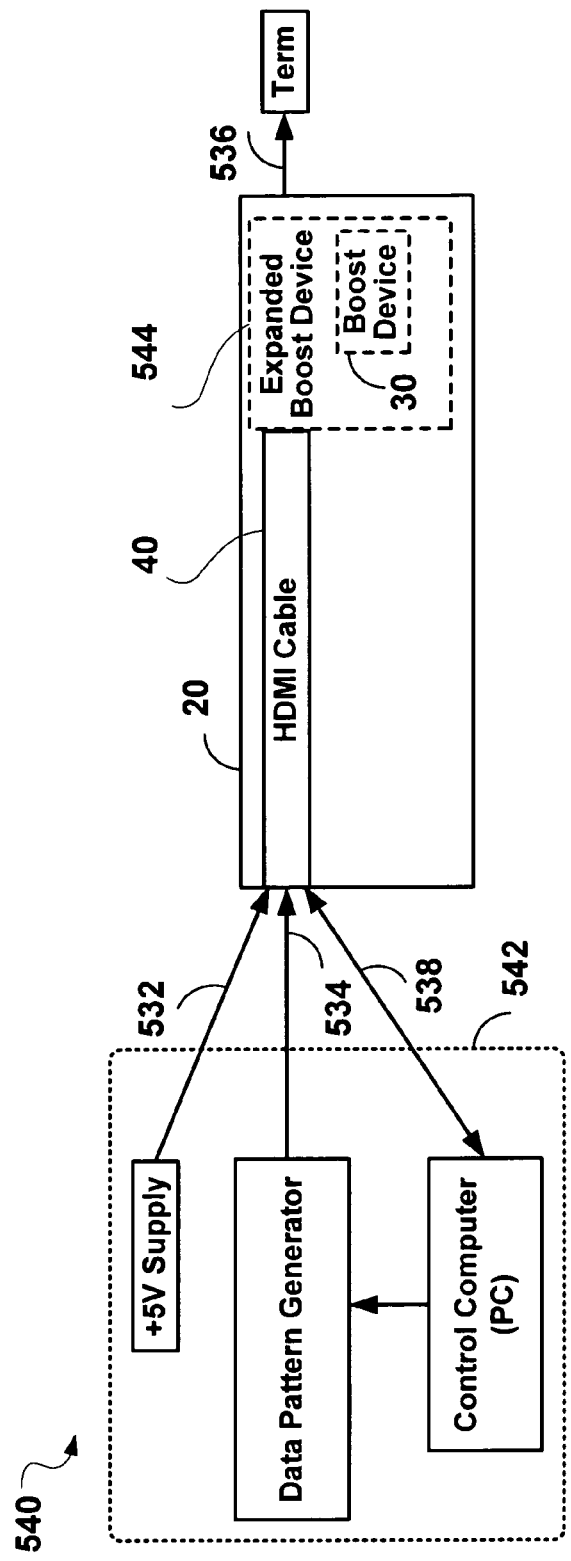
FIG. 28
FIG. 29

HIGH-SPEED CABLE WITH EMBEDDED POWER CONTROL

RELATED APPLICATIONS

The present application is a Continuation-in-Part of U.S. application Ser. No. 11/826,713 to Keady et al filed on Jul. 18, 2007 now U.S. Pat. No. 7,861,277 entitled "A High-Speed Cable With Embedded Power Control", and it claims priority from the above cited U.S. application Ser. No. 11/826,713 filed on Jul. 18, 2007 and U.S. provisional applications 60/856,032 filed on Nov. 2, 2006 and 60/858,353 filed on Nov. 13, 2006 respectively, all applications being incorporated herein by reference.

FIELD OF THE INVENTION

The present invention relates to high speed cables that carry serially encoded differential signals between electronic equipments, and in particular, multi-conductor cables interconnecting audio-visual equipment.

BACKGROUND OF THE INVENTION

The distribution of television signals has increasingly become based on digital methods and digitally encoded forms of video and audio signals. At the same time, higher resolution (high definition TV) has become available in the market place, commensurate with larger and higher definition displays. To meet the requirement of interconnecting such high definition displays with digital signal sources such as Digital Versatile Disc (DVD) players and receivers/decoders for digital satellite and digital cable distribution of video material, a digital interface standard has evolved, known as the High-Definition Multimedia Interface (HDMI). A detailed specification for HDMI can be obtained from the "hdmi.org" website. The HDMI specification currently available and used in this application is HDMI specification version 1.3 dated Jun. 22, 2006, which is incorporated herein by reference. This HDMI standard can be employed for connecting digital video sources to digital video sinks over a cable that carries a number of digital signals and a clock signal.

The inherent characteristics and manufacturing imperfections of high-speed differential signaling cables such as may be used to carry HDMI signals have an adverse effect on the high-speed signals carried by the cable.

For example, any cable has a limited bandwidth and therefore acts as a low pass filter. The bandwidth of the cable is related to its length, the longer the cable the greater the filtering effect and the lower its bandwidth. As a result, high-frequency signals passing through the cable are attenuated, and their edges become less sharp. This leads to an increased risk of misinterpreting the received data at the receiver end of the cable, especially for long cables and high-speed data.

FIGS. 1A-1C illustrate the effect of the limited bandwidth of a cable on the transmitted signals. FIG. 1A illustrates a high-speed signal to be transmitted through a high-speed cable, FIG. 1B shows a distorted bandwidth-limited signal received at the receiver end of the cable (before equalization), and FIG. 1C shows the received signal at the receiver end after equalization. As seen from FIG. 1B, the signal edges are slowed and short pulses are narrowed, not reaching the full transmitted amplitude.

Differential signaling cables are commonly used to carry high-speed digital signals in differential form, that is, pulses of opposing polarities are transmitted on the two strands of the cable. The differential signal carried over such cables may be warped, that is the two signal components (positive and negative polarities V+ and V−) are skewed in time with respect to each other (differential skew), further distorting the received signal.

The impact of differential skew is depicted in timing diagrams in FIGS. 2A and 2B.

FIG. 2A shows an example timing diagram of the two single ended signal components (V+, V−) of the differential data on an HDMI channel, as it may be transmitted by an HDMI source into a cable. A timing diagram of the corresponding differential signal (Vdiff-xmit) in FIG. 2A illustrates the corresponding differential signal that is clean and easily interpreted.

FIG. 2B shows an example timing diagram of the two single ended signal components (V+ and V−del) of the differential data on an HDMI channel, as it might be received at the end of a cable. For the sake of clarity, only the effect of the differential skew is shown in FIG. 2B. The signals V+ and V− are skewed in time with respect to each other. The negative signal component V− is delayed with respect to the signal component V+ by a differential skew delay of Td. A timing diagram of the corresponding distorted differential signal (Vdiff-rcv) in FIG. 2B illustrates that, as a consequence of the differential skew, the differential signal Vdiff-rcv is significantly distorted with clearly visible plateaus in the signal where the differential signal is zero (0). These plateau regions can only be interpreted as noise by the receiver, the result of which is to reduce the width of the window of valid data. This reduction is seen as a closure of the receive data eye and directly compromises the channel quality. The amount of differential skew delay (Td) depends on the characteristics of each individual cable, and is basically constant.

Earlier approaches to improving cable quality so far have been limited to embedded passive equalizer circuits within the cable, which boost high frequencies of the signals attenuated in the cable. Such equalizers are fixed to compensate for a fixed cable length.

While the equalization required for a given cable depends largely on the length of the cable, other characteristics of high-speed signaling cables such as the differential skew, being more random, may vary substantially between the cables.

Accordingly, there is a need in the industry for the development of an improved high-speed signaling cable, which would provide improved signal characteristics.

Earlier High-Definition Multimedia Interface (HDMI) signal boosters that can be used to boost HDMI signals use external power inputs, see e.g. Long Reach™ product of Gennum corporation, which has been submitted in an Information Disclosure Statement. As a result, they cannot be embedded in a standard HDMI cable. A more recent development is a stand-alone "super booster" that can be inserted inline with a cable, and is also available integrated in an HDMI cable, see references: Gefen Inc., submitted in an Information Disclosure Statement, including an advertisement of a standalone HDMI "super booster; A manual for the standalone HDMI "super booster, which has been submitted in an Information Disclosure Statement; and an advertisement for a cable with an integrated HDMI "super booster" which has been submitted as a reference in an Information Disclosure Statement.

The possibility of embedding an active device within the cable is associated with a problem. Firstly, no power input may be available for such a device except through the cable, i.e. there is no provision for external power supplies. Secondly, in the case of the HDMI cable, there is not enough power available to power a simple signal regenerator, primarily because of the specification requirement to provide a termination voltage for the inputs. As a result, the embedded active device apparently cannot be powered as required.

In more detail, the main power requirement for an HDMI signal booster is the requirement to provide a termination voltage (3.3V) with the capability to source 12 mA for each of three HDMI inputs. The power that is available from the cable comes from a 5V line, from which a maximum current of 5 mA can be drawn (as per HDMI specification V1.3) when the sink device is active, i.e. the total available power is limited to 50 mW. The combined power requirement of the input terminations on the other hand is approximately 12 mA*3.3V*3=120 mW. Unfortunately, these requirements cannot be met in a standard HDMI cable in a simple way.

Accordingly, there is a need in the industry for the development of an improved signal booster with an improved power control circuit for embedded cable applications based on one or more active devices, which would avoid or mitigate the above noted problem.

SUMMARY OF THE INVENTION

There is an object of the invention to provide an improved programmable cable with embedded power control and boost device where the boost device obtains its power from signals in the cable.

According to one aspect of the invention, there is provided a cable for connecting a transmitting data source device to a receiving data sink device, and carrying differential data signals.

The cable includes a boost device for boosting at least one of the differential data signals, where the boost device includes: a differential input circuit for receiving one of the differential data signals from the data source device; a processing block having a transfer function for processing the differential signal received by the differential input circuit and conveying the processed signal to the differential output circuit; a differential output circuit for transmitting a boosted one of the differential data signals to the data sink device; and an electronic circuit for obtaining from at least one of the differential data signals at least some of the electrical power required to operate the processing block.

The differential data signals are differential High Definition Multi-Media Interface (HDMI) signals and include a plurality of Transition Minimized Differential Signaling (TMDS) encoded data channels and a clock channel.

To obtain the power for operating the processing block, the differential output circuit includes means for providing the electrical power, and the differential output circuit and the processing block are preferably connected in series so as to conduct a current from the data sink device to a common ground.

The boost device of the cable further includes a voltage dropper circuit for reducing an available higher voltage and providing a reduced supply voltage for the differential input circuit.

The voltage dropper circuit may comprise one or more diodes connected in series between the available higher voltage and the reduced supply voltage. Alternatively, the voltage dropper circuit includes switched capacitors and a 2-phase clock, where the capacitors are used for periodically transferring energy from the available higher voltage node to the reduced supply voltage.

The boost device of the cable may further include a voltage generator circuit for obtaining a current from the boosted differential signal to provide power to the processing block.

Alternatively, the boost device of the cable may include a voltage dropper circuit for reducing an available higher voltage and providing a reduced supply voltage for the differential input circuit; and a voltage generator circuit for obtaining a current from the boosted differential signal to provide power to the processing block.

In either case, the voltage dropper circuit of the boost device of the cable may comprise one or more diodes connected in series between the available higher voltage and the reduced supply voltage, or alternatively include switched capacitors, the capacitors used for periodically transferring energy from the available higher voltage node to the reduced supply voltage.

According to another aspect of the invention, the electronic circuit of the boost device of the cable includes a voltage generator circuit for obtaining at least one current from the boosted differential signal to provide the electrical power to the differential input circuit, the voltage generator circuit thus including means for combining the at least one current and adjusting an output voltage of the provided electrical power.

According to a further aspect of the invention, said electronic circuit comprises a voltage generator circuit for providing the electrical power to the differential input circuit as well as the processing block.

The processing block of the boost device of the cable advantageously includes an equalization circuit for equalizing the frequency response of the cable, and the differential output circuit includes means for providing the electrical power to the processing block, at the same time boosting the differential data signals and providing a proper output impedance.

According to yet another aspect of the invention there is provided a method for providing power to a boost device in a cable connected between a transmitting data source device and a receiving data sink device. The steps of the method comprise the steps of: receiving differential data signals from the data source device in a differential input circuit of the boost device; boosting at least one of the received differential data signals into a boosted differential data signal;

transmitting the boosted differential data signal from a differential output circuit of the boost device to the receiving data sink device; and obtaining power to operate at least some of the circuitry of the boost device from the data sink device through its connection with the differential output circuit.

The method preferentially further comprises the step of processing the differential signal received by the differential input circuit in a processing block, and conveying the processed signal to the differential output circuit.

The method step of obtaining power for at least some of the circuitry of the boost device includes providing at least some of the power to operate the processing block.

According to a further aspect of the invention, there is provided a boost device for boosting differential data signals sent trough a cable from a transmitting data source device to a receiving data sink device. The boost device comprises: a differential input circuit for receiving one of the differential data signals from the data source device; a processing block having a transfer function for processing the differential signal received by the differential input circuit and conveying the processed signal to the differential output circuit; a differential output circuit for boosting and transmitting a boosted one of the differential data signals to the data sink device; and an electronic circuit for obtaining from at least one of the differential data signals at least some electrical power required to operate the processing block.

To obtain the power for operating the processing block, the differential output circuit of the boost device includes means for providing the electrical power, and the differential output circuit and the processing block are preferably connected in series so as to conduct a current from the data sink device to a common ground.

To obtain the electrical power for operating said processing block, the differential output circuit includes means for providing the electrical power to the processing block, and the differential output circuit and the processing block are preferably connected in series so as to conduct a current from the data sink device to a common ground.

The boost device may also comprise a voltage dropper circuit for reducing an available higher voltage and providing a reduced supply voltage for the differential input circuit.

Alternatively, the boost device may include a voltage dropper circuit for reducing an available higher voltage and providing a reduced supply voltage for the differential input circuit; and in addition, a voltage generator circuit for obtaining a current from the boosted differential signal to provide power to the processing block.

In either case, the voltage dropper circuit may comprise one or more diodes connected in series between the available higher voltage and the reduced supply voltage, or alternatively include switched capacitors, the capacitors used for periodically transferring energy from the available higher voltage node to the reduced supply voltage.

The processing block of the boost device preferably includes an equalization circuit for equalizing a frequency response of the cable, and the differential output circuit of said boost device advantageously also includes means for providing the electrical power to the processing block, where the same means are also used in boosting the differential data signals and providing a proper output impedance.

Thus, an improved programmable cable with embedded power control and boost device is provided where the boost device obtains its power from signals in the cable.

BRIEF DESCRIPTION OF THE DRAWINGS

Embodiments of the invention will now be described, by way of example, with reference to the accompanying drawings in which:

FIG. 27B shows a circuit diagram of the Voltage Dropper 520B of FIG. 24B, realized by a series arrangement of diodes;

FIG. 27C shows a block diagram of an alternative realization of the Voltage Dropper 520B of FIG. 24B in the form of a DC/DC converter;

FIG. 27D shows a diagram of the Voltage Generator 520C of FIGS. 24C to 24E;

FIG. 28 illustrates the improved HDMI cable 20 of FIG. 4, showing external connections that are available for use in calibrating the cable;

FIG. 29 shows a Real Time Configuration 540, including an expanded boost device 544 used in the Real Time Cable Calibration method;

DETAILED DESCRIPTION OF THE EMBODIMENTS OF THE INVENTION

Figure 3:
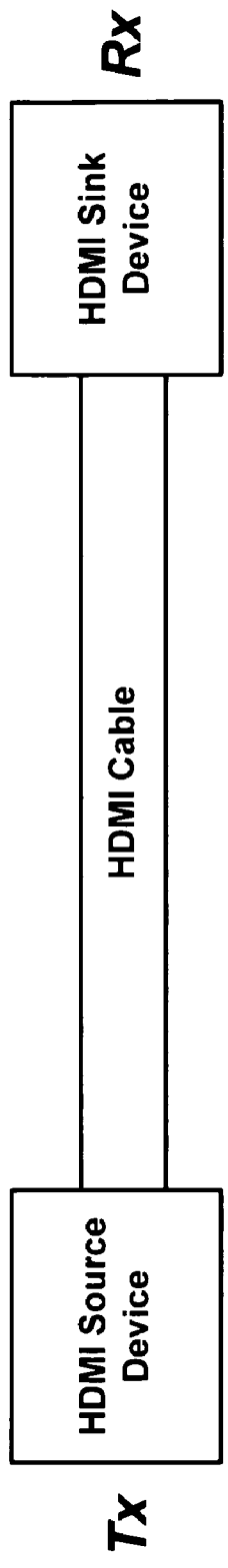
FIG. 3 shows a prior art HDMI (High-Definition Multi-Media Interface) system.

FIG. 3 shows a prior art HDMI (High-Definition Multi-Media Interface) system, including a HDMI transmitter Tx (HDMI Source Device), a HDMI receiver Rx (HDMI Sink Device), and an HDMI cable connecting the Tx and the Rx.

Figure 4:
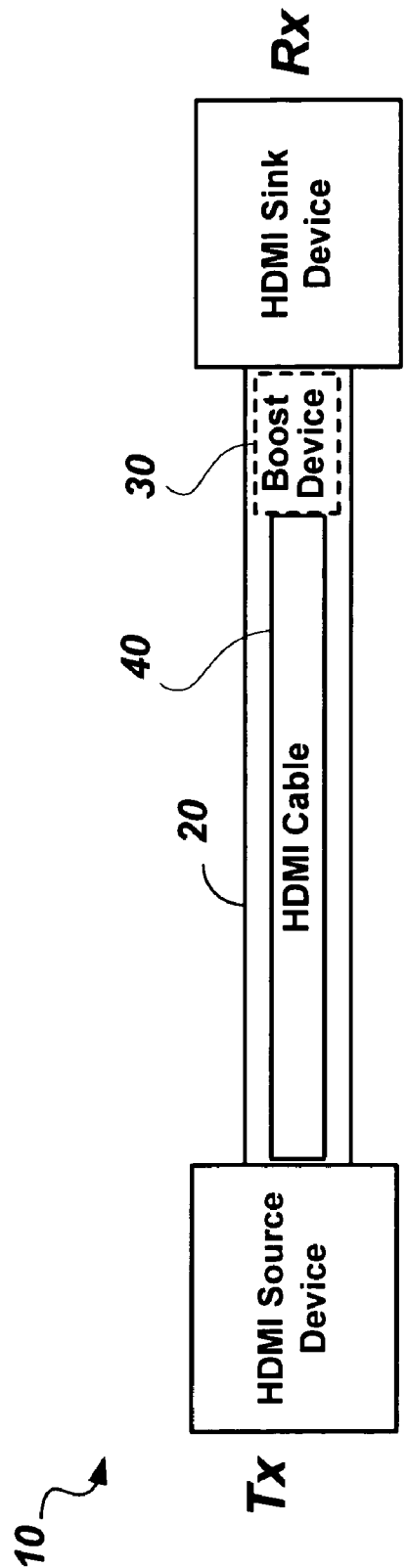
FIG. 4 shows an the HDMI system 10 including an improved HDMI cable 20 according to an embodiment of the present invention.

FIG. 4 shows an HDMI system 10 including an improved HDMI cable 20 according to an embodiment of the present invention.

The HDMI system 10 includes the HDMI transmitter Tx (HDMI Source Device), the HDMI receiver Rx (HDMI Sink Device), and the improved HDMI cable 20 of the embodiment of the present invention, connecting the Tx and Rx.

The improved HDMI cable 20 comprises an embedded boost device 30, details of which are described in the following, and a basic (passive) HDMI cable 40. The boost device 30 is located near the end of the improved HDMI cable 20 closest to the HDMI receiver Rx. Without limiting the generality of the application, the improved HDMI cable 20 may be used to connect a DVD player (an example of an HDMI Source Device) to a Television Screen (an example of an HDMI Sink Device).

Figure 5:
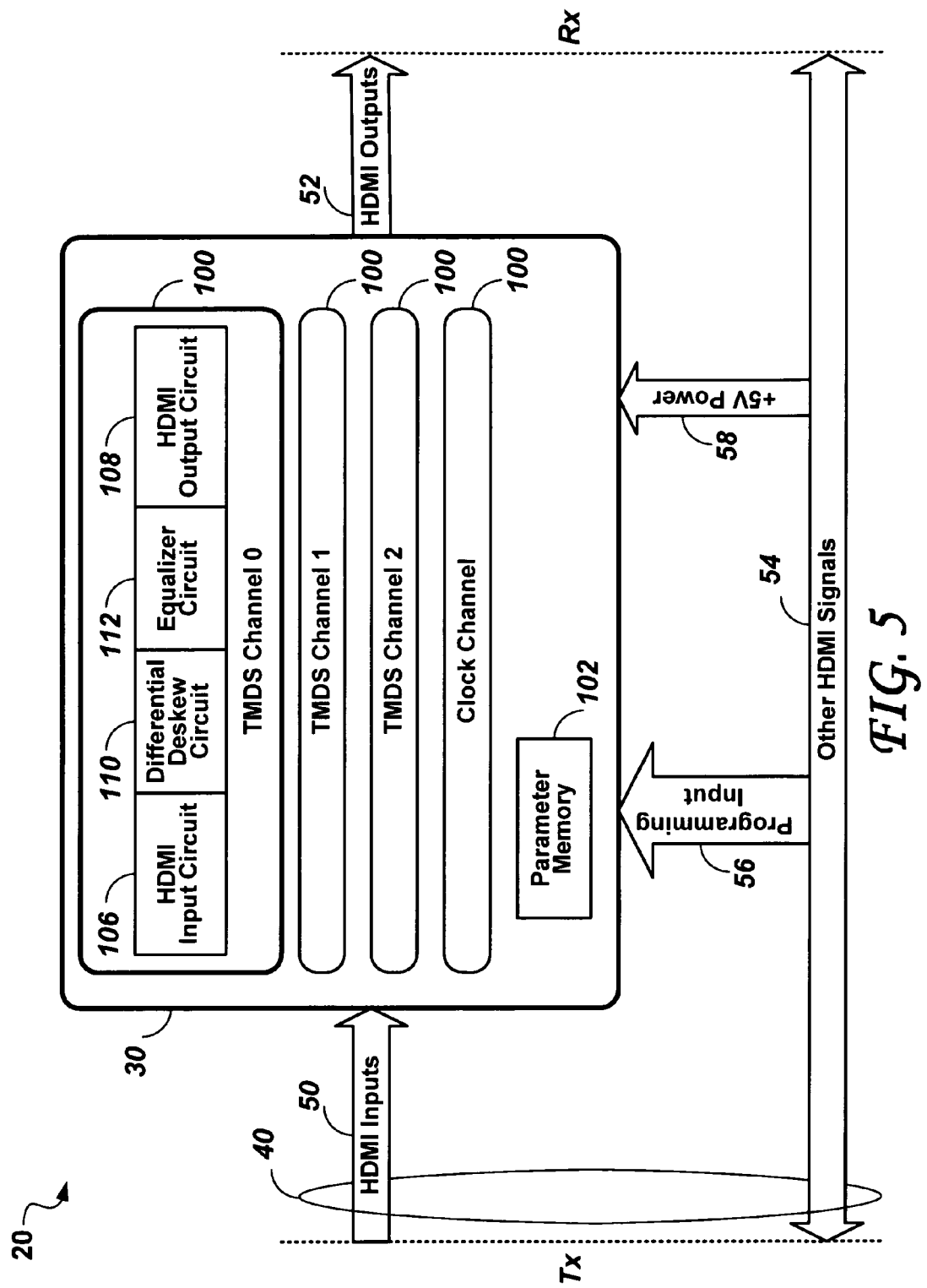
FIG. 5 is a block diagram illustrating the improved HDMI cable 20 of FIG. 4, including channel boost circuits 100.

FIG. 5 is a block diagram illustrating the improved HDMI cable 20 that extends between the HDMI transmitter Tx and the HDMI receiver Rx, including the boost device 30 of FIG. 4. Also shown are HDMI inputs 50 extending from the Tx to the boost device 30 through the basic HDMI cable 40, HDMI outputs 52 extending from the boost device 30 to the Rx, and a group of Other HDMI Signals 54 extending directly from the Tx to the Rx through the basic HDMI cable 40. The basic HDMI cable 40 includes the HDMI inputs 50 and the Other HDMI Signals 54.

The HDMI inputs 50 provide the connections that couple HDMI signals from the HDMI transmitter Tx (FIG. 4) over the wires of the basic HDMI cable 40 to inputs of the boost device 30. The HDMI inputs 50 include four (4) signal pairs:

a Transition Minimized Differential Signaling (TMDS) Channel Input 0;

a TMDS Channel Input 1;

a TMDS Channel Input 2; and a Clock Channel Input.

Similarly, the HDMI outputs 52 include four (4) signal pairs of boosted HDMI signals:

a TMDS Channel Output 0;

a TMDS Channel Output 1;

a TMDS Channel Output 2; and a Clock Channel Output.

The HDMI outputs 52 couple the boosted HDMI signals from the boost device 30 over a short connection to the HDMI receiver Rx.

A Programming input 56 and a +5V Power signal 58 is coupled from the Other HDMI Signals 54 to the boost device 30. Not shown in the figure are physical features such as device carrier(s) and connectors which may be part of the improved HDMI cable 20.

The boost device 30 includes a number of channel boost circuits 100, a parameter memory 102. In the preferred embodiment of the invention, the boost device includes four (4) channel boost circuits 100 as shown in FIG. 5, each to boost the signal of one of the TMDS Channel 0, the TMDS Channel 1, and the TMDS Channel 2.

Each channel boost circuit 100 includes an HDMI Input Circuit 106 and an HDMI Output Circuit 108. Each channel boost circuit 100 advantageously further includes a Differential (intra-pair) Deskew Circuit 110 for adjusting an existing time skew of the two polarities of a differential data signal propagating through the basic HDMI cable 40 and an Equalizer Circuit 112 to compensate for the limited bandwidth characteristics of the basic HDMI cable 40. Each channel boost circuit thus provides a transfer function from the respective HDMI Input to the corresponding HDMI Output with characteristics designed to compensate for the degradation of the corresponding differential pair in basic cable 40.

The boost device 30 may be powered by the +5V Power signal 58, and by power derived from the HDMI Outputs 52 as will be described in detail below. The power for the operation of the boost device 30 is entirely derived from signals carried in the improved HDMI cable 20, and supplied by the HDMI transmitter Tx and/or the HDMI receiver Rx.

Figure 2A:
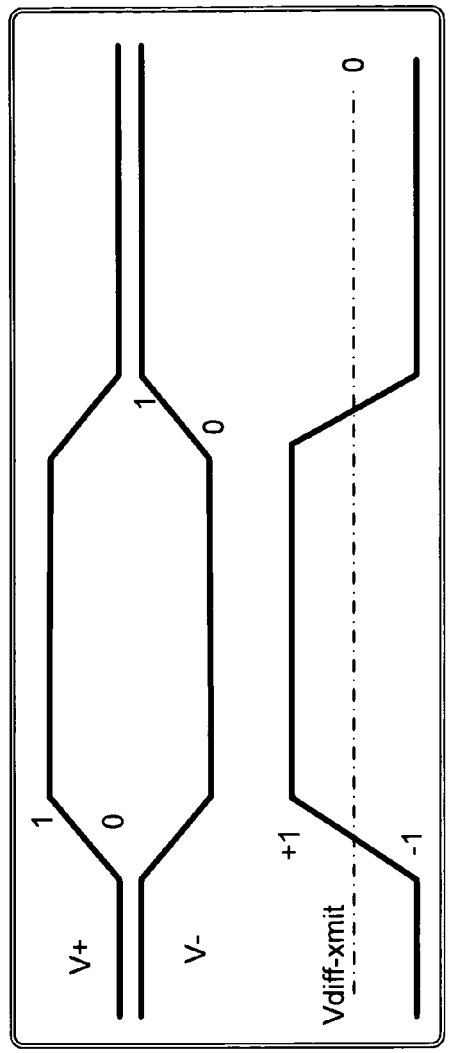
FIG. 2A shows timing diagrams of the single ended signal components and the corresponding differential signal of the differential data on a differential signaling channel respectively as they might be transmitted by a transmitter into a cable.

In a cable carrying differential signals, i.e. where each signal is carried over a pair of wires, manufacturing tolerances commonly result in slight differences between the lengths of the wires and connectors used for each channel. The result will be a different delay through the cable for each of the pair. Such differential (intra-pair) skew degrades the received signal (see FIGS. 2A and 2B above). Elimination of intra-pair skew may be accomplished by adding delay to the signal passing through the shorter of the pair of wires by the appropriate amount so that it is aligned with the signal passing through the longer of the pair. In accordance with the embodiments of present invention, intra-pair skew is eliminated with the help of the Differential Deskew Circuit 110, which is digitally programmable as will be described in the next sections. The parameter memory 102 is used to retain the deskew settings of the Differential Deskew Circuit 110, once they are determined in a programming (calibration) setup method.

Similarly, cables present different bandwidth characteristics, which depend on the length and the physical construction of the cable. The limited bandwidth may be compensated (to some extent) by the Equalizer Circuit 112 which is also digitally programmable. The equalizer settings may similarly be retained in the parameter memory 102. The proper settings for both the Differential Deskew Circuit 110 and the Equalizer Circuit 112 may be determined in a programming (calibration) setup at the time of production, and loaded into the parameter memory 102 through the Programming Input 56. The programming setup method will be described in more detail further below (FIGS. 29 to 37).

Figure 6:
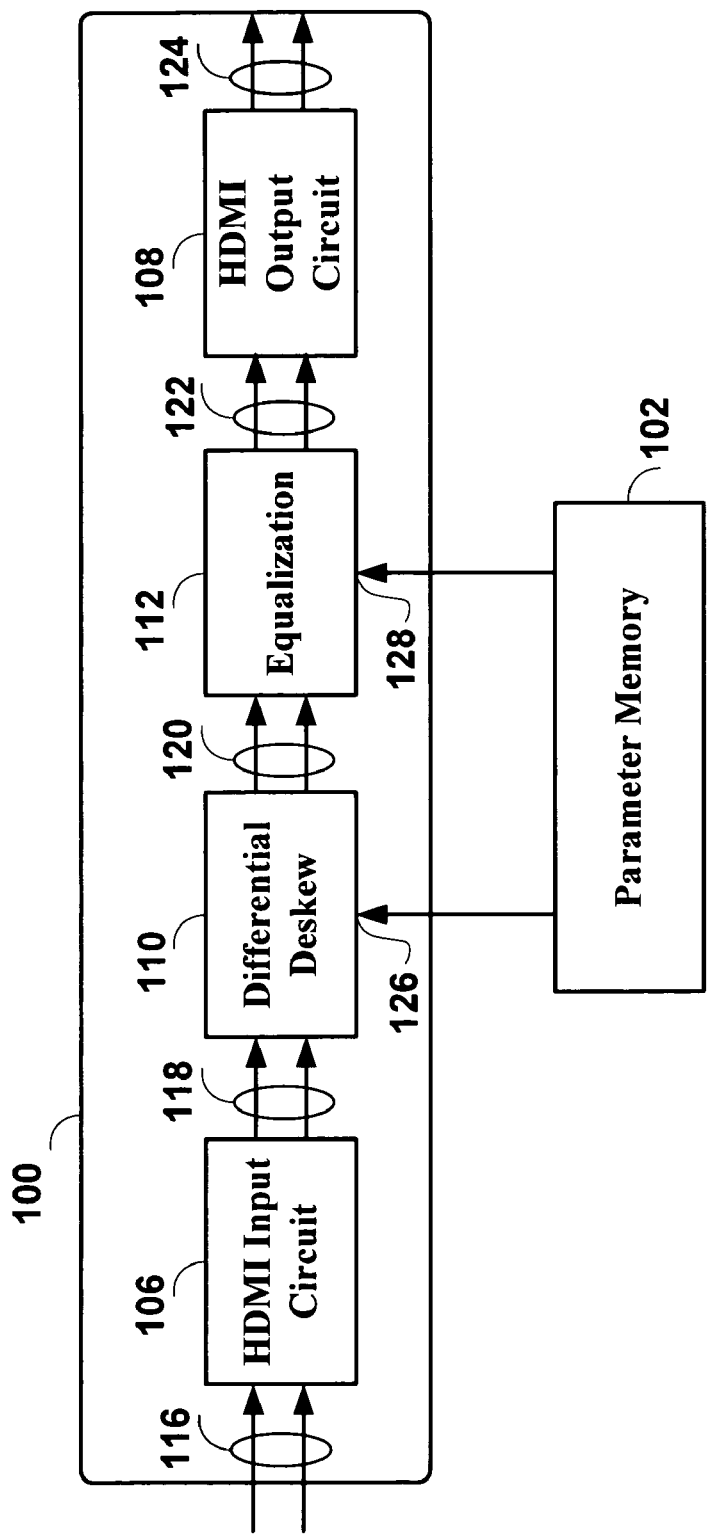
FIG. 6 is a more detailed block diagram of the channel boost circuit 100 of FIG. 5, including a Differential Deskew Circuit 110.

FIG. 6 shows a more detailed block diagram of a single instance of the channel boost circuit 100 of FIG. 5, comprising the HDMI Input circuit 106, the Differential Deskew circuit 110, the Equalization circuit 112, and the HDMI Output circuit 108.

The input to the HDMI Input circuit 106 is a raw input signal (pair) 116 (one of the HDMI Inputs 50, FIG. 5). The HDMI Input circuit 106 outputs a "recovered signal" (pair) 118 that is input to the Differential Deskew circuit 110. The Differential Deskew circuit 110 outputs a "deskewed signal" (pair) 120 that is input to the Equalization circuit 112. The Equalization circuit 112 outputs an "equalized signal" pair 122 that is input to the HDMI Output circuit 108. And finally, the HDMI Output circuit 108 outputs a "boosted signal" (pair) 124 that is one of the HDMI Outputs 52 (FIG. 5).

Also shown in FIG. 6 is the Parameter Memory 102, which is shared among all channel boost circuits 100 of the boost device 30. It is connected to a deskew parameter input 126 of the Differential Deskew circuit 110, and separately to an equalization parameter input 128 of the Equalization circuit 112.

Differential Deskewing Circuit 110

As indicated above, the intra-pair differential skew delay may be compensated by inserting a delay element having a delay of Td in the path of V+ (in the case of the example of FIG. 2B), or in the path of V− in the opposite case (if the input V+ signal was delayed with respect to V−), or neither if there was no skew present.

Figure 7:
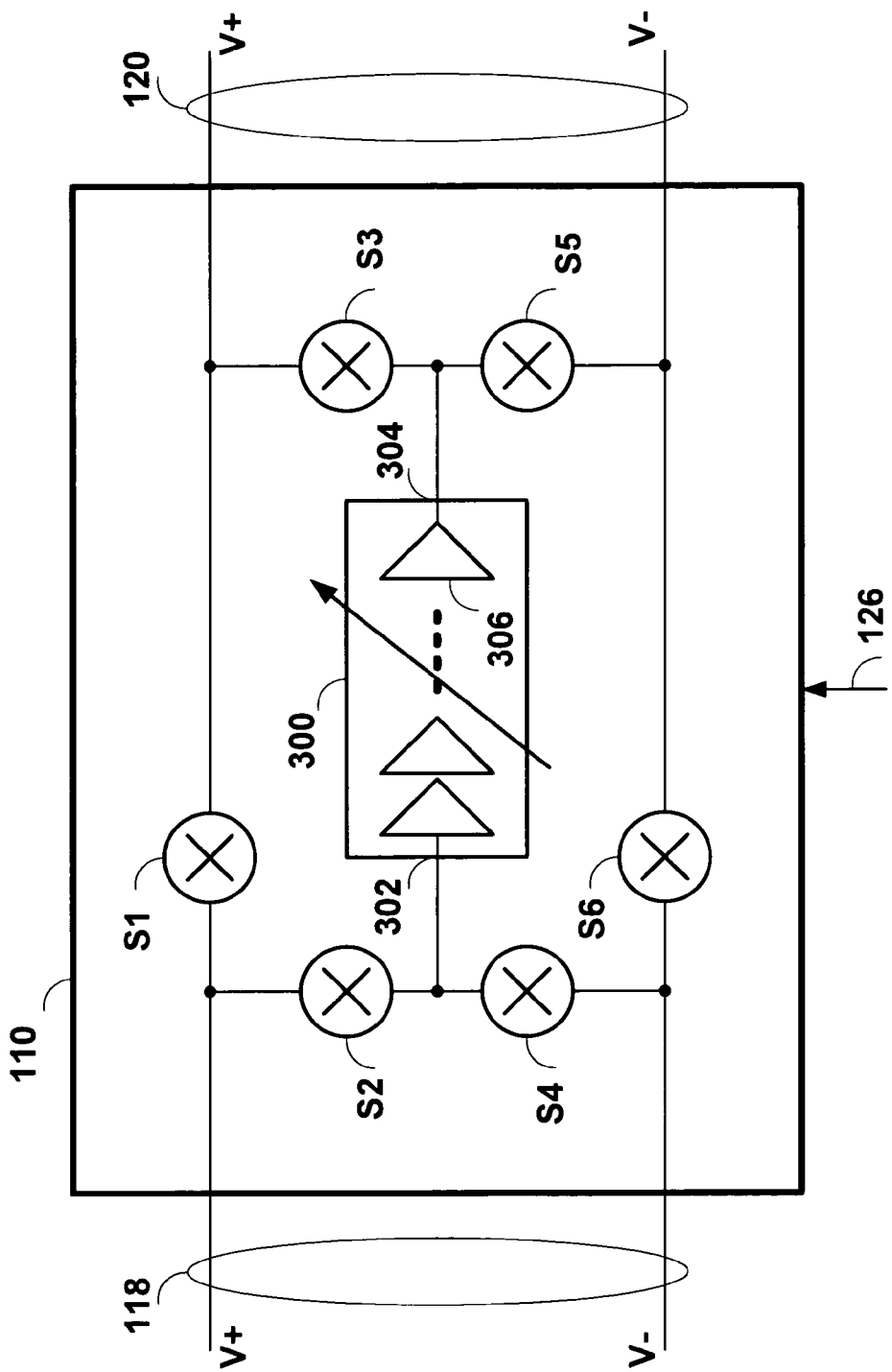
FIG. 7 shows a simplified block diagram of the Differential Deskew Circuit 110 of FIG. 6, including an adjustable delay block 300.

FIG. 7 shows a simplified block diagram of the Differential Deskew Circuit 110 of FIG. 6 in which the differential skew is removed (compensated). The same reference numerals are used to indicate the differential inputs and outputs (the recovered signal 118 and the deskewed signal 120 respectively, each with a positive [V+] and a negative [V−] terminal), and the control input for the deskew parameters (126).

As shown in FIG. 7, the Differential Deskew circuit 110 includes an adjustable delay 300 with a (single-ended) input 302 and an output 304, and six ON/OFF switches S1 to S6. The adjustable delay 300 includes a number of delay stages 306. The switch S1 is connected between the positive terminal of the differential input (the recovered signal 118 V+) and the positive terminal of the differential output (the deskewed signal 120 V+). Similarly, the switch S6 is connected between the negative terminal of the differential input (the recovered signal 118 V−) and the negative terminal of the differential output (the deskewed signal 120 V−). The switches S2 and S4 are connected between the input 302 of the adjustable delay 300 and the positive (V+) and negative (V−) terminals respectively of the recovered signal 118. Similarly, the switches S3 and S5 are connected between the output 304 of the adjustable delay 300 and the positive (V+) and negative (V−) terminals respectively of the deskewed signal 120.

The scheme allows the single adjustable delay 300 to correct for both positive and negative differential skew. In effect, the single adjustable delay 300 is sufficient to compensate positive or negative differential skew (where either the positive signal or the negative signal is delayed with respect to the other), by switching it (the adjustable delay 300) into either the negative or the positive signal path respectively. For example, to pass the positive signal V+ through the adjustable delay 300 (which is made of a cascade of delay units, to be described in detail below) the switch states are as follows: S1=OFF, S2=ON, S3=ON, S4=OFF, S5=OFF, and S6=ON. To pass V− through the adjustable delay 300 the switch states are as follows: S1=ON, S2=OFF, S3=OFF, S4=ON, S5=ON, S6=OFF. To switch the adjustable delay 300 out of both the V− and the V+ paths, thus providing no adjustment of the differential delay, the switch states are as follows: S1=ON, S2=OFF, S3=OFF, S4=OFF, S5=OFF, S6=ON.

The solution of the deskew problem presents two challenges. The first is to make a suitable delay, the second is to tune the delay. Making the delay is a challenge because the unit should have a wide enough bandwidth to pass the signals but at the same time the delay block has to present a useful delay. The wide bandwidth of a single delay stage naturally results in little delay, so a cascade of stages is required to achieve a sufficient delay.

A cascade of digital delay stages, including digital switches and a decoder to provide binary addressable selection of the overall delay, are described in U.S. Pat. No. 6,268,753. However, the present invention requires an adjustable delay circuit to delay a high-speed analog signal.

Issues to be solved with a cascade of analog delay stages in the proposed configuration of FIG. 7 for differential skew compensation, include the need to provide unity gain, as well as preserve the high bandwidth required.

Among the prior art, several digital delay compensation schemes are disclosed, but only few circuits providing adjustable delay for analog signals. For example, the use of a follower circuit in parallel with a gain stage to boost the high frequency response of a digital circuit is taught in U.S. Pat. No. 5,739,713. U.S. Pat. No. 6,525,568 teaches a phase shifting (delay) stage that includes an RC (resistor-capacitor) element followed by parallel gain stages of nominally −1 and +2 gain, their outputs added together to provide overall unity gain with a particular complex frequency transfer function. In the United States Patent Application 20050083130 a high performance amplifier is proposed which includes a delay element to compensate for signal propagation delay that may exist in alternative signal paths.

Figure 8:
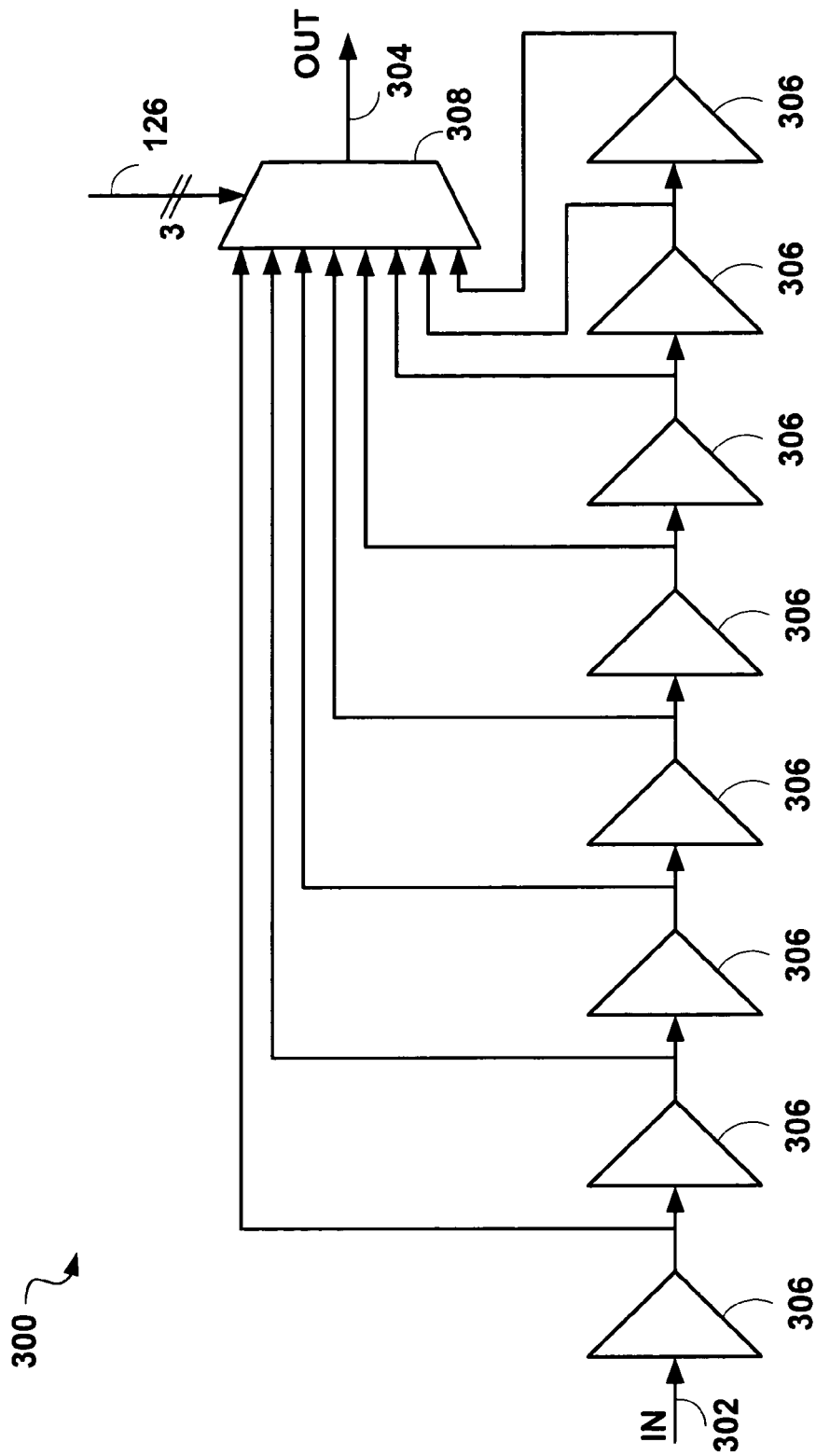
FIG. 8 shows the preferred embodiment of the adjustable delay block 300 of FIG. 7.

FIG. 8 shows the preferred embodiment of the adjustable delay block 300 of FIG. 7 as a cascade of eight analog delay stages ("Delay Units") 306 in combination with an analog selector stage 308 as a solution to implement the adjustable delay 300. The eight delay units 306 are connected in series (cascaded), the output of each delay unit 306 being input to the analog selector stage 308. The first delay unit 306 of the cascade provides the input of the adjustable delay 300 (IN 302).

The deskew parameters control signal (deskew parameter input 126) includes a 3-bit binary signal connected to the analog selector stage 308 for selecting one of its inputs to be switched through to the output of the adjustable delay 300 (OUT 304).

Figure 18:
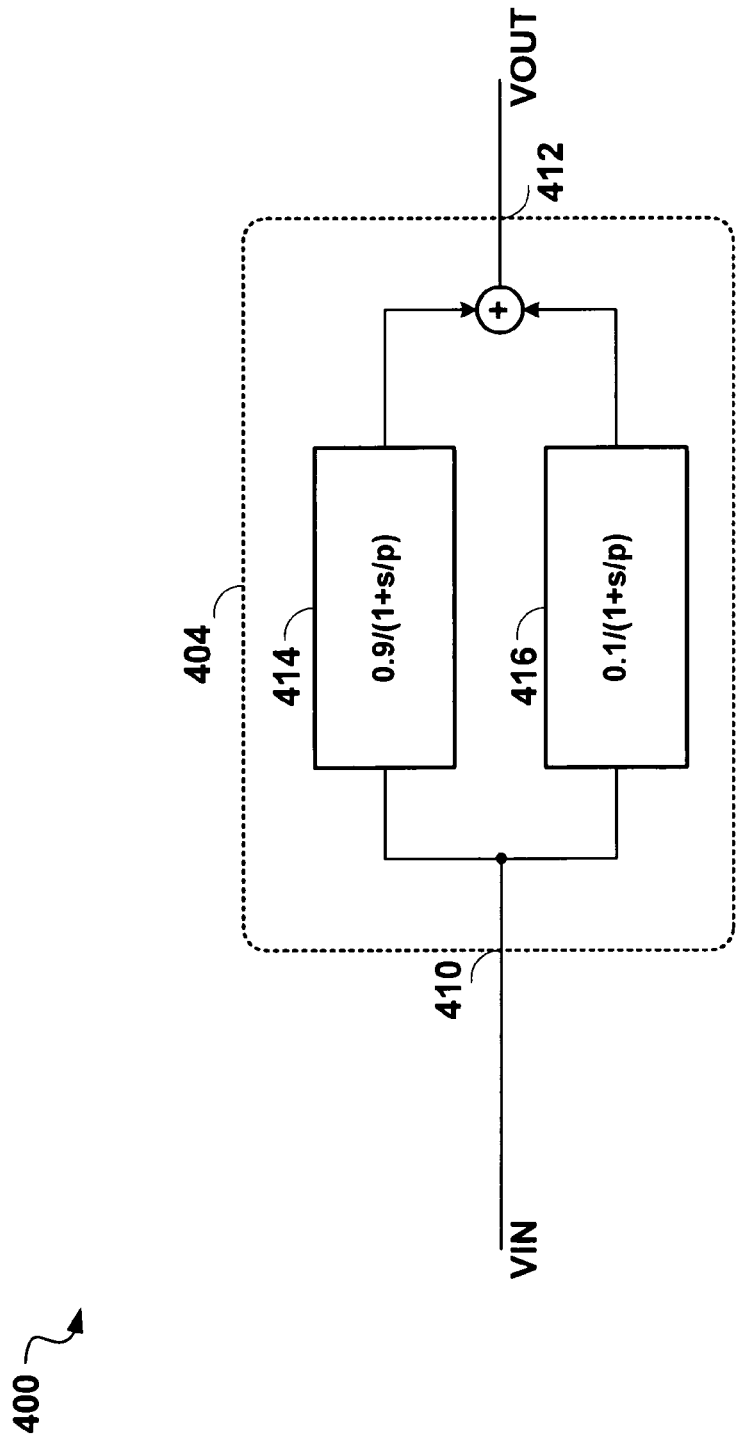
FIG. 18 illustrates a simplified block diagram of a buffered delay stage 400 which may be an embodiment of the delay unit 306 of the adjustable delay 300 of FIG. 6.

An exemplary complete circuit of the single delay unit 306, which may be cascaded to provide a unit of delay each, for the adjustable delay 300 is shown in FIG. 18 below.

To help in understanding the circuitry of the single delay unit 306, a step-by-step description of the issues to be solved, and possible solutions, is presented first.

Figure 2B:
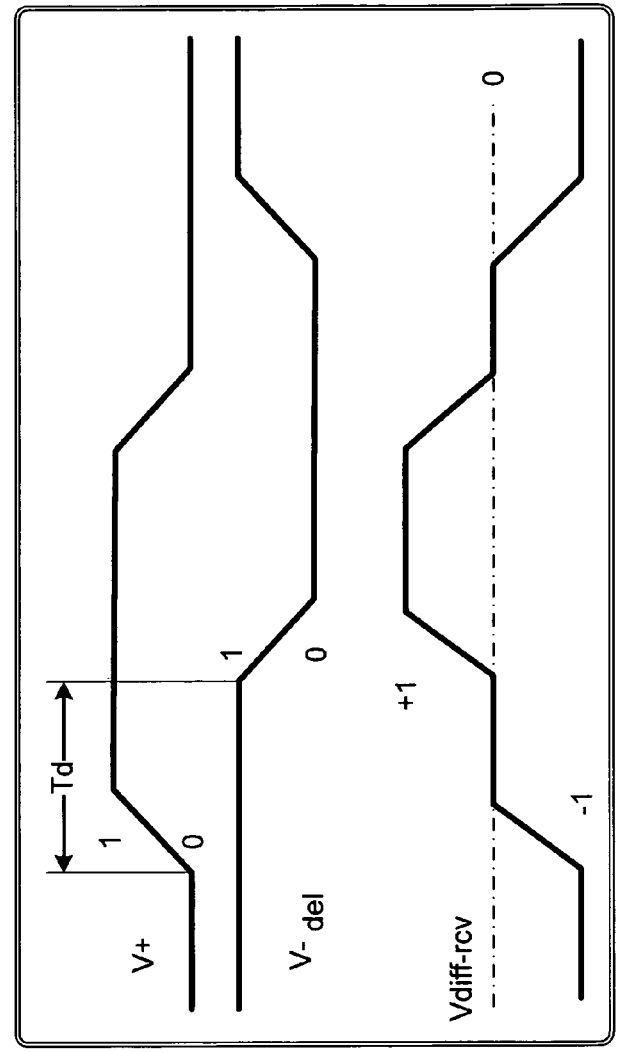
FIG. 2B shows example timing diagrams of the single ended signal components and the corresponding differential signal of the differential data as they might be received from the end of the cable.
Figure 9:
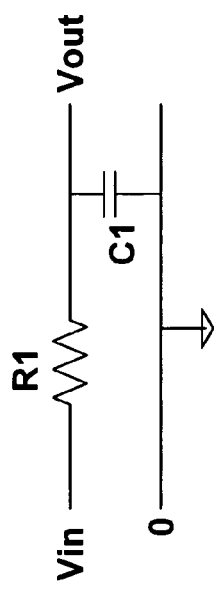
FIG. 9 shows a simple RC delay circuit that may be used to introduce the delay (Td) of FIG. 2B.

FIG. 9 shows a simple RC delay circuit that may be used to introduce the delay (Td) of FIG. 2B. The circuit of FIG. 9 is a single ended circuit comprising a resistor R1, a capacitor C1, and input and output terminals (signals Vin and Vout), as well as a ground (0). The capacitor C1 is connected between Vout and ground, and the resistor is connected between Vin and Vout. Making a circuit with an RC delay as shown in FIG. 9 will succeed in delaying the signal but it will also filter the signal.

Figure 10:
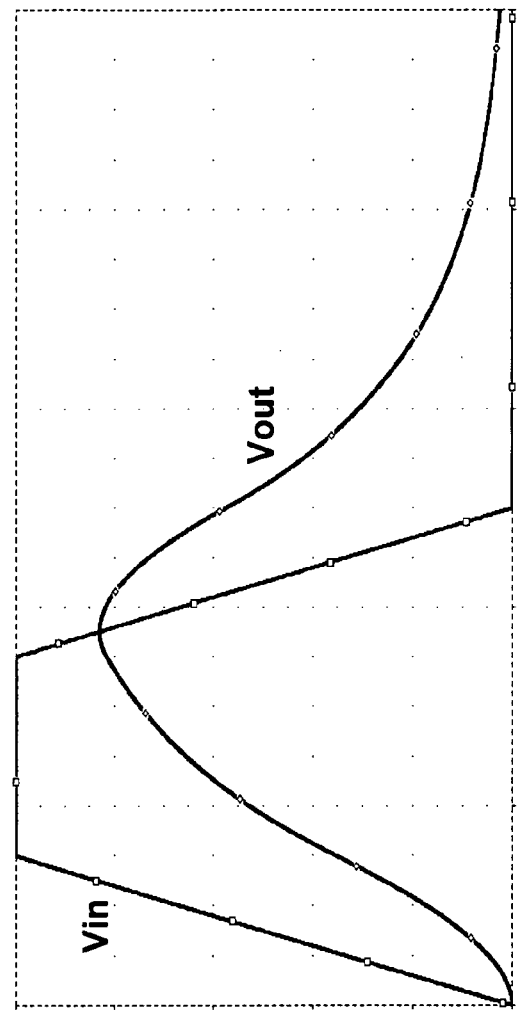
FIG. 10 shows simulation results of the RC circuit of FIG. 9.

The impact of the RC circuit of FIG. 9 on a pulse is seen from simulation results shown in FIG. 10. FIG. 10 shows two simulated wave forms, a trapezoid input pulse Vin, and an output pulse (Vout), that results from passing the trapezoid input pulse through the simple RC delay circuit of FIG. 9. The trapezoid input pulse (the signal Vin) is delayed and filtered (distorted) into the output signal Vout. The delay and the filtering action are clearly seen. While the delay is desirable, the filtering action causes dispersion and distortion of the pulse.

Figure 11:
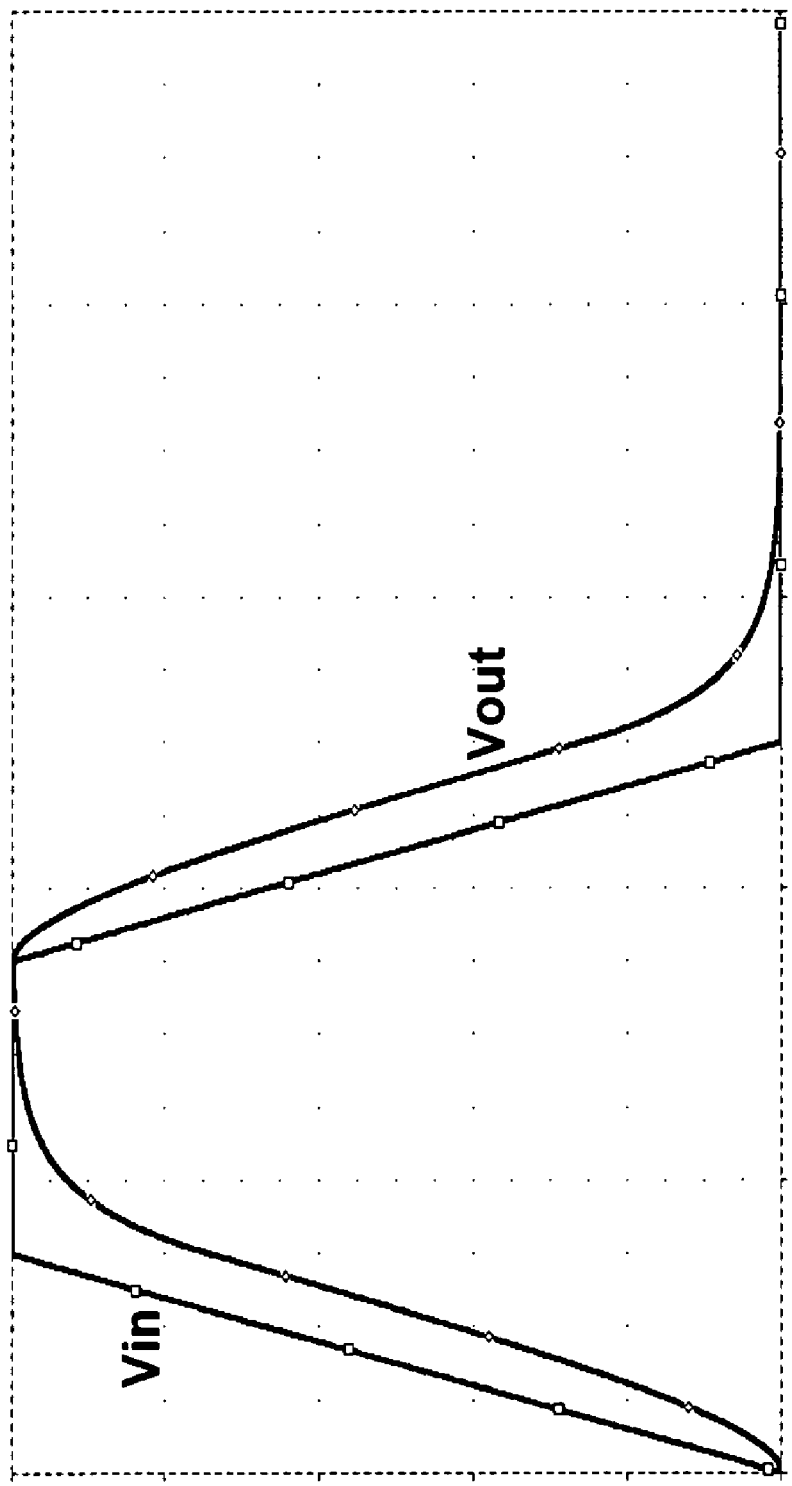
FIG. 11 shows simulation results of the RC circuit of FIG. 9 with a reduced time constant.

To reduce the filtering action of the circuit the RC time constant may be reduced. The simulated result is shown in FIG. 11. The simulation shown in FIG. 11 is analogous to the simulation shown in FIG. 10, but with a reduced time constant in the simulated delay circuit. Reducing the time constant helps to increase or maintain the bandwidth (note the slopes of both the input and output pulses) but as shown in FIG. 11 the signal delay introduced is lower.

In the simulation of FIG. 11 the pulse width is 0.7 second and the RC time constant in the circuit is 79 ms. The long pulse duration and the long RC time constant were chosen merely for convenience in the simulations to study the effects of circuit choices, and are not representative of the time scales of the embodiment.

Figure 12:
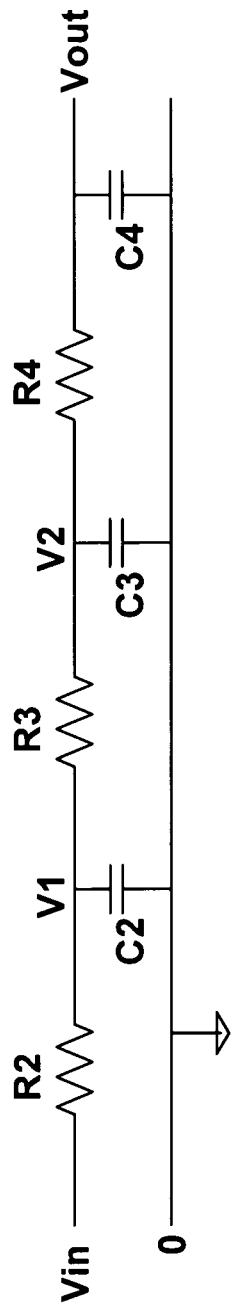
FIG. 12 shows a delay circuit made from a cascade of three RC stages.

One method of attempting to regain the delay (as shown in FIG. 10 with respect to the circuit of FIG. 9 with the original time constant) is to cascade a number of RC stages. This is shown in FIG. 12. Shown in FIG. 12 is a delay circuit made from a cascade of three RC stages, comprising the components R2, C2, R3, C3, R4, and C4, each RC stage having individually the same time constant of 79 ms. The signals after the first and second stages are labeled V1 and V2 respectively. The input and output of the circuit as a whole are labeled Vin and Vout.

Figure 13:
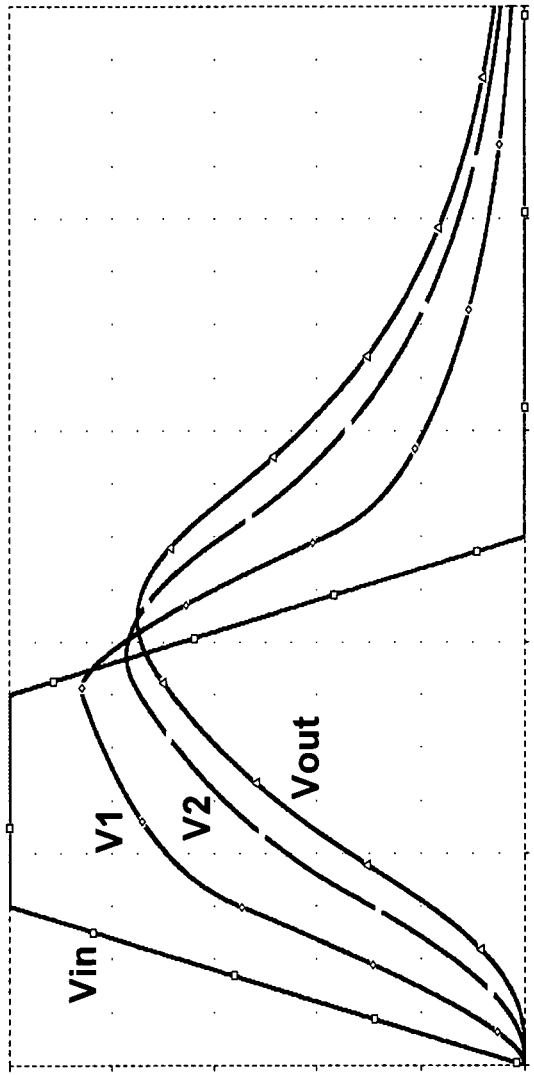
FIG. 13 shows the waveforms of the trapezoidal input pulse (Vin) and the waveforms of the delayed pulses after each stage of the circuit of FIG. 12.
Figure 14:
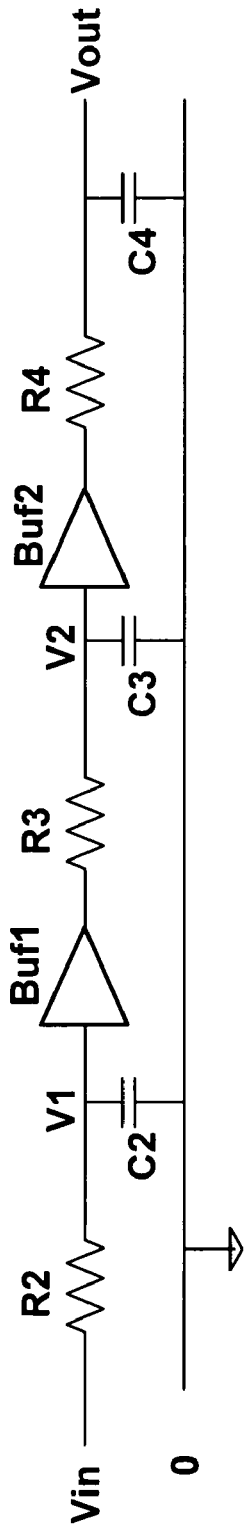
FIG. 14 shows the same cascaded delay circuit as in FIG. 12, with two buffers (amplifiers) added.

The result of simulating the circuit of FIG. 12 with a trapezoidal input pulse is shown in FIG. 13 which shows the waveforms of the trapezoidal input pulse (Vin) and the waveforms of the delayed pulses after each stage of the circuit of FIG. 12 (V1, V2, and Vout). The resulting final waveform Vout is delayed but it is considerable reduced in amplitude and dispersed. In order to remove the loading effect of subsequent stages, each stage may be buffered as shown in FIG. 14. Shown in FIG. 14 is the same cascaded delay circuit as in FIG. 12, but two buffers (amplifiers) are inserted, a buffer "Buf1" between R1 and R2, and a buffer "Buf2" between R2 and R3. As a result, the intermediate signals V1 and V2 are not attenuated by the loads of the subsequent stages.

Figure 15:
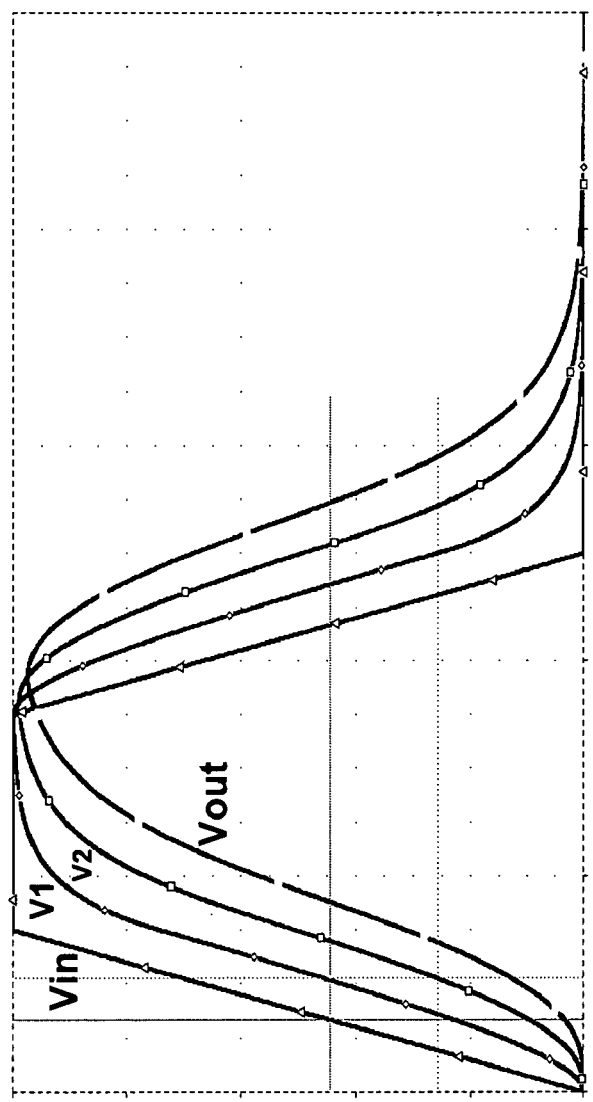
FIG. 15 shows simulation results of the circuit arrangement of FIG. 14.

The simulation results for the circuit of FIG. 14 are shown in FIG. 15. They show that the circuit arrangement of FIG. 14 achieves the desired goal of introducing significant delay while the distortion in the pulse is kept to a minimum. In this simulation, the 0.7 second trapezoidal input pulse is delayed by approximately 77 ms per stage.

In a mathematical sense, the pulse has been transformed by a cascade of single pole unity gain stages, the transfer function of each stage being;

$$H(s)=1/(1+s/p) \text{ where } p[\text{Rads}]=1/(RC)$$

or $p[\text{HZ}]$ is $1/(2\pi RC)$

The goal of the circuitry is to delay the pulse by up to about half the pulse width (bit width). In the case illustrated in the simulation of FIG. 15, the required delay would be approximately 0.35 seconds. To achieve this delay with the scheme shown in FIG. 14, this would require approximately five stages. In the simulation shown in FIG. 15 the RC time constant is set to 79 ms which sets the pole frequency at $1/(2\pi 79 \text{ ms})=2$ Hz. Thus, with a pulse width of 0.7 seconds (the input pulse Vin) a stage with a pole frequency of 2 Hz will produce suitable delays with acceptable filtering on the pulse. A simple approximation to calculate the position of the pole for a system with a bit rate of N bits per second (Nbps) is to set the pole in each stage at 3*N Hz. For example, with a data rate of 1 Gbps, a stage with a pole at approximately 3 GHz would be needed.

Figure 16:
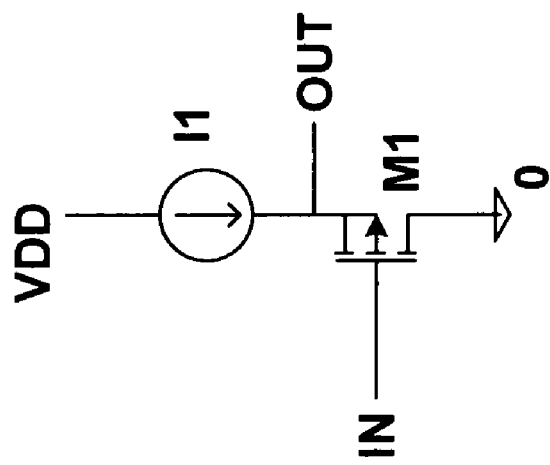
FIG. 16 shows a simple follower circuit.

Having shown how an appropriate delay per stage may be achieved using simple RC stages, it remains to be shown how a suitable buffer amplifier (Buf1, Buf2 in FIG. 12) may be constructed. To make a unity gain buffer with unity gain up to 3 GHZ is a challenge even on an advanced CMOS processes. A starting point would be to use a simple follower circuit as shown in FIG. 16. The simple follower circuit of FIG. 16 includes an N-channel MOS field-effect transistor (MOSFET) M1 connected in series with a current source I1. The drain of the transistor M1 is connected to ground (0), while the positive terminal of the current source I1 connects to the supply voltage VDD. The circuit input (IN) is connected to the gate of the transistor M1, and its source provides the circuit output (OUT).

Figure 17:
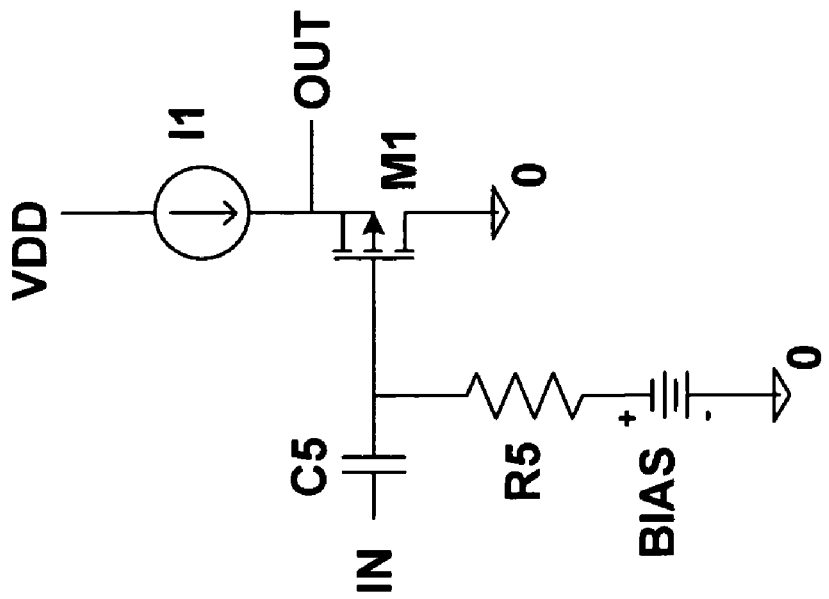
FIG. 17 shows an AC-coupled follower circuit, derived from the simple follower circuit of FIG. 16.

In this well-known circuit the output OUT follows the input IN with a gain of approximately one. The first limitation with this circuit is that the output is typically level shifted by 0.6 volts or so. This level shifting is a problem if a number of stages are to be cascaded because the successive level shifts will cause the output to rise to the supply voltage and thus the signal is clipped. To solve this limitation, AC-coupling is added to the simple follower as shown in FIG. 17. The circuit shown in FIG. 17 is an AC-coupled follower circuit, derived from the simple follower circuit of FIG. 16 by the addition of a capacitor C5 between the circuit input (IN) and the source of the transistor M1, and a resistor R5 between the source of the transistor M1 and a bias supply "BIAS" that provides a positive bias voltage.

With AC-coupling, the fact that the output of the stage is level shifted up from the bias level set by "BIAS" in FIG. 17 becomes unimportant when stages are cascaded, because this level shift is stored as a constant drop across the input capacitor of the next stage. This essentially resets the average input voltage at each stage to be the bias voltage set by the bias supply (BIAS) shown in FIG. 17.

A further limitation of this circuit comes from the non-zero output conductance of the transistor M1. The gain of the follower is given by gm1/(gm1+gds1). Here gm1 is the small signal transconductance and gds1 is the small signal output conductance of M1. Clearly, for all values of gds1 greater than zero the gain of the stage is less than one. When fast wideband circuits are required, the length of the MOSFET M1 is reduced to close to minimum. This causes gds1 to increase to a point where the gain is now tending to 0.9 or so. A cascade of these stages would dramatically reduce the magnitude of the incoming signal.

One possible architecture which corrects for this reduced stage gain is shown in FIG. 18 which illustrates a simplified block diagram of a buffered delay stage 400, which may be an embodiment of the delay unit 306 of the adjustable delay 300 (FIG. 6).

The buffered delay stage 400 comprises a unit gain amplifier (buffer) 404. The buffer 404, having an input 410 and an output 412.

The buffer 404 includes two amplifiers in parallel, a follower stage 414, having a gain of approximately 0.9 and a supplementary stage 416 with a gain of approximately 0.1, both amplifiers having the same frequency response (expressed mathematically by the pole $1/(1+s/p)$. Both amplifiers (414 and 416) share the input 410 of the buffer 404, and their outputs are summed into the output 412.

The buffered delay stage 400 provides an inherent delay (implicit in the poles p of the transfer functions), and by virtue of the amplifiers, provides the isolation from the next delay element in the cascade, as described earlier (FIG. 14). Note that in very high-speed operation, no explicit RC delay element is needed if the (by necessity limited) frequency response of the buffer 404 is designed to provide the required delay.

The buffered delay stage 400 receives the input signal VIN of the buffered delay stage 400 connected to the input 410 of the buffer 404; and the output 412 of the buffer 404 generates the output signal VOUT of the buffered delay stage 400.

Figure 19:
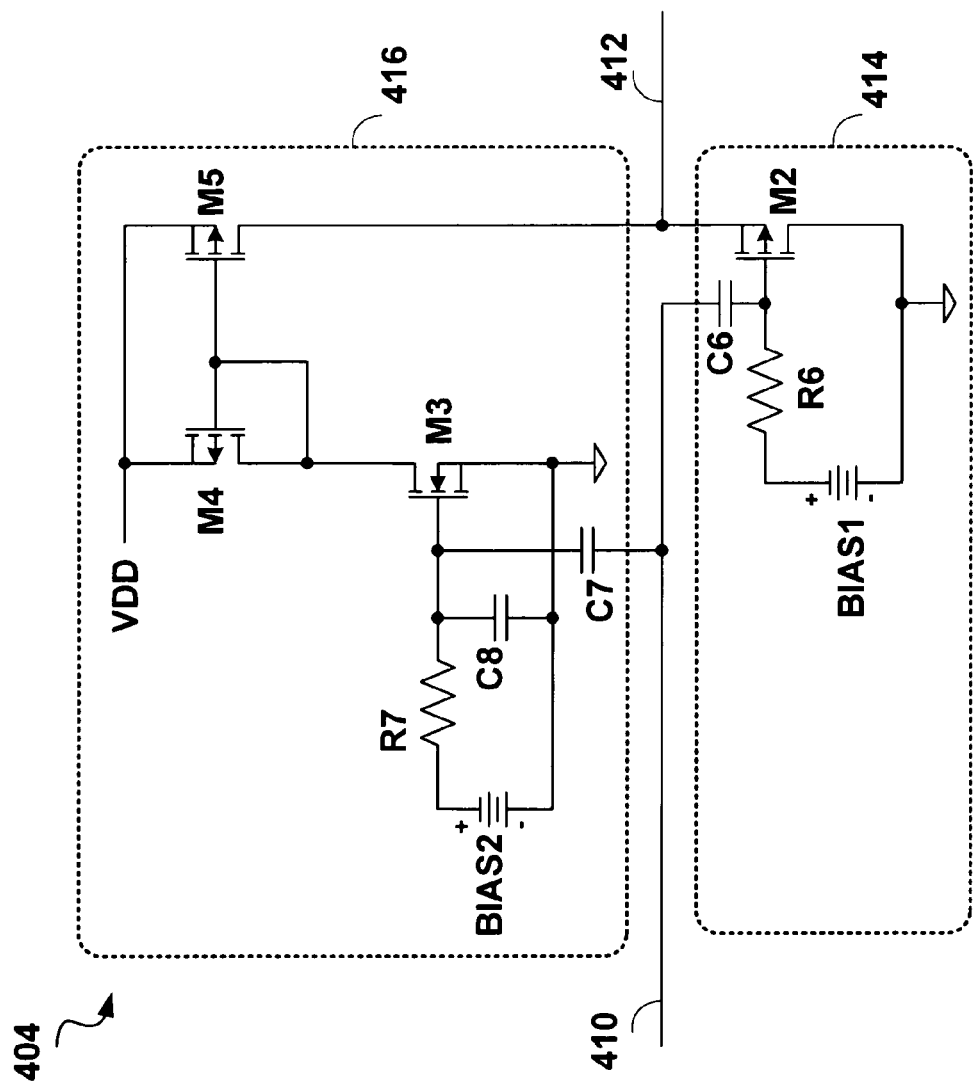
FIG. 19 shows the preferred embodiment of the buffer 404 of the buffered delay stage 400 of FIG. 18.

The preferred embodiment of the buffer 404 including its component amplifiers (the follower stage 414 and the supplementary stage 416), is shown in detail in FIG. 19, as a circuit based on an N-well CMOS process.

The follower stage 414 is an AC-coupled circuit, similar to the AC-coupled follower circuit of FIG. 17. It comprises a P-channel follower transistor M2, a biasing resistor R6, a coupling capacitor C6, and a bias supply "BIAS1".

The supplementary stage 416 includes a N-channel amplifying transistor M3, and two P-channel transistors M4 (functioning as a diode) and M5 (functioning as a current source); a biasing resistor R7; a coupling capacitor C7; a shunt capacitor C8; and a bias supply "BIAS2".

The bias voltages of "BIAS1" and "BIAS2" are adapted to the circuit functions and the technology as required.

The input 410 of the buffer 404 is connected through the coupling capacitor C6 to the gate of the transistor M2, and through the coupling capacitor C7 to the gate of the transistor M3. The positive terminal of the bias supply "BIAS1" is fed to the gate of the transistor M2 through the biasing resistor R6. Similarly, the positive terminal of the bias supply "BIAS2" is fed to the gate of the transistor M3 through the biasing resistor R7. The negative terminals of "BIAS1" and "BIAS2", the drain of the transistor M2, the source of the transistor M3, and one terminal of the shunt capacitor C8 are connected to ground. The other terminal of the shunt capacitor C8 is connected to the gate of the transistor M3. The source of the follower transistor M2 is connected to the drain of the current source transistor M5 and the output 412 of the buffer 404. The drains of the transistors M3 and M4 are connected together, and also to the gate of the transistor M4. The sources of the transistors M4 and M5 are connected to the supply voltage VDD.

Functionally, the signal of the input 410 of the buffer 404 is amplified by the follower stage 414 with a gain of about 0.9, the transistor M5 (in the supplementary stage 416) providing a current source load to the follower transistor M2. The function of the supplementary stage 416 is to amplify a portion of the same input signal (the portion being defined by the ratio of the coupling capacitor C7 to the shunt capacitor C8) in the transistor M3 into a varying current that is mirrored through the transistors M4 and M5, and so providing a varying current source load to the follower transistor M2. Thus, both the follower stage 414 and the supplementary stage 416 contribute to the signal at the output 412 of the buffer 404, their individual contributions effectively being added as indicated in FIG. 18 above.

The gain of the P-channel follower circuit (414) is essentially unity except for the output conductance (gds) of the P-channel device (M2). Because of the requirement for speed a short P-channel device is required and thus the device has a large output conductance and the gain falls toward 0.9. With a cascade of 5 stages the signal would have fallen to 60% of its original value. To boost the gain of the simple follower at channel data rates, the parallel signal path is provided in the form of the supplementary stage 416.

As described above, the buffer 404 includes a second path (the supplementary stage 416) for the input signal (410) to arrive at the output 412. This extra path is through C7, M3, M4, and M5. In this path, the high frequency input signal is passed though C7 and a fraction of the signal is presented at the gate of M3. This fraction is changed by changing the size of the shunt capacitor C8. The current in M3 is set to a nominal value with a bias circuit ("BIAS2"). When the input signal arrives at the gate of M3 it varies the current in M3. This current variation is sourced by the diode connected device (M4) which then mirrors the current change to M5. Finally M5 changes the current in M2 so the end result is that changing the input signal changes the current in M2. Changing the current level in M2 changes the overdrive in the device and thus changes the output voltage. In summary a positive change at the input 410 causes a positive change at the output 412 due to current steering in the parallel path. At the same time there is a positive change at the output due to the simple follower action through M2. The overall change in the output is calculated by summing the contributions from the Parallel (supplementary stage 416) and Main (follower stage 414) paths. If the main path is producing a gain of 0.9 the parallel path may be tuned to provide a gain of 0.1 by changing the value of C8. Once adjusted to unity, the gain of the stage remains stable over Process, Supply Voltage, and Temperature to within about two percent of its nominal value. The buffer circuit 404 of FIG. 19 meets the following requirements.

An overall gain of unity and thus cascading does not amplify or reduce the signal;

Capable of very wideband operation (pole at 2 GHz to 10 GHz) for minimal distortion; and Input and Output levels of a cascade of stages stay within a suitable range.

Some typical values for the implementation of the buffer 404 are: R6=200 k, R7=200 k, C6=200 f, C7=200 f, C8 is tuned to adjust the overall gain of the circuit to unity.

An embodiment of the buffer, equivalent to the buffer circuit 404 shown in FIG. 19, may be created by starting with a simple N-channel follower (instead of the P-channel follower of FIG. 16, that has led to the complete buffer implementation shown here in FIG. 18). The simple N-channel follower is shown in FIG. 20.

Figure 20:
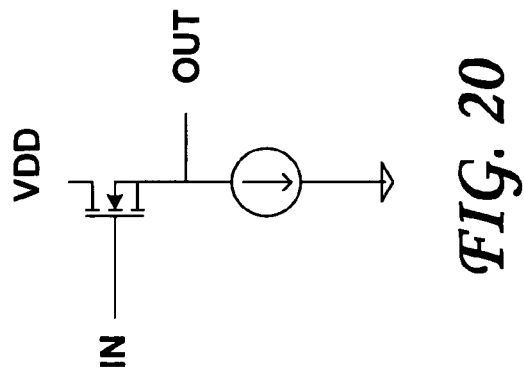
FIG. 20 shows a simple N-channel follower.

For a CMOS process with a P-Well technology the configuration shown in FIG. 19 would be the preferred implementation in that the bulk of the N-channel Mosfet would be free to be tied to the source as shown in FIG. 20. For the more standard CMOS processes with N-Well technology the circuit of the buffer of FIG. 19 would cause additional challenges because the bulk connection on the N-channel MOSFET is tied to ground. This grounded bulk causes a varying source-to-bulk potential in the transistor and further degrades the gain of the stage from 0.9 and this reduced gain makes it more difficult to maintain the overall gain of the stage at unity.

Figure 21:
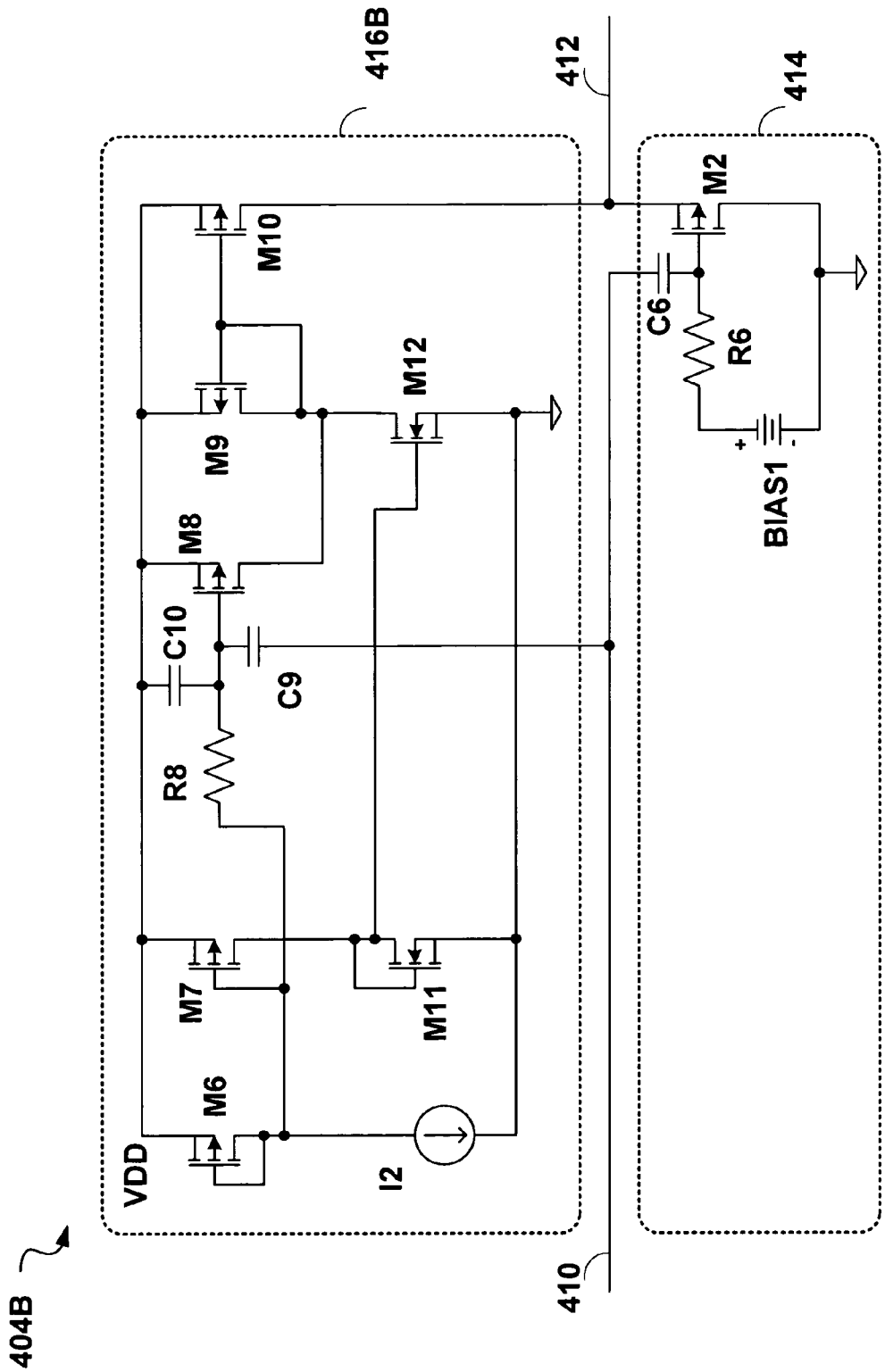
FIG. 21 shows an alternative embodiment 404B of the delay stage 306.

An alternative configuration for making the buffer stage for the delay stage 306 is shown in FIG. 21, which shows a modified buffer 404B. The modified buffer 404B is similar to the buffer 404 and also uses two parallel paths for the input (410) to output (412) signal, i.e. the follower stage 414 and a modified supplementary stage 416B. The modified supplementary stage 416B performs the same function as the supplementary stage 416, but is implemented somewhat differently.

The supplementary stage 416B comprises five N-channel transistors (M6, M7, M8, M9, and M10) and two P-channel transistors (M11, M12), a biasing resistor R8, a coupling capacitor C9, a shunt capacitor C10, and a current sink 12.

The components of the supplementary stage 416B are variously connected to each other, ground, and VDD as listed in the following:

the sources of the N-channel transistors (M6 to M10) and one lead of the shunt capacitor C10 are connected to VDD;

the sources of the P-channel transistors (M11 and M12) as well as the negative terminal of the current sink 12 are connected to ground;

the transistors M6, M9, and M11 are each connected in diode mode, i.e. their gates are shorted to their drains;

the drain/gate of the transistor M6 is connected to the positive terminal of the current source 12, the gate of the transistor M7, and through the biasing resistor R8 to the gate of the transistor M8;

the drain of the transistor M7 is connected to the drain/gate of the transistor M11 and to the gate of the transistor M12;

the gate of the transistor M8 is further connected to the shunt capacitor C10, and through the coupling capacitor C9 to the input signal (410);

the drain of the transistor M8 is connected to the drain/gate of the transistor M9, to the gate of the transistor M10, and the drain of the transistor M12; and lastly the drain of the transistor M10 is connected to the drain of the transistor M2 of the follower stage 414 as well as the output 412.

In this configuration (the supplementary stage 416B), the circuitry formed by the current sink 12 and the transistor M6 provides a bias voltage from which, through the resistor R8 the operating point of the transistor M8 is set; and further, through the current mirror formed by M11 and M12, the current drawn by the transistors M8 and M9 is set.

The input signal (410) fed through the coupling capacitor C9 to the gate of the transistor M8 modifies the current in the transistor M8 and thus modifies the current in the transistor M9 (the current in M9 is the difference between the constant current set in M12 and the signal dependent current in M8), and consequently the current in the transistor M10 due to the mirroring of M9 and M10. The variation of current in the transistor M10, which is in series with the transistor M2 in the follower stage 414, has the same effect as that described earlier for the variation in the equivalent transistor M5 of the original supplementary stage 416.

Again, a configuration similar to the circuitry of the buffer 404B may be produced if one starts with an N-channel follower as shown in FIG. 20 above.

Equalization Circuit 112

The output of the cable shows a low pass filtered response and thus there is significant distortion to the incoming signal. The challenging features of the distorted signal are reduced rise times and the fact that a single data bit change does not cause the signal to traverse the signal range.

Figure 1A:
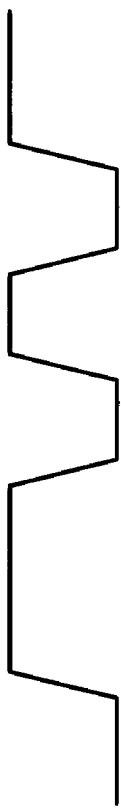
FIGS. 1A-1C illustrate a high-speed signal to be transmitted through the high-speed cable, a distorted bandwidth-limited signal received at the end of the cable (before equalization), and the received signal after equalization respectively.
Figure 1B:
Figure 1C:
Figure 22:
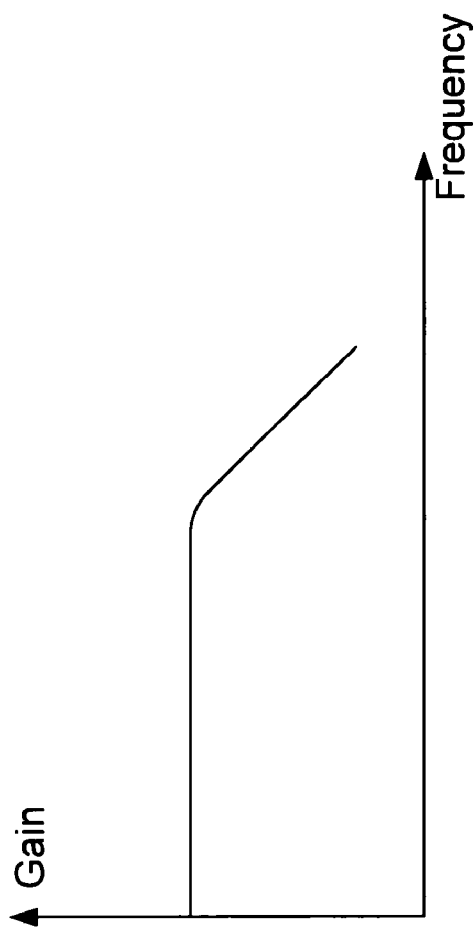
FIG. 22 shows a simplified transfer function of a cable.

Typical waveforms at the input and the output of a cable have been shown in FIGS. 1A and 1B above, for illustration of this common problem. The limited bandwidth of the cable suppresses the high frequency components of the data signal. A simplified transfer function of a cable is illustrated in FIG. 22 to show the reduction in gain at high frequencies.

Figure 23:
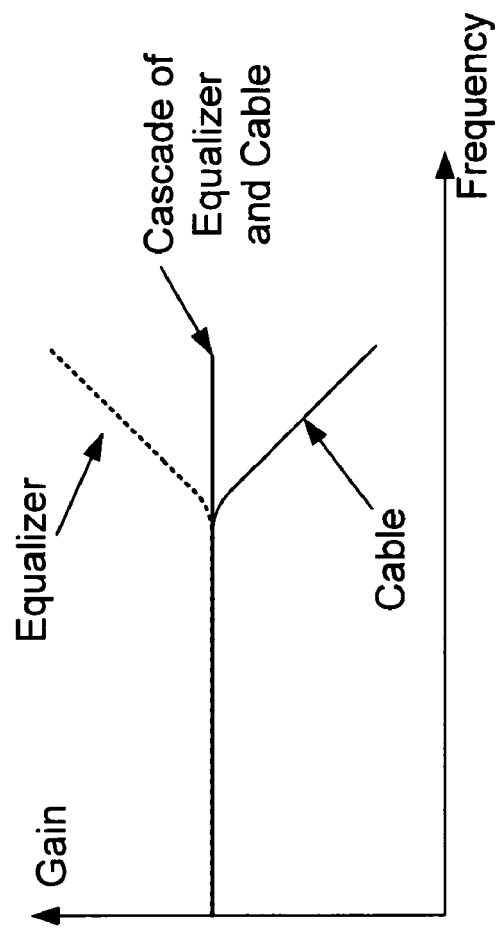
FIG. 23 shows a simplified transfer function of a cascade of an equalizer and a cable.

The high frequency suppression is conventionally solved by placing an equalizer in the cable (or in the receiver). The equalizer provides an increased gain at the higher frequencies so the cascading of the transfer functions results in a flat unity gain transfer function over the frequencies of interest as shown in FIG. 23.

Such an existing approach to solving the problem is described, e.g. in a U.S. Pat. No. 6,819,166. This existing implementation describes an equalizer with a variable transfer function, and a method of detecting the level of high frequency suppression in the cable such that the equalizer can be tuned to accurately offset the impact of this.

In the embodiment of the present invention, a tunable equalizer is provided in the Equalization circuit 112 (FIG. 6). Instead of providing infinitely variable equalization, a finite number of discrete settings are implemented, which may be selected under control of the equalization parameter input 128.

Figure 24A:
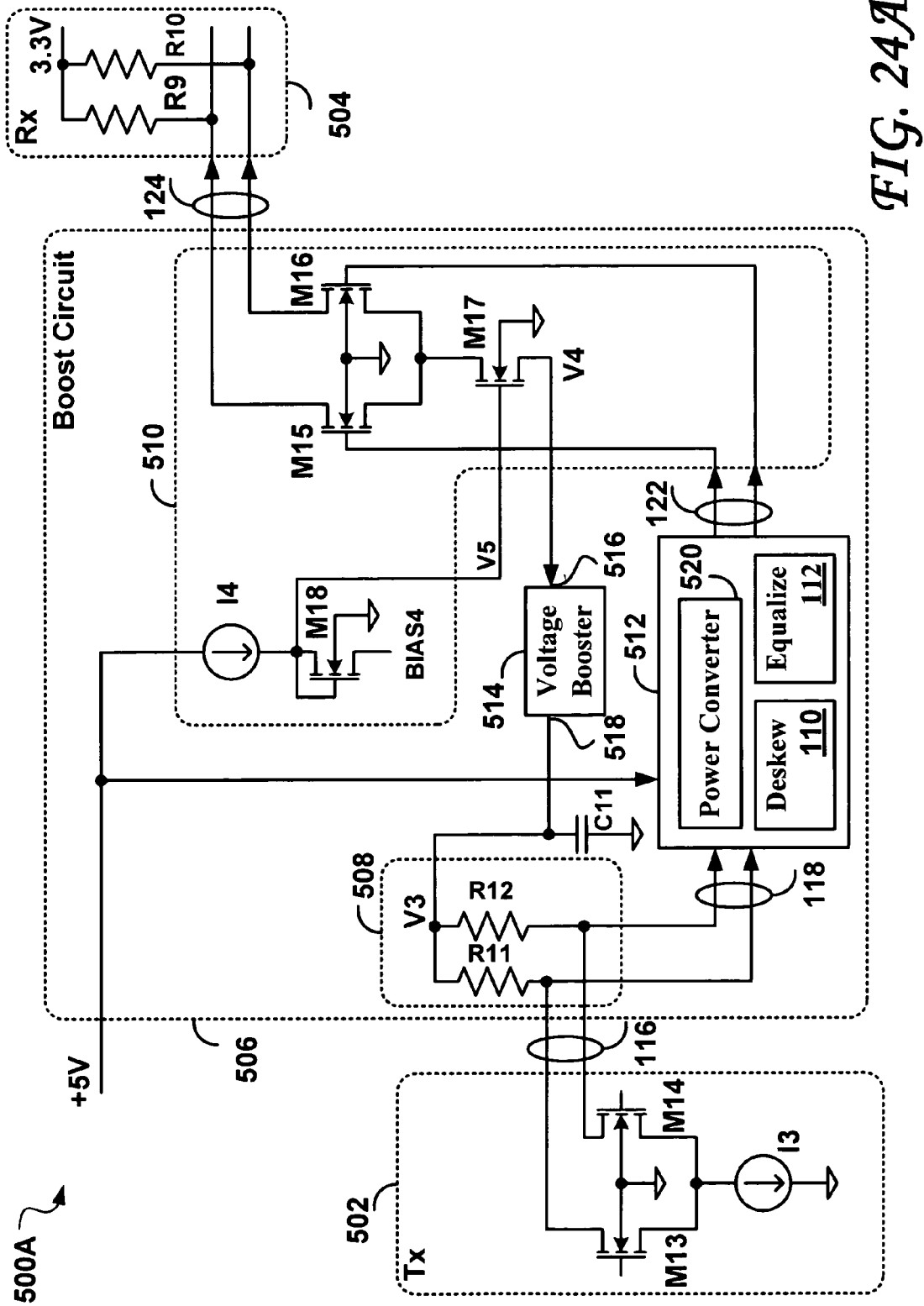
FIG. 24A shows a first system diagram 500A of a representative channel 500, including an optional voltage booster 514, and a power converter 520.

FIG. 24A shows a system diagram 500A of a representative channel 500 that includes a typical differential driver circuit 502 as may be found in the HDMI Source Device (Tx) of FIG. 4; a typical differential termination circuit 504 as may be found in the HDMI Sink Device (Rx) of FIG. 4; and a boost circuit 506. The boost circuit 506 is a more detailed depiction of an implementation of the boost circuit 100 of FIG. 6 according to the preferred embodiment of the invention.

The typical differential driver circuit 502 is conventional and comprises a differential pair of N-channel MOSFETs (metal-oxide-semiconductor field-effect transistor) M13 and M14 and a current source 13. The sources of the transistors M13 and M14 are tied together and connected to the common ground through the current source 13 which is adjusted to supply a current of approximately 10 mA in accordance with the HDMI specification. The gates of the transistors M13 and M14 are driven with a differential signal (not shown) which may be one of the TMDS data signals if the channel 500 is a TMDS data channel, or the clock signal if the channel 500 is the clock channel. The output of the typical differential driver circuit 502 is the raw input signal (pair) 116 of the boost circuit 100 of FIG. 6, embodied in the boost circuit implementation 506.

The typical differential termination circuit 504 comprises two resistors (R9 and R10, typically each having a value of 50 Ohm) which are tied to a supply voltage (typically 3.3V) that is internal to the HDMI sink device. The input of the differential termination circuit 504 (signal ends of the resistors R9 and R10) is the "boosted signal" (pair) 124 which is also the output of the boost circuit 100 of FIG. 6, embodied in the boost circuit implementation 506.

Not shown in FIG. 24A is the basic (passive) HDMI cable 40 that carries the raw input signal (pair) 116 from the typical differential driver circuit 502 to the boost circuit 100 (506).

By way of explaining the operation of the representative channel 500, let us first consider the case without the boost circuit 506, corresponding to the previously shown prior art diagram of FIG. 3.

In this prior art case, the output of the typical differential driver circuit 502 (the raw input signal 116) would be connected to the input (124) of the typical differential termination circuit 504, directly through the basic HDMI cable. A current, its magnitude determined by the current source 13 (10 mA), flows from the supply voltage 3.3V through one or the other of the resistors R9 and R10; over the corresponding one or the other conductor of the differential pair (116 and 124); through one or the other of the transistors M13 and M14 (of which one is switched on while the other is switched off by the differential signal); and through the current source 13 to ground. Which of the one or other of resistors, conductors, and transistors, is determined by the state of the differential signal. A logical "0" signal may cause substantially all of the current to flow through the transistor M13 and the resistor R9 while a logical "1" would cause the current to flow through M14 and R10. As a result, the voltages at the signal ends of the termination resistors may vary between 3.3V and 2.8V, presenting thus a differential signal of about +/−0.5V. In practice, the differential signal may be lower due to loss in the cable and loading at the termination.

It is a function of the boost circuit 506 according to the invention, to mimic the behavior of the typical differential termination circuit 504 at the input of the boost circuit 506, and the behavior of the typical differential driver circuit 502 at its output.

The boost circuit 506 shown in FIG. 24A includes an HDMI input circuit 508 (showing a detailed implementation of the HDMI input circuit 106 of FIG. 6), an HDMI output circuit 510 (showing a detailed implementation of the HDMI output circuit 108 of FIG. 6), and a processing block 512 that includes the Differential Deskew circuit 110 and the Equalization circuit 112 of FIG. 6.

The boost circuit 506 may further include an optional Voltage Booster 514 with an input 516 and an output 518. When the optional Voltage Booster 514 is not provided, it is simply bypassed, that is the input 516 is directly connected to the output 518.

The HDMI input circuit 508 is very similar to the typical differential termination circuit 504, including two 50 Ohm resistors R11 and R12, tied to a supply voltage V3, and having signal ends that are connected to the raw input signal 116. The differential voltage signal that develops by virtue of a switched current alternating through the resistors R11 and R12 is simply connected as the "recovered signal" 118 to the input of the Deskew Circuit 110 in the processing block 512 (see also FIG. 6). The supply voltage V3 is supplied by a filter capacitor C11 that is connected to the output 518 of the optional Voltage Booster 514.

The processing block 512 receives the "recovered signal" 118 from the HDMI input circuit 508 and, after processing the signal in the Differential Deskew circuit 110 and the Equalization circuit 112, outputs the "equalized signal" 122. Power is provided to the processing block from the +5V supply. The processing block 512 also includes a Power Converter 520 which may be used to efficiently convert the supplied power of +5V to a lower voltage that is then supplied to the Differential Deskew circuit 110 and the Equalization circuit 112.

The HDMI output circuit 510 has some similarity with the typical differential driver circuit 502. The HDMI output circuit 510 comprises N-channel MOSFETs M15 and M16 (or alternatively, P-channel MOSFET M15 and M16) which are analogous to the transistors M13 and M14 of the typical differential driver circuit 502. The sources of the transistors M15 and M16 are tied together (thus forming a transistor pair) and connected to the drain of an N-channel MOSFET M17. The gates of the transistor pair M15 and M16 are connected to the "equalized signal" pair 122. The drains of the transistor pair M15 and M16 are connected to, and drive, the differential "boosted signal" (pair) 124 that is connected to the typical differential termination circuit 504 in the HDMI sink (Rx).

The HDMI output circuit 510 further includes an N-channel MOSFET M18 and a current source 14. The transistor M17, whose drain is connected to the sources of the transistor pair M15 and M16, has its source connected to a voltage node V4. The gate of the transistor M17 is connected to a node V5 that connects the gate and the drain of the transistor M18 and the negative terminal of the current source 14 whose positive terminal is connected to the +5V supply. The source of the transistor M18 is connected to a bias voltage node "BIAS4". In effect, the transistor M18 is configured as a diode between the BIAS4 and the negative terminal of the current source 14, providing the voltage V5 to the base of the transistor M17 such that the resulting voltage V4 at the source of the transistor M17 mirrors the BIAS4 voltage.

In FIGS. 24B to 24E are illustrated second to fifth system diagrams 500B to 500E of a representative channel 500, including Simplified Boost Circuits 506B to 506E respectively, according to alternative embodiments of the invention.

The Simplified Boost Circuits 506B to 506E have in common with the Boost Circuit 506 the HDMI input circuit 508 and the HDMI output circuit 510.

The Simplified Boost Circuits 506B to 506E differ from the Boost Circuit 506 in the way power is harvested from the signals of the cable, and the way power provided to components of the boost circuit. In addition, the Simplified Boost Circuits 506B to 506E differ from the Boost Circuit 506 in that the Processing Block 512 of the Boost Circuit 506 is replaced with a Simplified Processing Block 512B, where the Simplified Processing Block 512B is simplified in comparison with the Processing Block 512 in not requiring the Power Converter 520. The Simplified Boost Circuits 506B to 506E differ from each other in the way the supply voltages V3 and V4 are generated. But in all versions of the Simplified Boost Circuit (506B to 506E), the supply voltage V3 is also to the filter capacitor C11 and supplies power to the HDMI input circuit 508, and the supply voltage V4 supplies power to the Simplified Processing Block 512B. The supply voltage V4 is connected to a filter capacitor C11B.

The function of each of the Simplified Boost Circuits 506B to 506E is equivalent to that of the Boost Circuit 506 of FIG. 24A, i.e. to mimic the behavior of the typical differential termination circuit 504 at the input of the (Simplified) Boost Circuit, and the behavior of the typical differential driver circuit 502 at its output.

Furthermore, in each of the Simplified Boost Circuits 506B to 506E the Simplified Processing Block 512B receives the "recovered signal" 118 from the HDMI input circuit 508, processes it in the optional Differential Deskew circuit 110 and in the Equalization circuit 112. The Simplified Processing Block 512B then outputs the "equalized signal" 122 to the HDMI output circuit 510.

Detailed descriptions of the circuit blocks (508, 510, 512/512B) that are unchanged in the Simplified Boost Circuits 506B to 506E compared to the Boost Circuit 506, are omitted in the interest of economy.

Figure 24B:
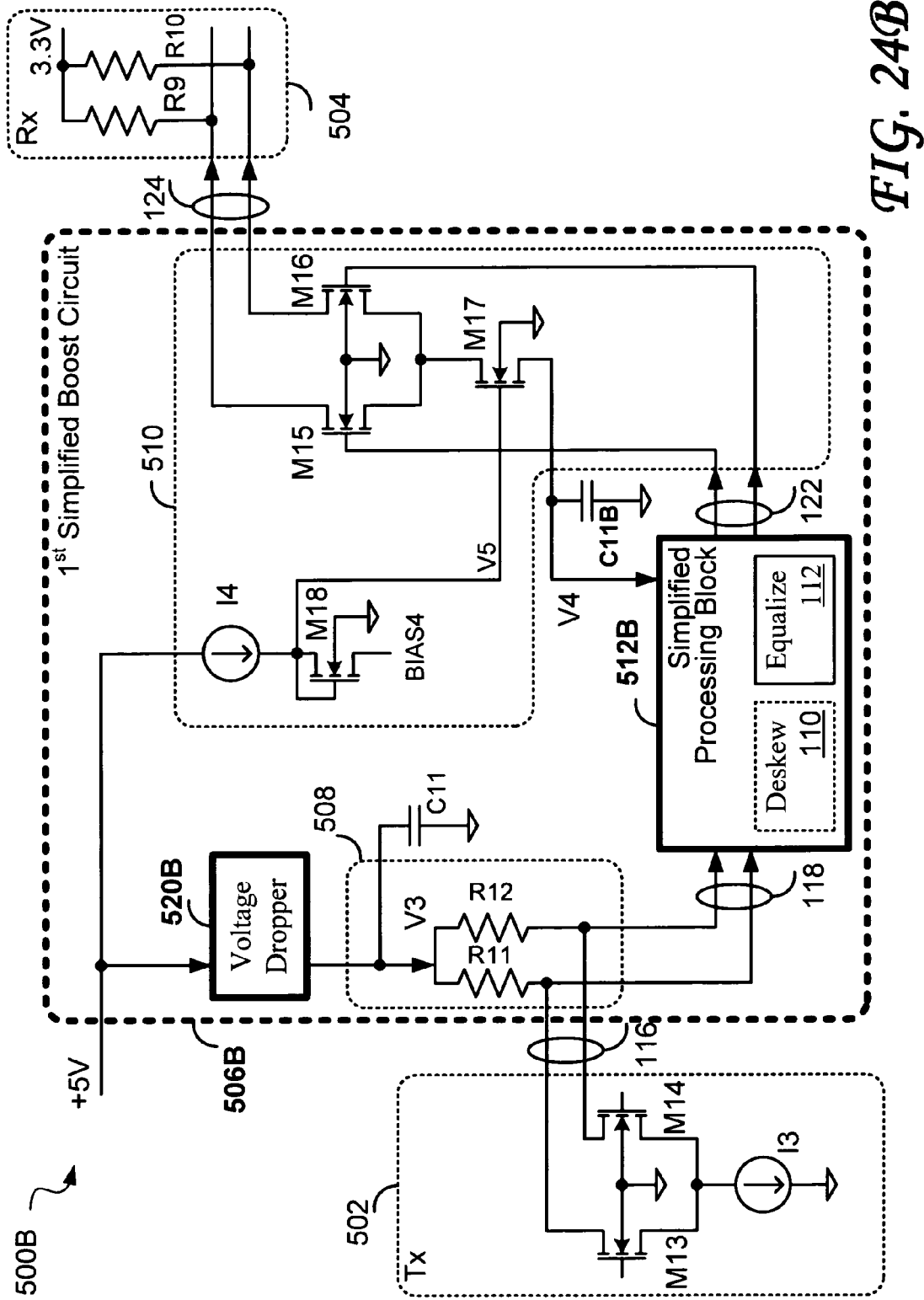
FIG. 24B shows a second system diagram 500B of a representative channel 500, including a First Simplified Boost Circuit 506B according to an alternative embodiment of the invention.

FIG. 24B shows specific details of the second system diagram 500B, which includes the First Simplified Boost Circuit 506B wherein the supply voltage V3 is generated by the Voltage Dropper Circuit 520B and the supply voltage V4 is harvested from the differential "boosted signal" (pair) 124 by the HDMI output circuit 510.

One terminal of the Voltage Dropper Circuit 520B is connected to the +5V supply, the other terminal providing the supply voltage V3 and thus provides power to the HDMI input circuit 508. The Voltage Dropper Circuit 520B may conveniently be implemented by means of series connected diodes, thus "dropping" the voltage from 5V (the +5V supply) to approximately 2.5V at the supply voltage node V3. Alternatively, the Voltage Dropper Circuit 520B may be realized as a switched capacitor DC/DC converter which may be preferred because it is more efficient than a simple diode circuit. Details of alternative implementations of the Voltage Dropper Circuit 520B are shown in FIGS. 27B and 27C below.

The Simplified Processing Block 512B is powered from the voltage V4 that arises at the source of the transistor M17 of the HDMI output circuit 510 in the same way as in the Boost Circuit 506 already described.

By selecting the bias voltage BIAS4 at the source of the transistor M18 of the HDMI output circuit 510, a value of the supply voltage V4 in the range of 1.2 to 2.0V may be adjusted. Since V4 is the supply voltage for the Deskew and Equalization circuits 110 and 112 respectively in the Simplified Processing Block 512B, a value for V4 in this range may be selected in accordance with the requirement of the circuit technology.

The HDMI output circuit 510 of the First Simplified Boost Circuit 506B thus provides the means for: boosting the differential data signals: presenting the proper output impedance for connection of the differential "boosted signal" (pair) 124 to the typical differential termination circuit 504 in the HDMI sink (Rx); as well as supplying the electrical power for the Simplified Processing Block 512B at the voltage node V4.

Figure 24C:
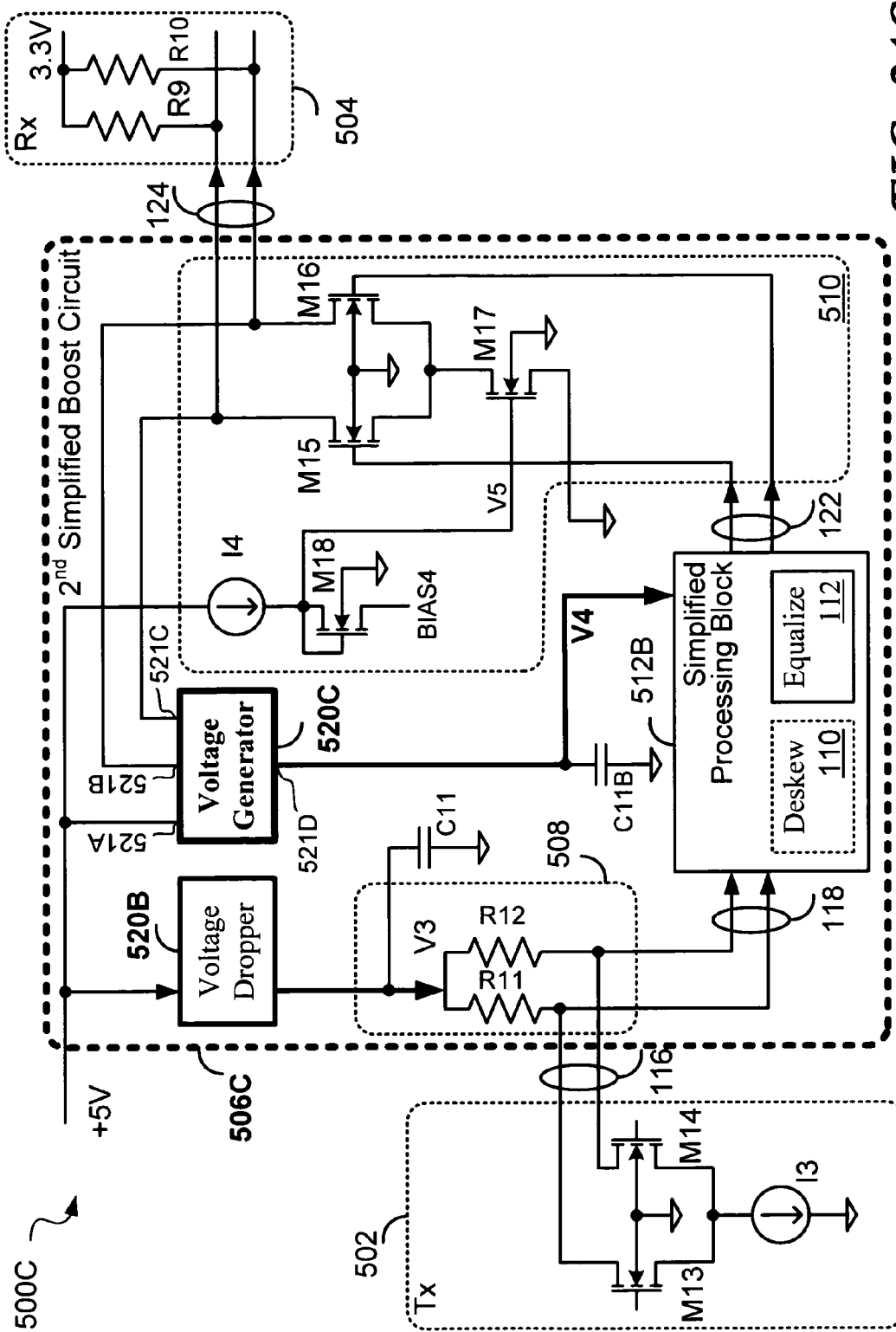
FIG. 24C shows a third system diagram 500C of a representative channel 500, including a second Simplified Boost Circuit 506C according to a further alternative embodiment of the invention.

FIG. 24C shows specific details of the third system diagram 500C, which includes the Second Simplified Boost Circuit 506C wherein the supply voltage V3 is generated by the Voltage Dropper Circuit 520B and the supply voltage V4 is harvested from the signal the differential "boosted signal" (pair) 124 by a Voltage Generator 520C.

One terminal of the Voltage Dropper Circuit 520B is connected to the +5V supply, the other terminal providing the supply voltage V3 and thus provides power to the HDMI input circuit 508. Details of alternative implementations of the Voltage Dropper Circuit 520B are shown in FIGS. 27B and 27C below.

The Voltage Generator 520C includes a 5V terminal 521A which is connected to the 5V supply (in the cable); a pair of boosted signal terminals 521B and 521C which are connected to the differential "boosted signal" (pair) 124; and a generated voltage output terminal 521D from which the supply voltage V4 is obtained. Details of an implementation of the Voltage Generator 520C are shown in FIG. 27D below.

The Simplified Processing Block 512B is powered from the supply voltage V4 that is generated by the Voltage Generator 520C.

The bias voltage BIAS4 at the source of the transistor M18 of the HDMI output circuit 510 is set to 0V (i.e. ground), and the source of the transistor M17 is also grounded. As a result, the transistor pair M17 and M18 acting as a simple current mirror, the HDMI output circuit 510 continues to be the means for providing the amplification (boosting) function and presenting the proper output impedance for connection of the differential "boosted signal" (pair) 124 to the typical differential termination circuit 504 in the HDMI sink (Rx), but it is no longer used to harvest power.

Figure 24D:
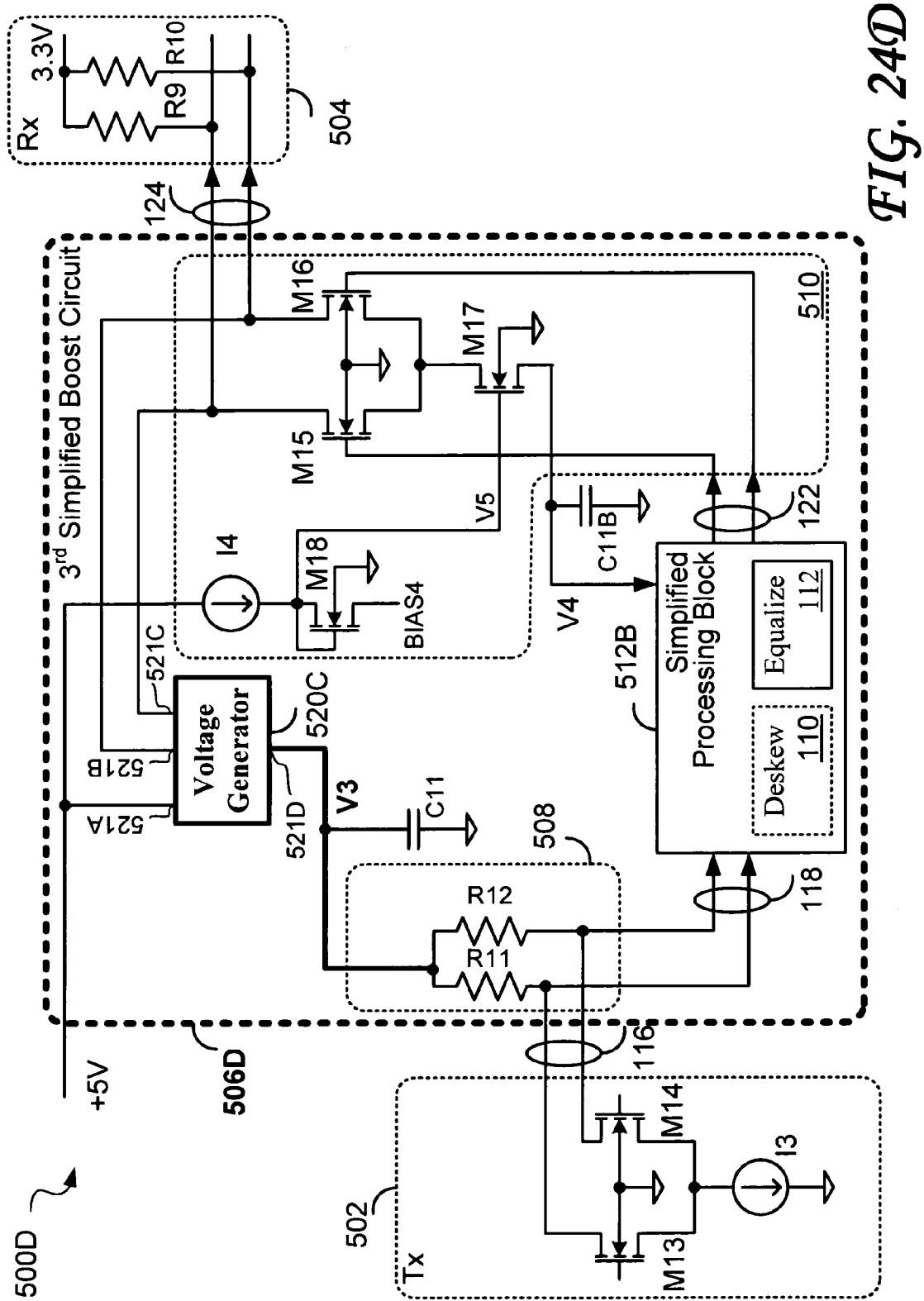
FIG. 24D shows a fourth system diagram 500D of a representative channel 500, including a third Simplified Boost Circuit 506D according to an another alternative embodiment of the invention.

FIG. 24D shows specific details of the fourth system diagram 500D, which includes the Third Simplified Boost Circuit 506D wherein the supply voltage V3 is harvested from the signal the differential "boosted signal" (pair) 124 by the Voltage Generator 520C, and the supply voltage V4 is harvested from the differential "boosted signal" (pair) 124 by the HDMI output circuit 510.

The Simplified Processing Block 512B is powered from the voltage V4 that arises at the source of the transistor M17 of the HDMI output circuit 510 in the same way as in the First Simplified Boost Circuit 506B already described.

By selecting the bias voltage BIAS4 at the source of the transistor M18 of the HDMI output circuit 510, a value of the supply voltage V4 in the range of 1.2 to 2.0V may be adjusted. Since V4 is the supply voltage for the Deskew and Equalization circuits 110 and 112 respectively in the Simplified Processing Block 512B, a value for V4 in this range may be selected in accordance with the requirement of the circuit technology.

The HDMI output circuit 510 of the Third Simplified Boost Circuit 506D thus provides the means for: boosting the differential data signals: presenting the proper output impedance for connection of the differential "boosted signal" (pair) 124 to the typical differential termination circuit 504 in the HDMI sink (Rx); as well as supplying the electrical power for the Simplified Processing Block 512B at the voltage node V4.

Figure 24E:
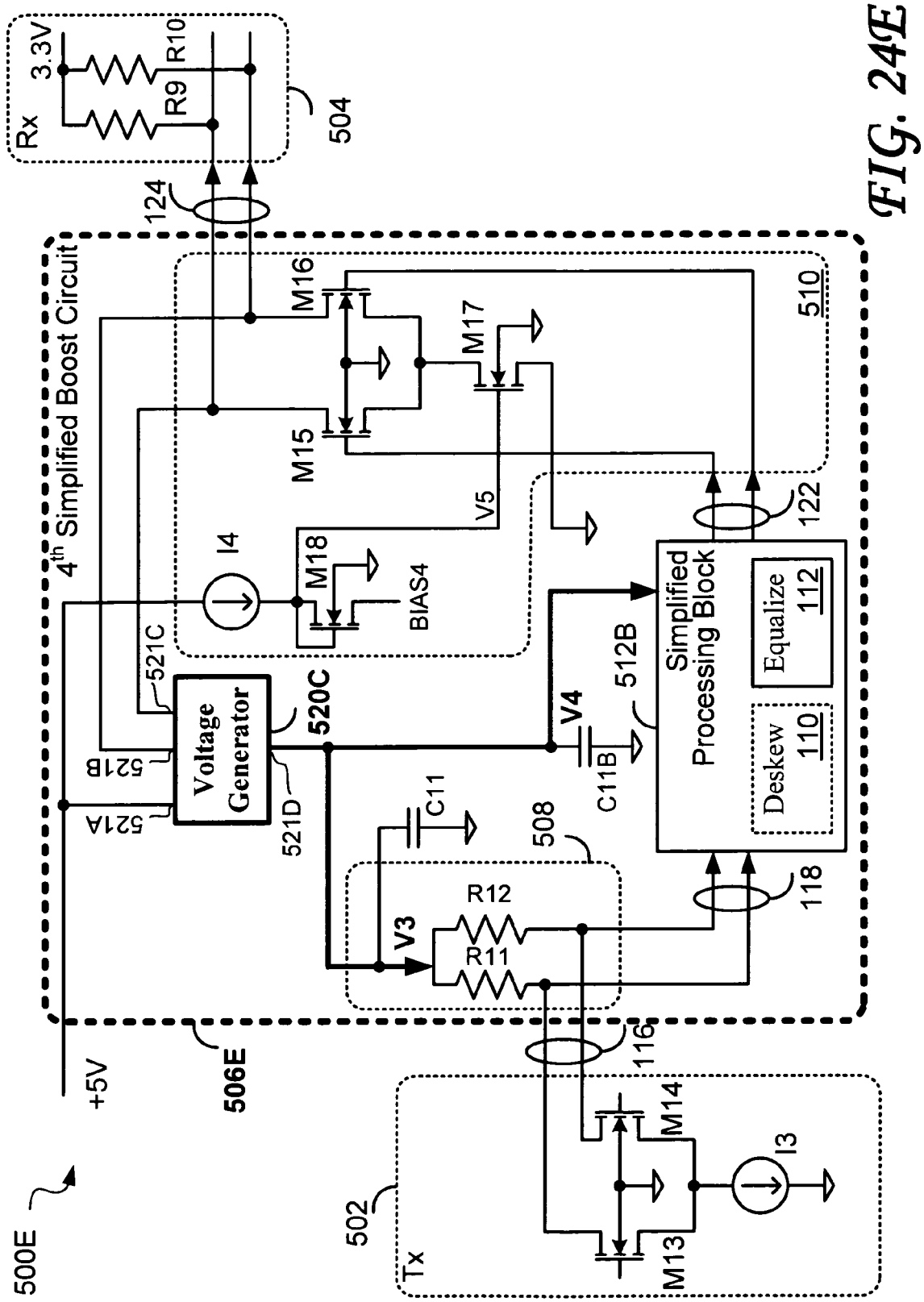
FIG. 24E shows a fifth system diagram 500E of a representative channel 500, including a fourth Simplified Boost Circuit 506E according to a yet another alternative embodiment of the invention.

FIG. 24E shows specific details of the fifth system diagram 500E, which includes the Fourth Simplified Boost Circuit 506E wherein both, the supply voltage V3 and the supply voltage V4, are harvested from the signal the differential "boosted signal" (pair) 124 by the Voltage Generator 520C, the same voltage being supplied to the HDMI input circuit 508 and the Simplified Processing Block 512B. A voltage range for V3 (to supply the HDMI input circuit) of 1.5 to 2.5 V may be appropriate considering the HDMI specification, while a lower voltage range may be more appropriate for V4, as determined by design considerations and the technology used in the Simplified Processing Block 512B. These ranges overlap, and a common voltage in the range of 1.5 to 2.0 may be selected for V3=V4, to be generated by the Voltage Generator 520C in the Fourth Simplified Boost Circuit 506E.

The bias voltage BIAS4 at the source of the transistor M18 of the HDMI output circuit 510 is set to 0V (i.e. ground), and the source of the transistor M17 is also grounded. As a result, the transistor pair M17 and M18 acting as a simple current mirror, the HDMI output circuit 510 continues to be the means for providing the amplification (boosting) function and presenting the proper output impedance for connection of the differential "boosted signal" (pair) 124 to the typical differential termination circuit 504 in the HDMI sink (Rx), but it is no longer used to harvest power. Simplified copies of the first to fifth system diagrams 500A to 500E that were illustrated in the FIGS. 24A to 24E, are shown in FIGS. 25A to 25E to illustrate the power harvesting in the form of current paths for various embodiments of the invention.

Figure 25A:
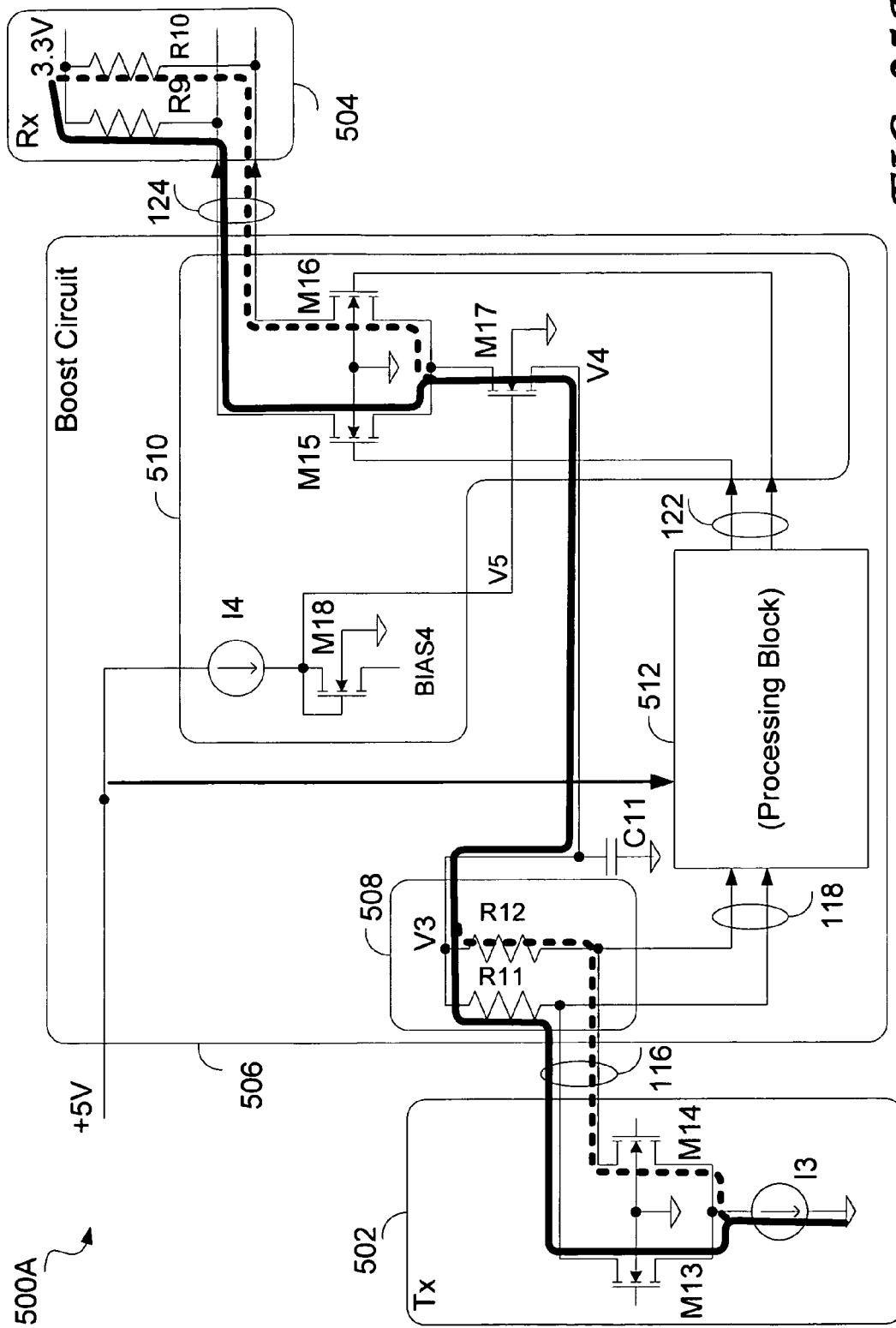
FIG. 25A is a simplified copy of the first system diagram 500A of FIG. 24A, showing the provision of electrical power in the boost circuit 506.

FIG. 25A is a simplified copy of the system diagram 500A of FIG. 24A, showing the provision of electrical power in the boost circuit 506, illustrating the common mode functionality of the HDMI input and output circuits 508 and 510 through which power is harvested from the signals. Shown in thick lines are two current paths extending from the 3.3V supply in the typical differential termination circuit 504 to the common ground in the typical differential driver circuit 502. The solid thick line indicates the current path when the transistors M13 and M15 are turned on, and the transistors M14 and M16 are turned off. The dotted thick line shows an alternate current path when the respective transistors are in the opposite state.

Tracing the solid thick line, a current flows from the 3.3V supply through the resistor R9; the transistor M15; the transistor M17; the resistor R11; the transistor M13; and the current source I3, to ground. The optional voltage booster

514 is bypassed (not shown in this illustration), but will be described in a subsequent FIG. 26. The magnitude of the current in the solid thick line is determined by the current source 13, approximately 10 mA, and will cause voltage drops of approximately 0.5V in each of the resistors R11 and R9. The voltage drops in the transistors M13 and M15 is controlled by the voltage potential at the intermediate point along the current path, i.e. the voltage nodes V3 and V4 which are equal in the absence of the optional voltage booster 514. The voltage level of V4 is designed to be substantially the same as the bias voltage BIAS4 which may be conveniently set at about 2.0V, that is sufficiently low to avoid saturating the transistor M15. The transistor M17, carrying the entire current of 10 mA does almost saturate and its voltage drop is small. The operating point of M17 is set by the mirroring transistor M18 whose current (controlled by the current source 14) may be for example 0.1 mA. By choosing the geometries of M18 and M17 to match the ratio of current sources (0.1 to 10 mA, or 1:100), the voltage drop from gate to source of the transistor M17 will be the same small value as that of M18.

The filter capacitor C11 may have a capacitance of 10 nF. Its purpose is to smooth the voltage level of V3 (which is the same as V4 if the optional voltage booster 514 is not present) when the current path switches back and forth between the paths shown in solid and dotted lines. Furthermore, the switching back and forth of the current path between R11 and R12 does not necessarily occur at precisely the same instants as the switching between R9 and R10, because of the delays introduced by the Processing Block 512 whose output controls the switching action of the transistors M15 and M16. The resulting current spikes are also smoothed by the filter capacitor C11.

Figure 25B:
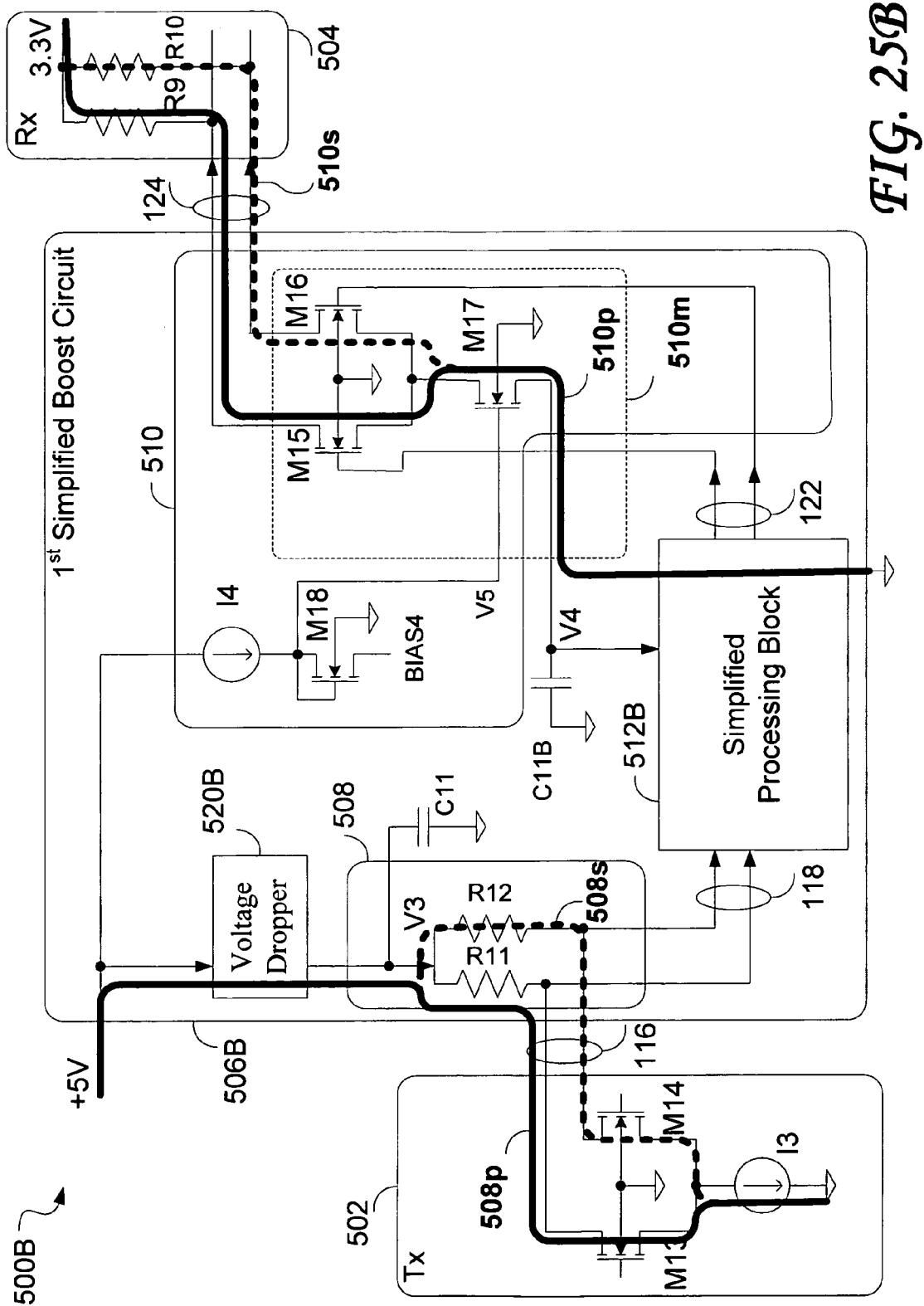
FIG. 25B is a simplified copy of the second system diagram 500B of FIG. 24B, showing the provision of electrical power in the first Simplified Boost Circuit 506B.

FIG. 25B is a simplified copy of the second system diagram 500B of FIG. 24B, showing the provision of electrical power in the First Simplified Boost Circuit 506B, and illustrating the common mode functionality of the HDMI input and output circuits 508 and 510 in the First Simplified Boost Circuit 506B through which power is harvested from the signals of the cable.

The transistors M15, M16, and M17 of the HDMI output circuit 510, constitute a means 510m for providing the electrical power to the processing block 512B, while at the same time boosting the differential data signals and providing a proper output impedance.

A first primary current path 510p indicated by a solid thick line, extends from the 3.3V supply in the typical differential termination circuit 504 to the common ground through: the typical differential termination circuit 504; the HDMI output circuit 510; and the Simplified Processing Block 512B. The first primary current path 510p corresponds to the path of a current when the transistor M15 is turned on, and the transistor M16 is turned off. A first secondary current path 510s corresponds to the path of the current when the respective transistors are in the opposite state.

A second primary current path 508p, also indicated by a solid thick line, extends from the +5V supply to the common ground through: the Voltage Dropper circuit 520B; the HDMI input circuit 508; and the differential driver circuit 502. The second primary current path 508p indicates the path of a current when the transistor M13 is turned on, and the transistor M14 is turned off. A second secondary current path 508s corresponds to an alternate current path when the respective transistors are in the opposite state.

The first primary current path 510p shows that current flows: from the 3.3V supply through the resistor R9; the transistor M15; the transistor M17; and finally the Simplified Processing Block 512B, to ground. The voltage level of V4 is designed to be substantially the same as the bias voltage BIAS4B which may be conveniently set at about 1.5 Volt, which is sufficiently low to avoid saturating the transistor M15, and at the same time may be an appropriate supply voltage for the Simplified Processing Block 512B. Alternatively, the bias voltage BIAS4B may be set at a different level according to the voltage requirement of the Simplified Processing Block 512B. The transistor M17, carrying a current of about 10 mA almost saturates and its voltage drop is small. The operating point of M17 is set by the mirroring transistor M18 whose current (controlled by the current source 14) may be for example 0.1 mA. By choosing the geometries of M18 and M17 to match the ratio of current sources (0.1 to 10 mA, or 1:100 for example), the voltage drop from gate to source of the transistor M17 will be the same small value as that of M18, as a result of which the voltage level of V4 is substantially the same as the bias voltage BIAS4B. It may be noted that the mechanism for setting the voltage level of V4 is the same in both embodiments of the boost circuit (506 and 506B), only the actual voltage, as controlled by the bias voltage BIAS4B may differ, i.e. is lower in the First Simplified Boost Circuit 506B which avoids the need for a Power Converter (analogous to the Power Converter 520) in the Simplified Processing Block 512B.

The filter capacitor C11B may have a capacitance of 10 nF. Its purpose is to smooth the voltage level of V4 when the current path switches back and forth between the first primary and secondary current paths 510p and 510s respectively.

Together with the filter capacitor C11B, the transistors M15, M16, and M17, constitute a means for providing the electrical power to the processing block 512B.

The magnitude of the current in the second primary and secondary current paths 508p and 508s is determined by the current source 13, approximately 10 mA. This current flows from the +5V supply through the Voltage Dropper Circuit 520B; the resistor R11 or the resistor R12 (depending on the respective on-state of the transistors M13 and M14); the transistor M13 or M14 (depending on their respective on-state); and the current source 13 to ground. It may be noted that in the case of the alternate realization of the Voltage Dropper Circuit 520B as a switched capacitor DC/DC converter, a current multiplication effect takes place in the Voltage Dropper Circuit 520B, and less than the full amount of the current is supplied by the +5V supply.

Figure 25C:
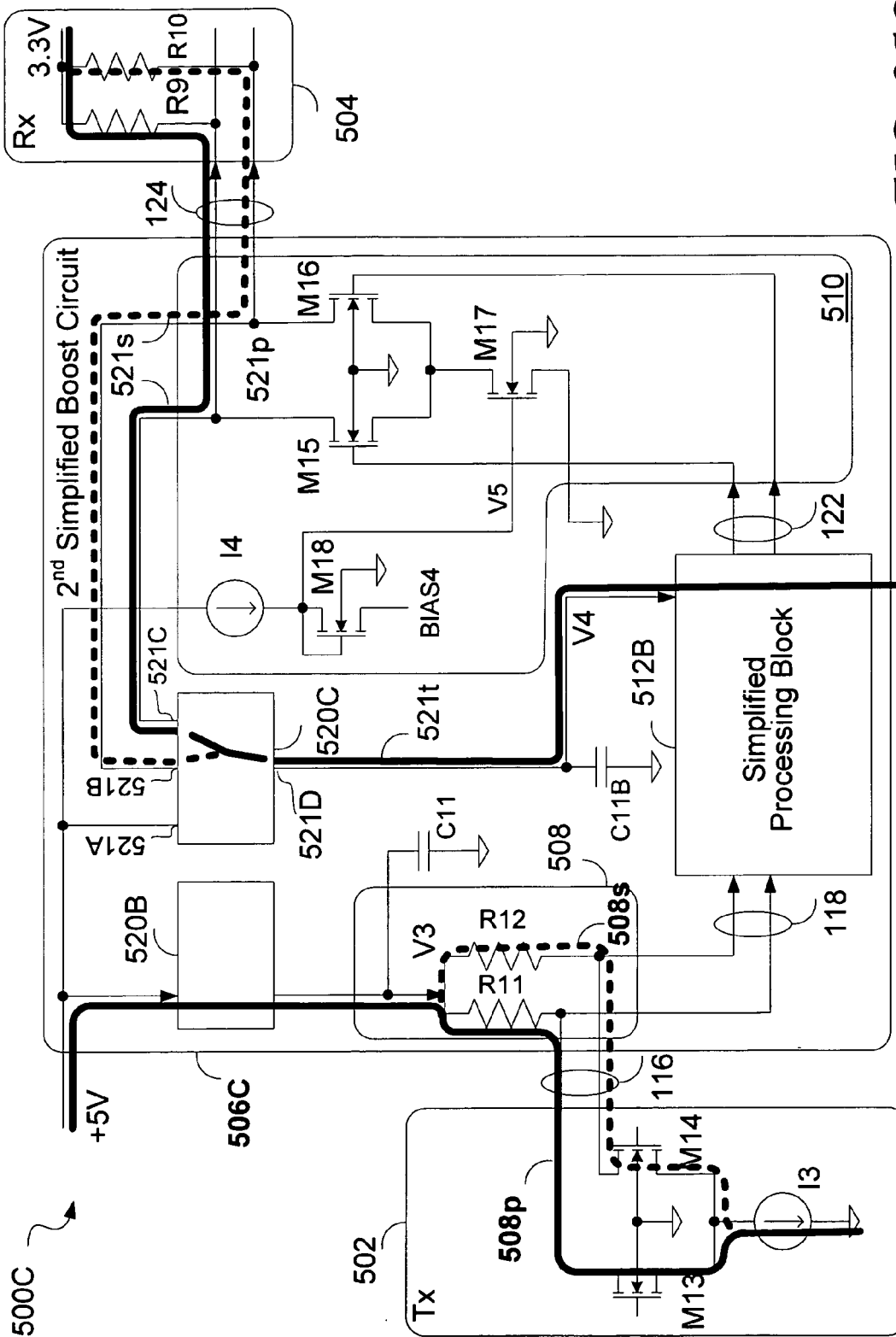
FIG. 25C is a simplified copy of the third system diagram 500C of FIG. 24C, showing the provision of electrical power in the second Simplified Boost Circuit 506C.

FIG. 25C is a simplified copy of the third system diagram 500C of FIG. 24C, showing the provision of electrical power in the Second Simplified Boost Circuit 506C. The second primary current path 508p and the second secondary current path 508s illustrate the current from the +5V supply through the Voltage Dropper 520B, the HDMI input circuit 508 and the typical differential driver circuit 502, in the same manner as in the First Simplified Boost Circuit 506B described earlier.

Two branches of a split current path 521s extends from the 3.3V supply in the typical differential termination circuit 504 to the boosted signal terminals 521B and 521C of the Voltage Generator 520C. The branches of the split current path 521s combine in the Voltage Generator 520C, to emerge as a total current path 521t from the generated voltage output terminal 521D at a voltage level (the supply voltage V4) according to a setting in the Voltage Generator 520C. The total current path 521t then continues through the Simplified Processing Block 512B to ground.

Figure 25D:
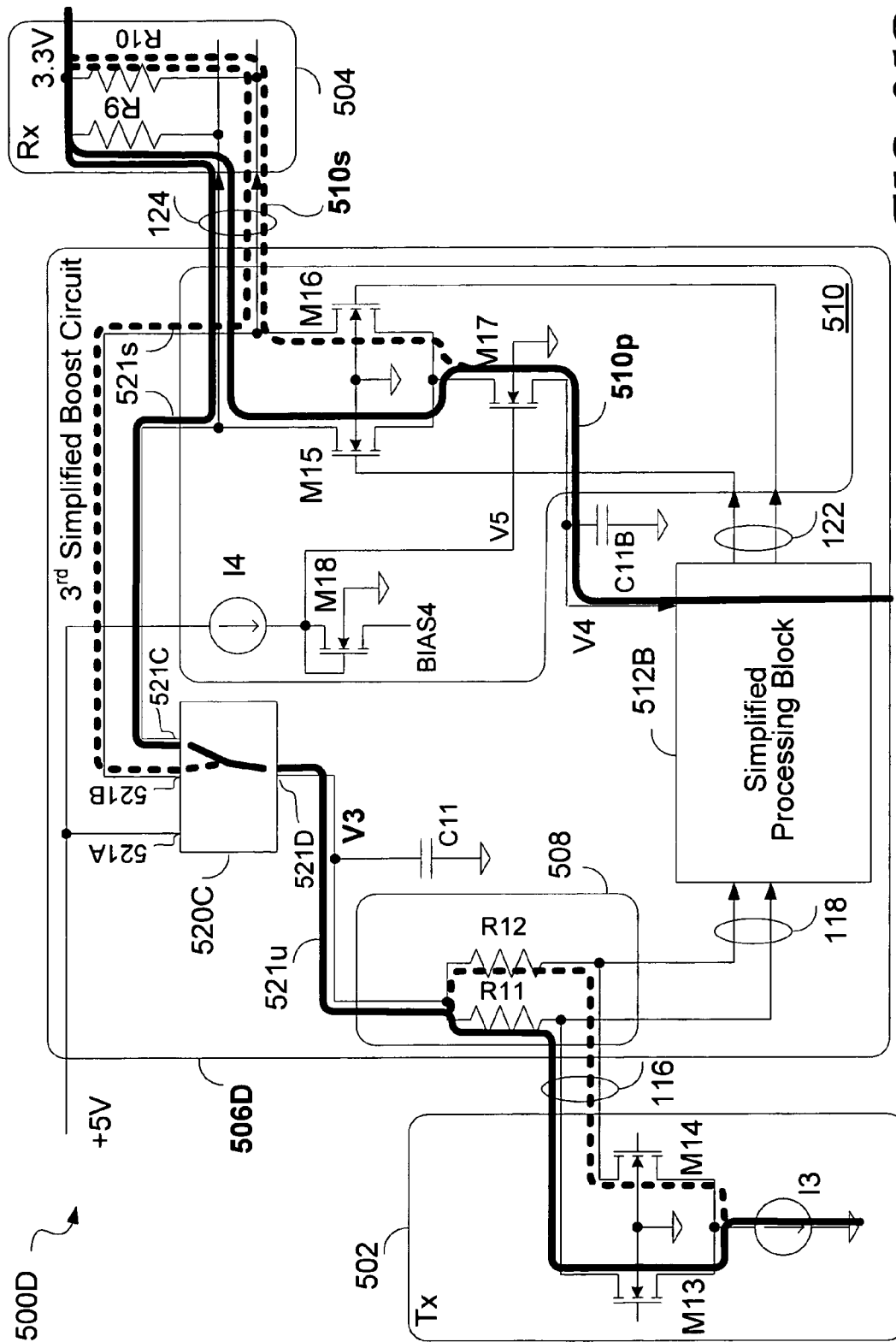
FIG. 25D is a simplified copy of the fourth system diagram 500D of FIG. 24D, showing the provision of electrical power in the third Simplified Boost Circuit 506D.

FIG. 25D is a simplified copy of the fourth system diagram 500D of FIG. 24D, showing the provision of electrical power in the third Simplified Boost Circuit 506D.

The two branches of the split current path 521s (also shown in FIG. 25C above) extends from the 3.3V supply in the typical differential termination circuit 504 to the boosted signal terminals 521B and 521C of the Voltage Generator 520C. The branches of the split current path 521s combine in the Voltage Generator 520C, to emerge as a combined current path 521u from the generated voltage output terminal 521D at a voltage level (the supply voltage V3) according to a setting in the Voltage Generator 520C. The combined current path 521u then splits again and continues through the HDMI input circuit 508 and the typical differential driver circuit 502 to ground.

In the same way as in the first Simplified Boost Device 506B (FIGS. 24B and 25B) the first primary and secondary current paths 510p and 510s extend from the 3.3V supply in the typical differential termination circuit 504 to the common ground through: the typical differential termination circuit 504; the HDMI output circuit 510; and the Simplified Processing Block 512B. The supply voltage V4 is generated at the source of the transistor M17 in the HDMI output circuit 510, its voltage level set by the value of the bias voltage BIAS4.

Figure 25E:
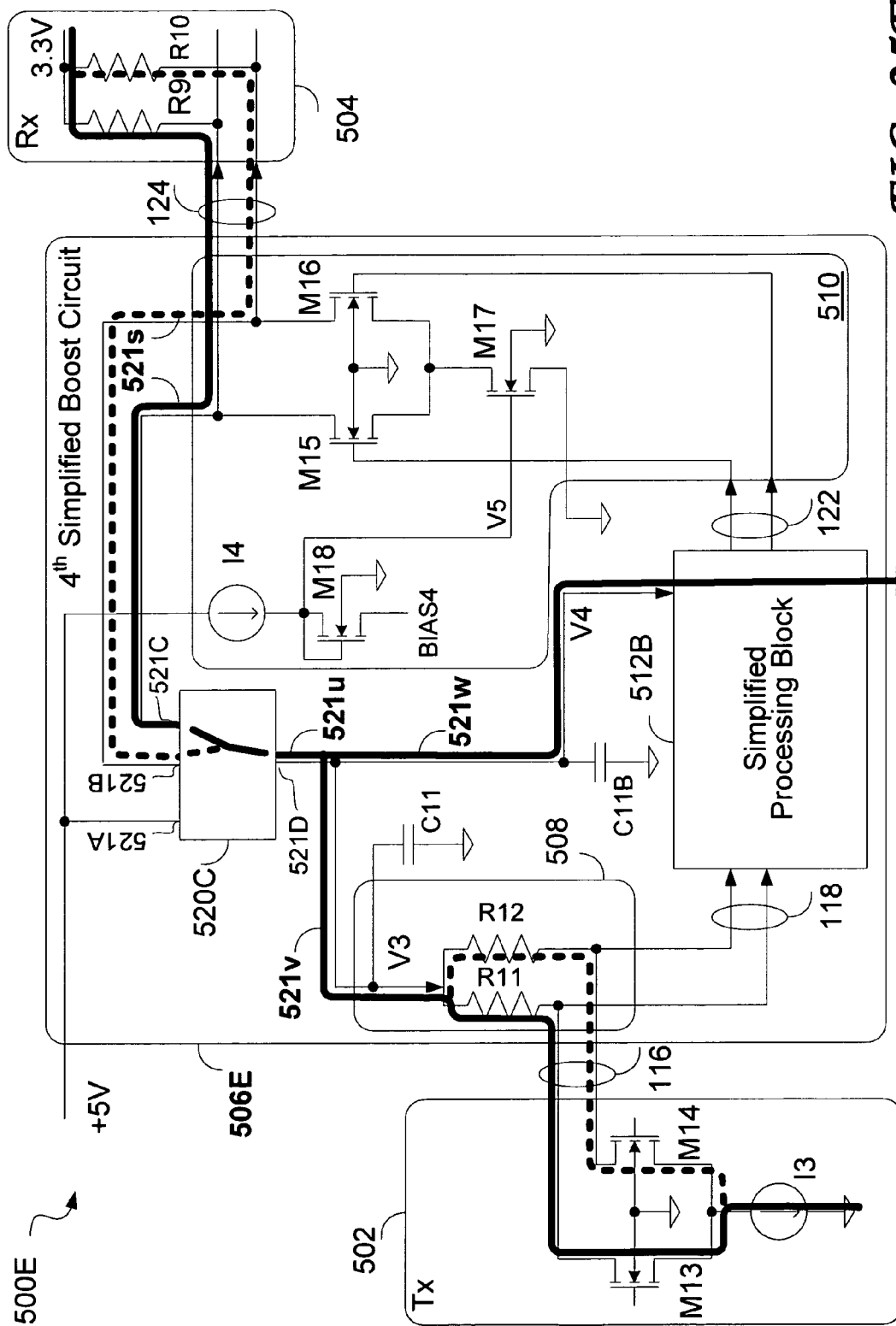
FIG. 25E is a simplified copy of the fifth system diagram 500E of FIG. 24E, showing the provision of electrical power in the fourth Simplified Boost Circuit 506E.

FIG. 25E is a simplified copy of the fifth system diagram 500E of FIG. 24E, showing the provision of electrical power in the fourth Simplified Boost Circuit 506E.

The Voltage Generator 520C is used to generate both the supply voltages V3 and V4, which by necessity have the same voltage level which may be adjusted to be in the range of 1.5 to 2.0 V.

The two branches of the split current path 521s (also shown in FIGS. 25C and 25D above) extends from the 3.3V supply in the typical differential termination circuit 504 to the boosted signal terminals 521B and 521C of the Voltage Generator 520C. The branches of the split current path 521s combine in the Voltage Generator 520C, to emerge as the combined current path 521u from the generated voltage output terminal 521D at a voltage level according to a setting in the Voltage Generator 520C.

The combined current path 521u then splits into current paths 521v and 521w, the current path 521v splitting again and continuing through the HDMI input circuit 508 and the typical differential driver circuit 502 to ground, while the current path 521w continues through the Simplified Processing Block 512B to ground.

Figure 26:
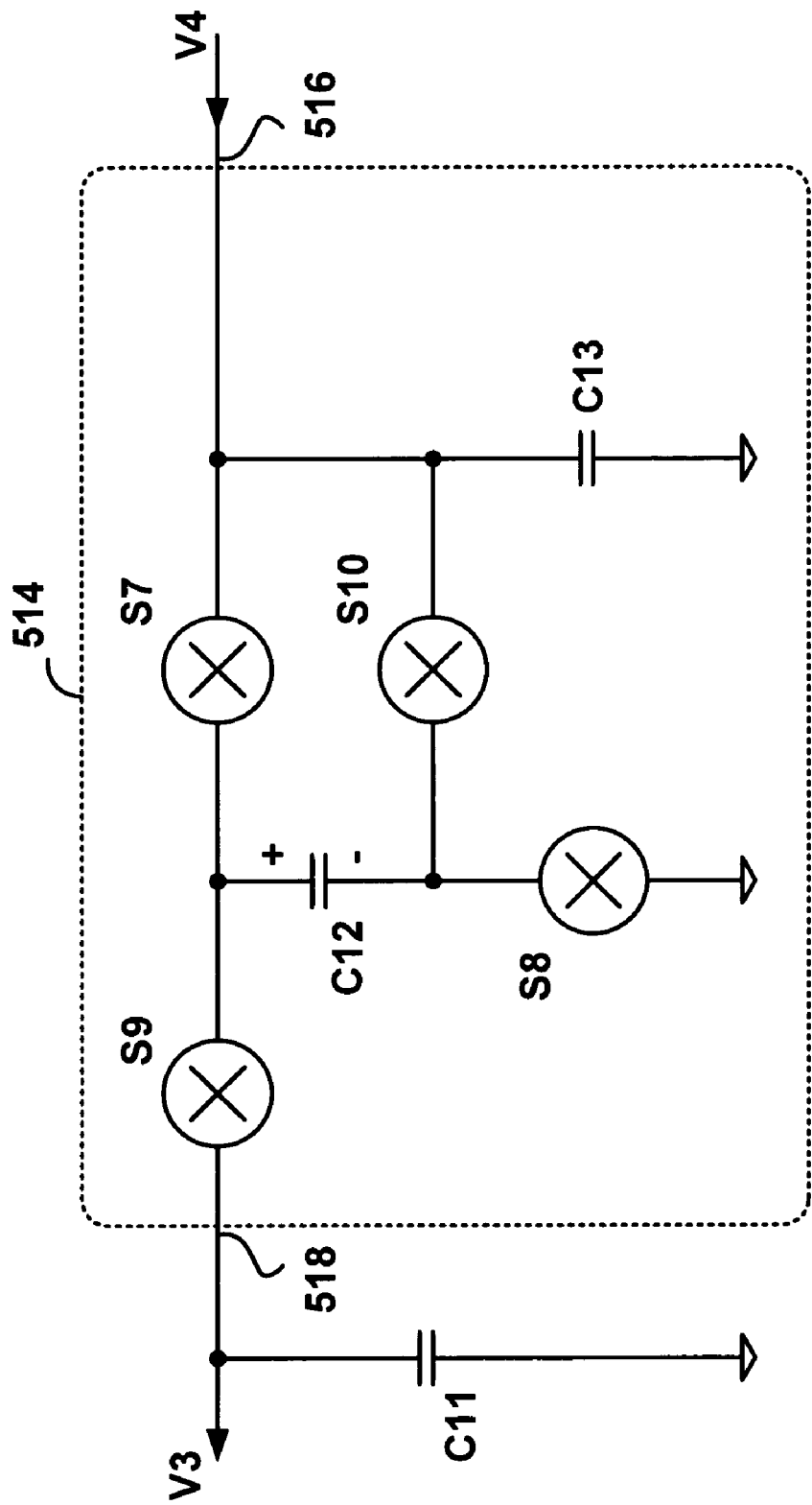
FIG. 26 shows a block diagram of the optional voltage booster 514 of FIG. 24A.

FIG. 26 shows a block diagram of the optional voltage booster 514 of FIG. 24A.

The input 516 of the voltage booster 514 is connected to the voltage node V4, and the output 518 is connected to the capacitor C11 and the voltage node V3 as shown in FIG. 24A.

The voltage booster 514 functions as a charge pump and is similar to the "High-Efficiency CMOS Voltage Doubler" by Favrat et al, IEEE J. Solid State Circuits, vol. 33, no. 3, pp. 410-416, March, 1998. The circuit includes two capacitors C12 and C13, and two "collector" switches S7 and S8, and two "deposit" switches S9 and S10. The capacitor C13 is disposed between the voltage node V4 and ground. The capacitor C12 is a "flying" capacitor having a positive (+) terminal connected to the switches S7 and S9, and a negative (−) terminal connected to the switches S8 and S10. The switches are periodically closed and opened, driven by a signal from a pumping oscillator (not shown) whose frequency may be conveniently chosen to be around 100 MHz. The switches are operated in such a way that the collector switches S7 and S8 are closed while the deposit switches S9 and S10 are opened, and vice versa. The switches may conveniently be implemented in P-channel and/or N-channel MOSFETs. The sizes of the capacitors are not critical, nor is the ratio of sizes. Satisfactory results have been obtained in simulations of the circuit with the following values: C11=10 nF; C12=1 nF; and C13=10 nF.

When the collector switches are closed (during a "collector phase"), S7 connects the positive terminal of C12 to V4 and the negative terminal to ground, thus placing the capacitor C12 in parallel with the capacitor C13.

In the collector phase, the flying capacity or C12 "collects" some charge from the capacitor C13 at the voltage node V4. Recall that the node V4 is fed by current from the transistor M17 (FIG. 24A) which continuously replenishes the charge of the capacitor C13.

When the collector switches are open, the deposit switches are closed (during a "deposit phase"), S9 connecting the positive terminal of C12 to V3 and S10 connecting the negative terminal of C12 to V4, in effect placing the capacitor C12 in series with the capacitor C13, and the combination of C12 and C13 in parallel with C11. In the deposit phase, some charge from the flying capacitor C12 is transferred ("deposited") into the capacitor C11, increasing the voltage V3.

With the pumping oscillator periodically opening and closing the switches S7 to S10 as described, the flying capacitor thus periodically pumps charge from the voltage node V4 to the voltage node V3, increasing V3 to (ideally) double the voltage at V4 when equilibrium is reached. The voltage booster 514 operates almost without loss because only a negligible amount of power is dissipated in the switches S7 to S10. As a result, the power (current times voltage) available for the load (the HDMI input circuit 508) at the voltage node V3 is almost equal to the power that is delivered into the voltage node V4 which is fed by the typical differential termination circuit 504 in series with the HDMI output circuit 510. Consequently, given that the amount of current drawn in the typical differential driver circuit 502 is determined by the current source 13 (10 mA) in the HDMI source (Tx) and must be drawn from V3, the current supplied from the 3.3V supply in the HDMI sink (Rx) to feed C13 at the voltage node V4 (ultimately at one half the voltage of V3) must necessarily be double, i.e. rise to 20 mA.

Returning now to the description of FIG. 24A, we may conclude that the boost circuit provides an HDMI termination in the form of the HDMI input circuit 508 and an HDMI driver in the form of the HDMI output circuit 510, the two circuits being interconnected via the nodes V3 and V4 (with or without the optional voltage booster 514), practically without requiring external power. Only a small bias current of 0.1 mA (1% of the signal currents) is taken from the +5V supply to set the operating point of the circuits by controlling V4.

The differential signal recovered with the input circuit (the recovered signal 118) is processed by the processing block 512 into the equalized signal 122, which is used to drive the output circuit as described earlier.

The processing block 512 includes analog processing circuitry (described in FIGS. 7 to 23) which requires a certain amount of power that, depending on technology and circuit implementation could be obtained from the voltage nodes V3 or V4. However, with present design constraints it would be difficult to supply this power and at the same time meet the HDMI specifications at the inputs and/or outputs of the boost circuit 506. Instead, according to the preferred embodiment of the invention, power for the processing block 512 is obtained from the +5V supply that is provided by the HDMI source (Tx) through the HDMI cable. But because very little current (5 mA) is available from the +5V supply, it is essential to be very conserving with that power. The power converter 520 is used to reduce the voltage while increasing the current available for the analog processing circuitry.

Figure 27A:
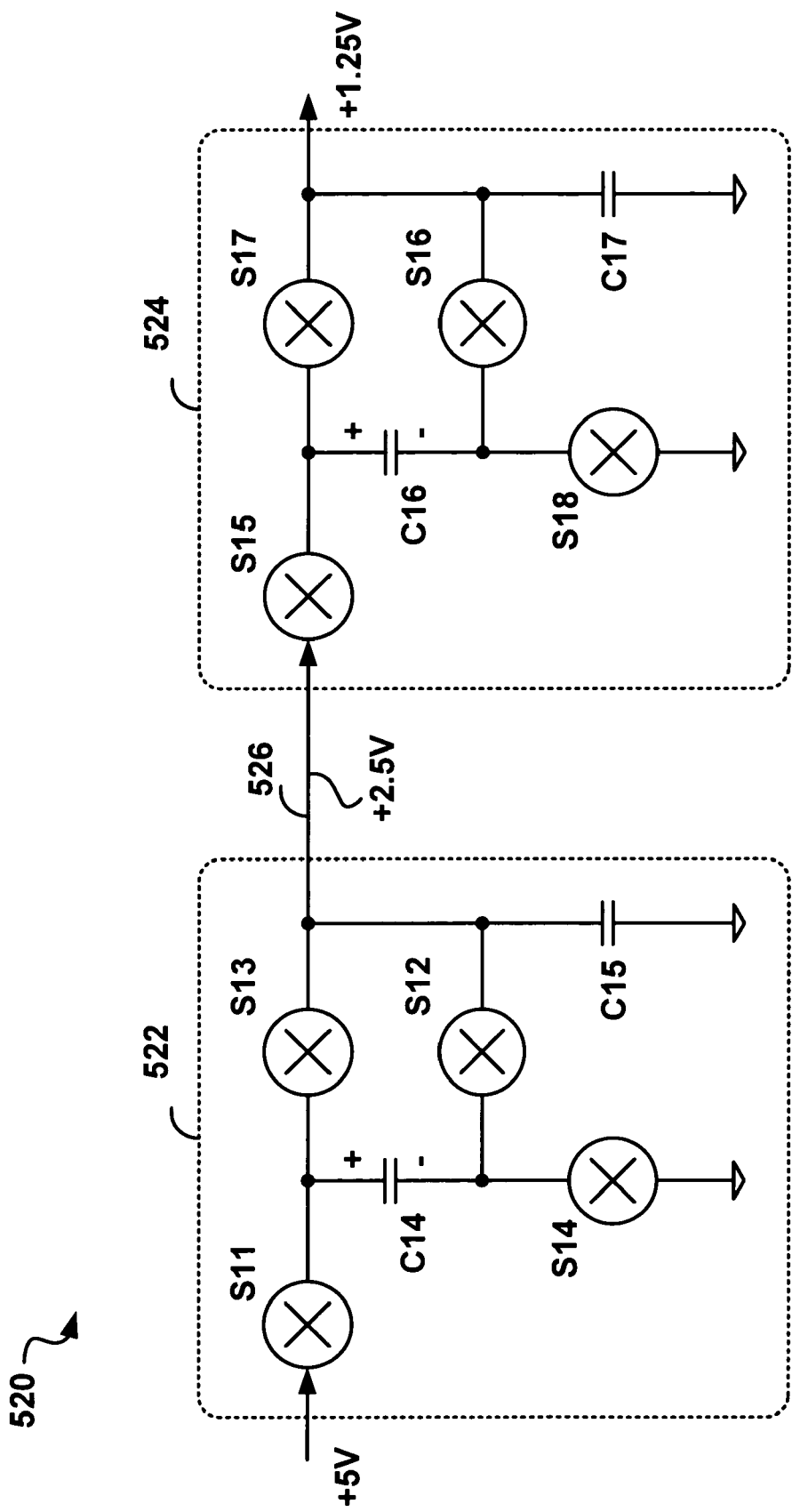
FIG. 27A shows a block diagram of the power converter 520 of FIG. 24A.

FIG. 27A shows a block diagram of the power converter 520. This circuit comprises two step-down circuits 522 and 524. The first step-down circuit 522 generates an intermediate voltage (intermediate voltage node 526, +2.5V) from the +5V supply, and the second step-down circuit 524 generates a +1.25V supply voltage from the intermediate voltage. The +1.25V supply voltage is then available for powering the analog processing circuitry in the processing block 512, i.e. the Deskew Circuit 110 and the Equalizer Circuit 112.

The first step-down circuit 522 comprises capacitors C14 and C15, and four switches S11 to S14. The switch S11 is connected between the +5V supply and the positive end of the capacitor C14; the switch S13 is connected between the positive end of the capacitor C14 and the intermediate voltage node 526 (2.5V); the negative end of the capacitor C14 is connected via the switch S14 to the common ground, and through the switch S12 to the intermediate node 526; and the capacitor C15 is connected between the intermediate node 526 and the common ground.

The first step-down circuit 522 is driven by a two-phase clock signal (not shown) having two non-overlapping phases, a "charge" phase and a "discharge" phase. During the "charge" phase, the switches S11 and S12 are closed while the switches S13 and S14 are open, and the capacitor C14 is thus switched into a circuit between the +5V supply and the intermediate voltage node 526. During the "discharge" phase, the switches S11 and S12 are opened while the switches S13 and S14 are closed, and the capacitor C14 is thus switched into a circuit that is parallel with the capacitor C15, i.e. between the intermediate voltage node 526 and ground. The frequency of the two-phase clock signal may conveniently be around 15 MHz, the same frequency that would also be used for pumping in the similar circuitry of the optional voltage booster 514 (FIG. 26).

After the step-down circuit 522 has been running for a short time and has reached equilibrium, the voltage at the intermediate voltage node 526 will have risen from 0V to about one half of the input voltage of +5V, that is to 2.5V.

The first step-down circuit 522 acts effectively as a (almost) loss-less DC-DC converter that transforms +5V into +2.5V. The second step-down circuit 524 comprises capacitors C16 and C17, and four switches S15 to S18. The switch S15 is connected between the intermediate voltage node 526 and the positive end of the capacitor C16; the switch S17 is connected between the positive end of the capacitor C14 and the +1.25V supply voltage output; the negative end of the capacitor C16 is connected via the switch S18 to the common ground, and through the switch S16 to the +1.25V supply voltage output; and the capacitor C17 is connected between the +1.25V supply voltage output and the common ground.

The operation of the second step-down circuit 524 is analogous to that of the first step-down circuit 522, using the same two-phase clock signal for closing and opening the switches S15 to S18, to generate the +1.25V supply voltage.

The power converter 520 may thus be realized as the combination of the first and second step-down circuits 522 and 524, which is an (almost) loss-less DC-DC converter that transforms +5V into +1.25V.

FIG. 27B shows a circuit diagram of the Voltage Dropper 520B that may be used in the first and second Simplified Boost Circuits (506B and 506C), realized by a series arrangement of diodes. To obtain a voltage reduction from the +5V supply to the supply voltage V3 of 3.3 Volt, a voltage drop of 1.7 Volt would be required. This may be approximately achieved with three diodes D1, D2, and D3 connected in series, as shown in FIG. 27B.

FIG. 27C shows a block diagram of an alternative realization of the Voltage Dropper 520B that may be used in the first and second Simplified Boost Circuits (506B and 506C), in the form of a DC/DC converter, for example in the form of the step-down circuit 522 of FIG. 27A, to generate the supply voltage V3 of 2.5 Volt from the +5V supply, using the same set of components and functioning in the same way as already fully described for the first step-down circuit 522 of FIG. 27A. While the voltage of V3 may be nominally defined as 3.3 Volt, the actual voltage of V3 provided in the design of the Boost Circuit 506 or the first Simplified Boost Circuit 506B can be lower. The lower supply voltage may then be compensated for by a reduction in the magnitude of the resistor values of R11 and R12 (FIGS. 24A and 24B).

FIG. 27D shows a circuit diagram of the Voltage Generator 520C that is used in the second, third, and fourth Simplified Boost Circuit (506C, 506D, and 506E). The Voltage Generator 520C comprises a current source I5 and three N-channel MOSFET transistors M19, M20, and M21, and connects to the circuitry in the various implementations of the Simplified Boost Device (506C, 506D, and 506E, see FIGS. 24C, 24D, and 24E)) the following terminals:

the 5V terminal 521A;
the first and second boosted signal terminals 521B and 521C; and
the generated voltage output terminal 521D.

The current source 15 is connected between the 5V terminal 521A and the drain of the transistor M21. The transistor M21 functions effectively as a diode, with its drain connected to its base. The drain of the transistor M21 is also joined to the bases of the transistors M19 and M20. The source of the transistor M21 is connected to a bias voltage BIAS5. The drains of the transistors M19 and M20 are connected to the first and second boosted signal terminals 521B and 521C respectively, and the sources of the transistors M19 and M20 are joined and connected to the generated voltage output terminal 521D.

A small current, for example 0.1 mA is drawn through the current source I5 and the (diode connected) transistor M21 to the bias voltage BIAS5. Currents that may be flowing into the first and second boosted signal terminals 521B and 521C, flow through the transistors M19 and M20 respectively, and combine to flow out from the joined sources of the transistors M19 and M20 and the generated voltage output terminal 521D. The voltage at the generated voltage output terminal 521D is held at substantially the same value as the bias voltage BIAS5. The circuitry of the Voltage Generator 520C thus provides a means 521*m* for combining the current supplied from the boosted signal terminals 521B and 521C, and for adjusting the generated output voltage by controlling the bias voltage BIAS5.

Thus, by choosing the magnitude of the bias voltage BIAS5, the voltage generated by the Voltage Generator 520C may be adjusted to a desired value. The current that may be drawn from the Voltage Generator 520C at its generated voltage output terminal 521D is limited to the sum of the currents flowing into the first and second boosted signal terminals 521B and 521C. Naturally, the voltage obtained from the Voltage Generator 520C cannot be greater than the voltage of the source of the input currents which, as seen in FIGS. 24C to 24E, is 3.3V. The useful voltage range at the generated voltage output terminal 521D depends on the application, for example as the supply voltage V3 (1.5 to 2.5 V), the supply voltage V4 (1.2 to 2.0 V), or both simultaneously (1.5 to 2.0 V). In other applications, other voltage ranges may also be convenient and can be achieved, as controlled by the bias voltage BIAS5.

Parameter Setup

The improved HDMI cable 20 comprising four boost circuits may be manufactured with any of a number of different lengths of the basic (passive) HDMI cable 40. It is a further object of the invention to provide methods for calibrating the deskew and equalization parameters to compensate for the differential skew and the frequency response of the cable.

As shown in FIGS. 5 and 6 above, the Parameter Memory 102 is connected to the deskew parameter inputs 126 of each of the Differential Deskew circuits 110, and to the equalization parameter inputs 128 of each of the Equalization circuits 112. The Parameter Memory 102 may be loaded with parameter values at the time of manufacture.

The Parameter Memory 102 may be integrated within the Boost Device 100, or may be a separate device, mounted on a small Printed Circuit Board (PCB) or other carrier together with the Boost Device 100.

Three alternative methods are proposed for calibrating the parameters: a Real Time Calibration method; a Frequency Domain Calibration method; and a Time Domain Calibration method. Because the physical cable is fairly stable, it is not intended to dynamically adjust these parameters in the field, once they have been set originally, although the Real Time Calibration method could certainly be adapted to perform this.

In all calibration methods, access to the boost device for controlling the calibration process (setting parameters) is provided within the "Other HDMI Signals" 54 (FIG. 5), in the form of a control bus comprising "Serial Data" (SDA) and "Serial Clock" (SCL).

FIG. 28 illustrates the improved HDMI cable 20 of FIG. 4, showing external connections that are available for calibrating the cable. Note that there is no direct physical access to the Boost Device 30, and only existing HDMI signals are used. The connections used in the calibration processes are: 532: +5V supply and ground (2 wires); 534: four differential channel inputs (8 wires); 536: four differential channel outputs (8 wires); and 538: the control bus SDA+SCL (2 wires).

The wires of the power supply (532) and of the control bus (538) simply go through the cable 20, and thus appear at both ends. The differential input and output channels (534 and 536 respectively) terminate on the boost device 30 (100) within the cable.

FIG. 29 shows a Real Time Configuration 540 used in the Real Time Cable Calibration method. The Real Time Configuration 540 includes a Real Time Test Equipment 542 and the improved HDMI cable 20 of FIG. 4, which however includes an expanded boost device 544. The expanded boost device 544 includes the boost device 30 (FIG. 5) and additional circuitry for analyzing the boosted signal 124 and providing access to the control bus 538.

The Real Time Test Equipment 542 includes a +5V Supply to supply power to the cable (+5V power and ground 532); a Data Pattern Generator for generating HDMI-conforming differential data and clock signals to feed the differential channel inputs 534, and a Control Computer (PC) to control the data patterns to be output by the Data Pattern Generator, and to communicate with the expanded boost device 544 in the cable over the control bus (SDA+SDL) 538. A termination device "Term" that comprises a set of typical differential termination circuits 504 (FIG. 24A) is connected to the differential channel outputs 536.

To calibrate the cable (each cable is individually calibrated at production) the Real Time Calibration method includes the following steps:

a control program in the PC instructs the Data Pattern Generator to send HDMI data patterns into the differential channel inputs 534 of the cable;

the control program in the PC uses the control bus 538 to send deskew and equalization parameters to the expanded boost device 544;

the expanded boost device 544 performs the deskew and equalization steps as determined by the set parameters;

the expanded boost device 544 analyzes the quality of the deskewed and equalized signal;

the expanded boost device 544 reports the quality result to the PC over the control bus 538;

the preceding steps are repeated for each differential channel and with different parameters;

the best settings are determined and permanently set into the parameter memory 102 within the expanded boost device 544.

For an additional check to verify the proper operation of the calibrated cable, a built-in self test (BIST) may be included in the expanded boost device 544 in which the reception of a known pattern sent from the Data Pattern Generator into the differential channels of the cable is verified in the expanded boost device 544.

Figure 30:
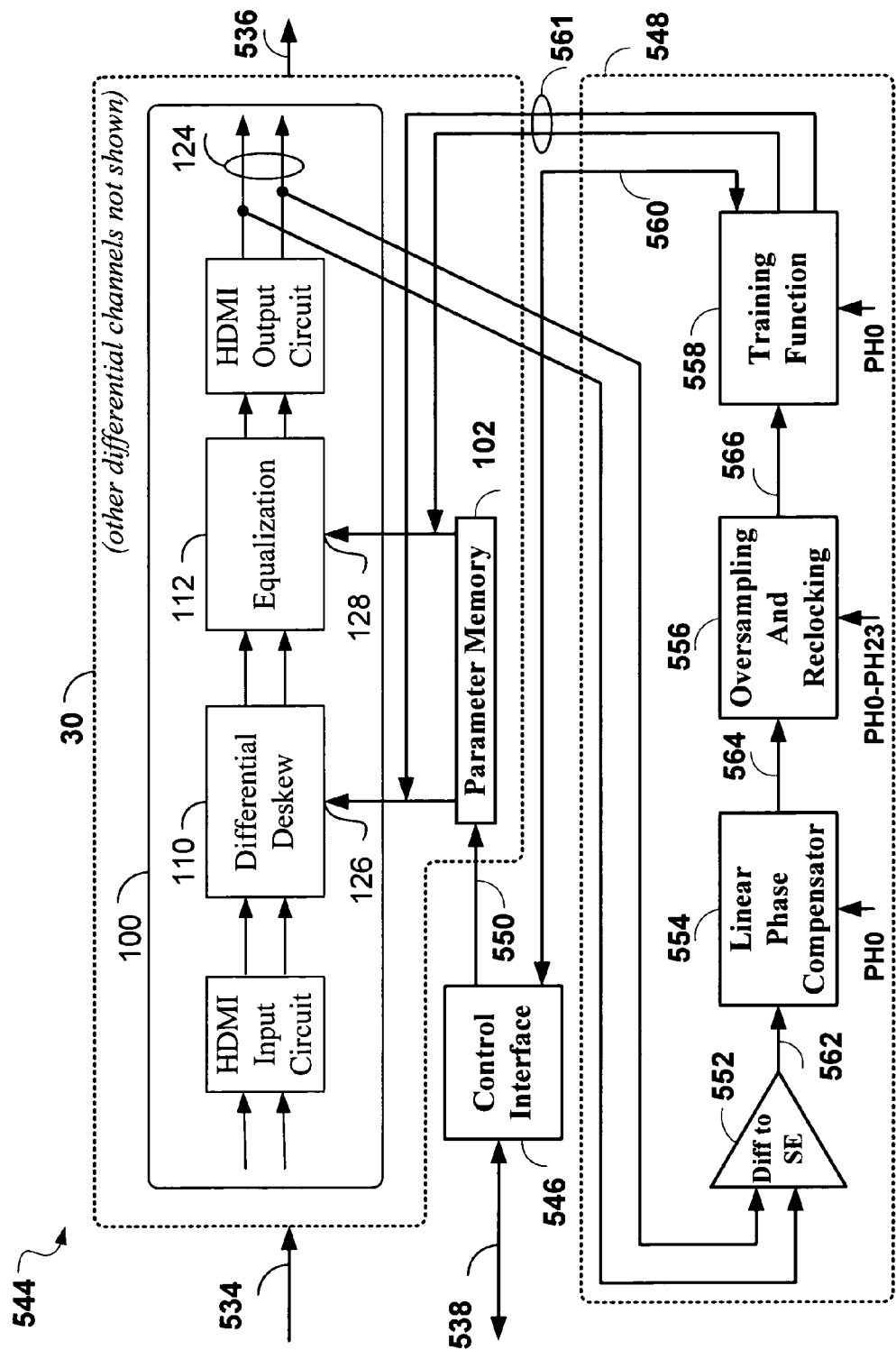
FIG. 30 shows a simplified block diagram of the expanded boost device 544 of FIG. 29, including a Linear Phase Compensator 554, an Oversampling and Reclocking block 556, and a Training Function 558.

FIG. 30 shows a simplified block diagram of the expanded boost device 544 including the boost device 30 of FIG. 5, a Control Interface 546, and a performance analysis circuit 548. Only a representative one of the four channel boost circuits 100 is shown in the FIG. 30, it being understood that each of the three differential TMDS channels and the differential clock channel are processed by a respective channel boost circuits 100.

The Control Interface 546 communicates with the Real Time Test Equipment 542 over the control bus 538, and with the parameter memory 102 (in the boost device 30) over a parameter setup link 550.

The performance analysis circuit 548 is only active (powered up under control of the Control Interface 546) when the expanded boost device 544 is being calibrated.

The performance analysis circuit 548 includes a Differential-to-Single-Ended block 552, a Linear Phase Compensator 554, an Oversampling and Reclocking block 556, and a Training Function block 558. An output of the Training Function block 558 is connected to an input of the Control Interface 546 over a control link 560. Two optional outputs (parameter links 561) of the Training Function block 558 are connected to the deskew and equalization parameter inputs 126 and 128 of the channel boost circuit 100, bypassing the Parameter Memory 102.

Not shown in FIG. 30 is a conventional clock recovery circuit which recovers the clock from any of the differential channels, and generates a multiphase clock signal (clock phases PH0 to PH23). The generation of the multiphase clock signal may be accomplished with a phase locked loop using any of a number of known techniques to generate multiple phases of a clock, and is not described in detail here.

While each of the four channel boost circuits 100 is being calibrated by the Real Time Cable Calibration method, its "boosted signal" pair 124 is tapped and connected to the performance analysis circuit 548.

Note that a single common performance analysis circuit 548 may be shared for calibrating the four channel boost circuits 100 sequentially. Alternatively, a plurality of performance analysis circuits 548 may be included in the expanded boost device 544 which would allow the channel boost circuits 100 to be calibrated in parallel.

In the performance analysis circuit 548 this differential signal is connected to the Differential-to-Single-Ended block 552 which converts the boosted signal 124 into a single-ended signal 562 that is input to the Linear Phase Compensator 554 which also receives the PH0 phase of the multiphase clock signal, and produces as output a phase aligned signal 564 (that is, a preprocessed data signal).

The Oversampling and Reclocking block 556 receives the phase aligned signal 564 as well as all 24 phases (PH0 to PH23) of the multiphase clock signal, to generate a 24-sample digital samples signal 566 which is then input to the Training Function block 558.

Analog Phase Recovery (Linear Phase Compensator 554)

After being converted to the single-ended signal 562 in the Differential-to-Single-Ended block 552, the data is ready to be sampled (converted into a digital signal). The problem, however, is that the phase of the data relative to the sampling clock is unknown. When this phase relationship is unknown, there is a danger of sampling during data transitions and misinterpreting the data in the data stream. To define the phase relationship between the on-board clock (PH0 of the multi-phase clock) and the data (the single ended signal 562), an Analog Phase detector (within the Linear Phase Compensator 554) is used. The frequency of the data and the recovered clock are equivalent because the timings in both are derived from the same source, that is, the transmitted clock, so there is no need for frequency adjustment. The Linear Phase Compensator 554 employs a scheme similar to that described in the paper entitled "A 10-Gb/s Clock Recovery Circuit with Linear Phase Detector and Coupled Two-stage Ring Oscillator" by Afshin Rezayee and Ken Martin. This paper, which is incorporated herein by reference, was published at the European Solid State Circuits Conference (SSCIRC) in Florence, Italy in the year 2002, pp. 419-422.

In this phase detection scheme of Rezayee and Martin, a window in time is generated around rising edges in the data stream. The phase detector is only enabled within this window. The window is of such a length that one clock edge is guaranteed to be present, but only one. In the Rezayee & Martin implementation, the clock and data are locked such that clock edges occur in the middle of the data bits. This allows the aligned clock to sample in a region where the data is stable.

In the implementation of the phase detector circuit described herein, the Linear Phase Compensator 554 aligns the clock and data edges. The resulting phase aligned data signal (the phase aligned signal 564) is subsequently oversampled in a separate circuit block (The Oversampling and Reclocking block 556) before the bit value may be determined.

Figure 31:
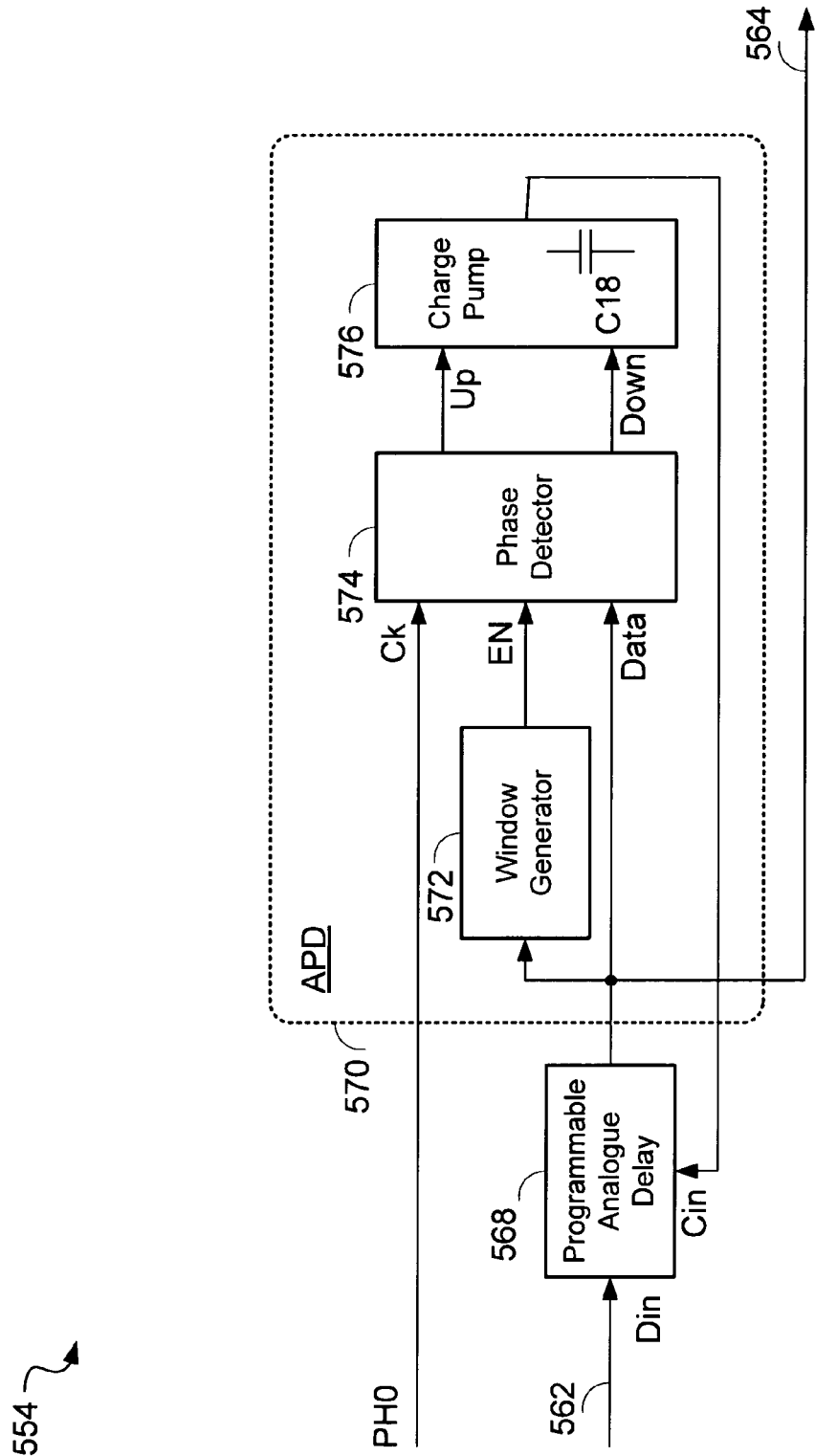
FIG. 31 shows a block diagram of an exemplary implementation of the Linear Phase Compensator 554 of FIG. 30, including a Programmable Analogue Delay 568.

FIG. 31 shows a block diagram of an exemplary implementation of the Linear Phase Compensator 554. The Linear Phase Compensator 554 comprises:

a Programmable Analogue Delay 568 having a data input (Din) and a control input (Cin); and an Analog Phase Detector (APD) 570, which includes: —a Window Generator 572;

a Phase Detector 574 having a clock input "Ck", a data input "Data", and an enable input EN;

and a Charge Pump 576 with inputs "Up" and "Down", and including a capacitor C18.

The inputs to the Linear Phase Compensator 554 are the data signal (the single ended signal 562), and the clock signal (the PH0 of the recovered multi-phase clock). The data signal is connected to the data input (Din) of the Programmable Analogue Delay 568, the output of which is the phase aligned signal 564 (the preprocessed data signal). This signal (564) is further connected to the input of the Window Generator 572 the output of which is connected to the enable input "EN" of the Phase Detector 574. The clock input "Ck" of the Phase Detector 574 receives the phase 0 (PH0) of the multi phase clock signal. The outputs of the Phase Detector 574 drive the "Up" and "Down" inputs of the Charge Pump 576. The output of the Charge Pump 576 is an analog control signal, connected to the control input Cin of the Programmable Analogue Delay 568.

The Window Generator 572 detects positive edges on the input data and generates the enable (EN) signal for the Phase Detector 574, of duration guaranteed to contain an edge of the clock to which the data is to be locked.

The Phase Detector 574, uses the enable signal (EN), supplied by the Window Generator 572, to compare the phases of the "Data" and "Ck" signals during the length of the enable signal (EN). The outputs of the phase detector control the Programmable Analogue Delay 568, by means of the Charge Pump 576, which is a control voltage generator, generating a control voltage by charging the capacitor C18 or by other suitable means.

The Programmable Analogue Delay 568 takes the control signal from the phase detector 570 (the control input "Cin") and delays the data signal by a programmable amount to align it with the clock signal. The output of the Programmable Analogue Delay 568 is thus the phase aligned signal 564.

This Linear Phase Compensator 554 works robustly in the presence of ISI (Inter-Symbol Interference) and jitter and aligns the on-board clock edges with the substantially "ideal" data transition points in the data channels.

Oversampling

The phase aligned (data) signal 564 is a rail-to-rail analog signal that may still contain Inter Symbol Interference (ISI), distortion, noise, and other impairments. In the Oversampling and Reclocking block 556 (FIG. 30), this signal is effectively sampled at a rate 12 times the clock rate of the signal, i.e. during each bit period the data signal is sampled at 12 evenly spaced intervals, to generate 12 digital samples. Because of the high speed of the signal (typically 1.65 Gbs) it is not practical to actually sample the signal with a 12-times higher clock signal. Instead, the same effect is achieved by sampling the signal with 12 evenly spaced phases of the clock signal, each clock phase generating a digital sample, thus 12 samples representing one data bit. In the present embodiment, 24 clock phases (PH0 to PH23 of the multiphase clock signal) are used to capture not only one data bit in 12 sampling phases, but also the trailing half of the previous data bit in 6 sampling phases and the leading half of the next data bit in another 6 sampling phases (conventional digital register logic and pipelining is used to thus look into the "future").

Because of the oversampling, the term "bit" might become ambiguous. The terms "bit", "primary data bit", and "bit-clock period" will be used to denote the nominal 1.6 Gbs data bits and their period; "sample" and "sample bit" to denote one of the 12 samples per bit-clock period; and "24-sample word" to denote the ensemble of 24 samples, as described.

Thus, the Oversampling and Reclocking block 556 generates 24 samples (a "24-sample word") at the bit-clock rate, by outputting the 24-sample digital samples signal 566.

Figure 32:
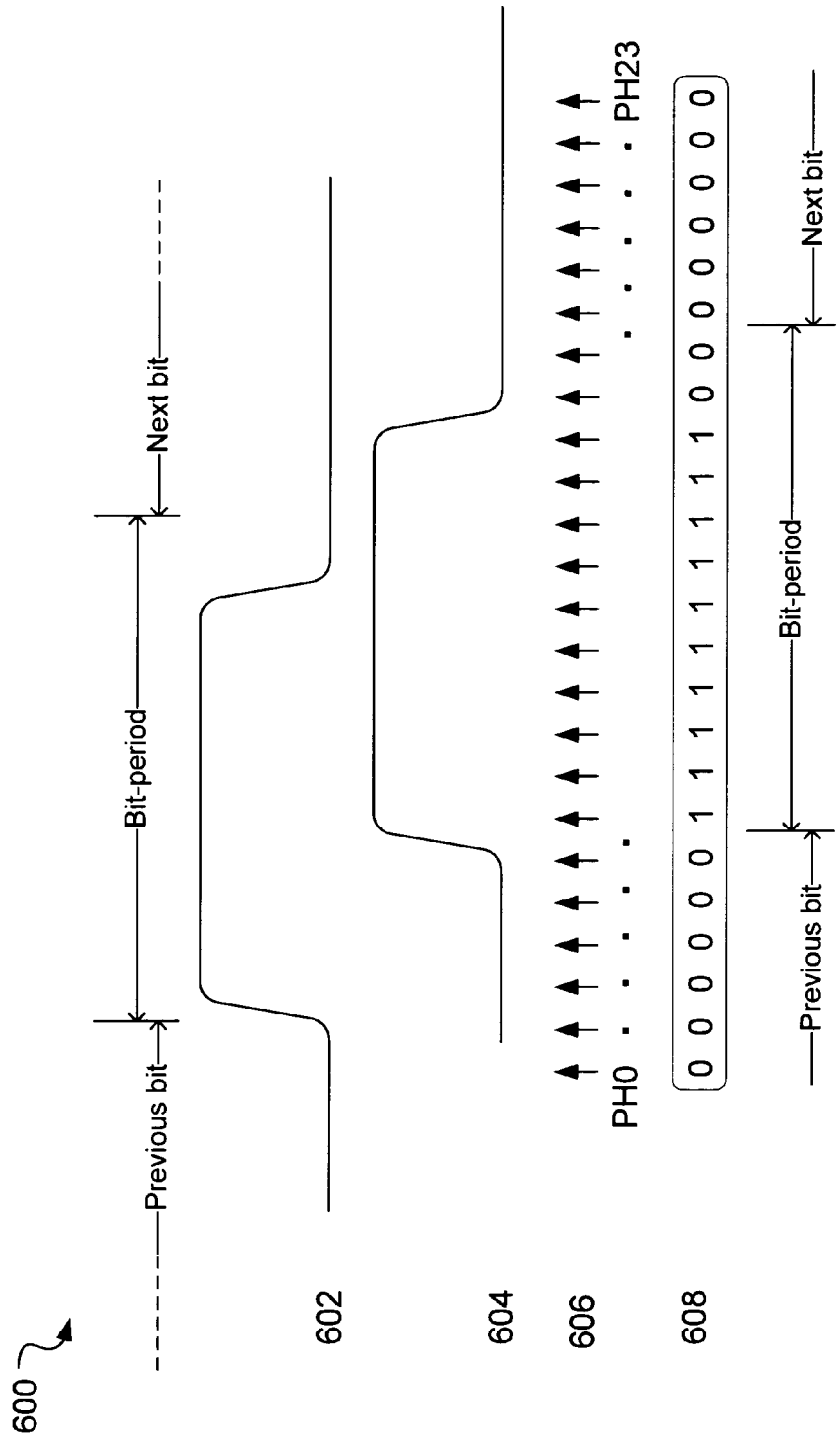
FIG. 32 illustrates data phase shifting in the Programmable Analogue Delay 568 of FIG. 31, and oversampling in the Oversampling and Reclocking block 556 of FIG. 30.

FIG. 32 illustrates data phase shifting in the Programmable Analogue Delay 568 of FIG. 31, and oversampling in the Oversampling and Reclocking block 556 of FIG. 30. The diagram 600 in FIG. 32 shows an exemplary waveform 602, a delayed waveform 604, a set of sampling clocks 606, a 24-sample word 608, and a scale indicating a bit-period and previous and next bits.

The exemplary waveform 602 represents an example of the single ended signal 562 (FIG. 30) before phase alignment. Note that the signal appears to be a "1" bit with some distortion (noise or ISI) near the one-zero transition, and it is not aligned with the indicated bit-period. The delayed waveform 604 represents the corresponding phase aligned signal 564 after delay through the Linear Phase Compensator 554. Note that the signal is now approximately aligned with the indicated bit-period, but still includes the distortion. This signal is sampled with the 24 phases of the multiphase clock (PH0 to PH23) as indicated by the set of sampling clocks 606 in the Oversampling and Reclocking block 556, resulting in the 24-sample word 608. The 24-sample word 608 includes six samples (000000) from the previous bit period, twelve samples (111111111100) from the Bit-period and another six samples (000000) from the next bit period.

The 24-sample word 608 is output by the Oversampling and Reclocking block 556 as the 24-sample digital samples signal 566 to the Training Function 558.

Eye Quality Determination

The Training Function 558 (FIG. 30) may provide feedback to the Real Time Test Equipment 542 by evaluating the 24-sample digital samples signal 566, which is a stream of 24-sample words such as illustrated in the 24-sample word 608 of FIG. 32. In this way, the Time Domain Test Equipment 542 may be able to tune the adjustable parameters of the channel boost circuit 100 that is presently being calibrated.

The approach taken in the preferred embodiment of the invention is to systematically go through each of the possible permutations of settings of these parameters; observe and measure the quality of the preprocessed signal (the single ended signal 562 that is oversampled as the 24-sample digital samples signal 566) to obtain a quality measure in the form of a "Quality Number"; and retain the settings that yield the best Quality Number in the parameter memory 102 (FIG. 30).

The deskew and equalizer settings may include (actual values in the example embodiment are shown in brackets, based on the bit oversampling factor of 12):

settings of differential delay compensation (7 values, ranging from about 0 to approximately 360 psec);

insertion of the differential delay in the positive or negative polarity signal (positive or negative); and up to 32 frequency response (cable) equalization settings.

Note that the phase offset between the bit-clock and the data-bit is not of interest here, being independently and automatically adjusted by the Linear Phase Compensator 554. The phase aligned data signal 564 will be fairly accurate in phase, that is centering the nominal bit-period on the middle twelve samples of the 24-sample word, provided the deskew and equalizer are within the vicinity of the optimal settings. If they are not, it does not matter if the data/clock phase alignment is suboptimal.

Implementation of the Training Function 558

Although the Real Time Calibration method could be conducted under step by step control through the PC as described above (FIG. 30), it may be advantageous to allow the Training Function 558 to bypass the Parameter Memory 102 and perform repetitive steps of setting trial values of the parameters (126 and 128) autonomously, and only report the final result for each channel to the PC which may then load the "best" settings into the Parameter Memory 102.

Alternatively, the PC may be used only to start the Real Time Calibration, the final results (the "best setting") being autonomously loaded into the parameter memory without intervention by the PC.

Figure 33:
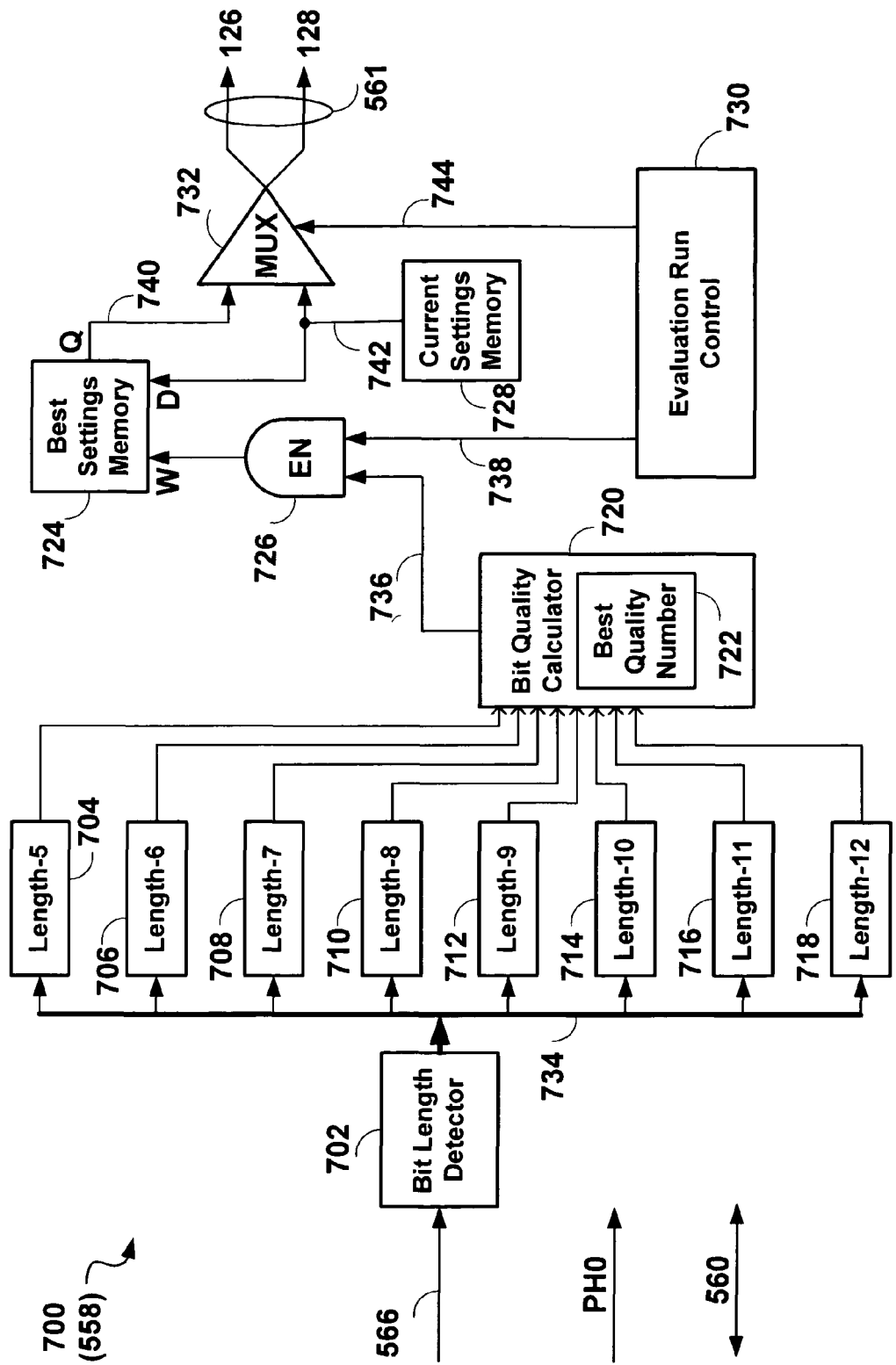
FIG. 33 shows a simplified block diagram of the preferred embodiment 700 of the Training Function 558 of FIG. 30.

FIG. 33 shows a simplified block diagram of the preferred embodiment 700 of the Training Function 558. The Training Function 700 includes the following blocks:

a Bit Length Detection block 702;

a set of Length-i counters (i=5 to 12), designated by reference numerals 704 to 718;

a Bit Quality Calculator 720 including a Best Quality Number register 722;

a Best Settings Memory 724 having inputs D and W, and an output Q;

a write-enable gate EN 726;

a Current Settings Memory 728;

an Evaluation Run Control block 730; and a selector MUX 732.

The inputs to the Training Function 700 are the 24-sample digital samples signal 566 that is connected to the Bit Length Detection block 702, and the clock (PH0 of the multiphase clock signal). The output of the Bit Length Detection block 702 is a set 734 of count-enable signals, one count-enable signal connected to each of the Length-i counters 704 to 718. The outputs of each of the Length-i counters 704 to 718 provide inputs to the Bit Quality Calculator 720. The Bit Quality Calculator 720 in turn is connected with a "save best settings enable" control signal 736 to the write-enable gate EN 726. The other input of the write-enable gate EN 726 receives an "end-of-calculation" signal 738 from the Evaluation Run Control block 730. The output of the write-enable gate EN 726 is connected to the write control input "W" of the Best Settings Memory 724. The output Q of the Best Settings Memory 724 sends a multi-bit "best settings" signal 740 which is a digital control word indicative of deskew and equalization settings values. The "best settings" signal 740 is connected to one of the two data inputs of the selector MUX 732 whose other data input receives a similar data word, i.e. a "current settings" signal 742 from the Current Settings Memory 728. The "current settings" signal 742 is also applied to the data input D of the Best Settings Memory 724. The outputs of the Evaluation Run Control block 730 include the "end-of-calculation" signal 738 connected to the write-enable gate EN 726 (already mentioned above), and an "end-of-search" signal 744 connected to the select input of the selector MUX 732. The output of the selector MUX 732 (outputting either the "current settings" 742 or the "best settings" 740 depending on the state of the "end-of-search" signal 744) is split into the deskew parameters 126 and the equalization parameters 128 that are sent out on the parameter links 561, see FIG. 30.

The Training Function 700 is further connected by the control link 560 and the control interface 546 (FIG. 30) to the PC in the Real Time Test Equipment 542 (FIG. 29), for the purpose of starting the elevation run control 730 and reporting the "best settings" signal 740 or the "current settings" signal 742 as may be required by the control program in the PC.

Figure 34:
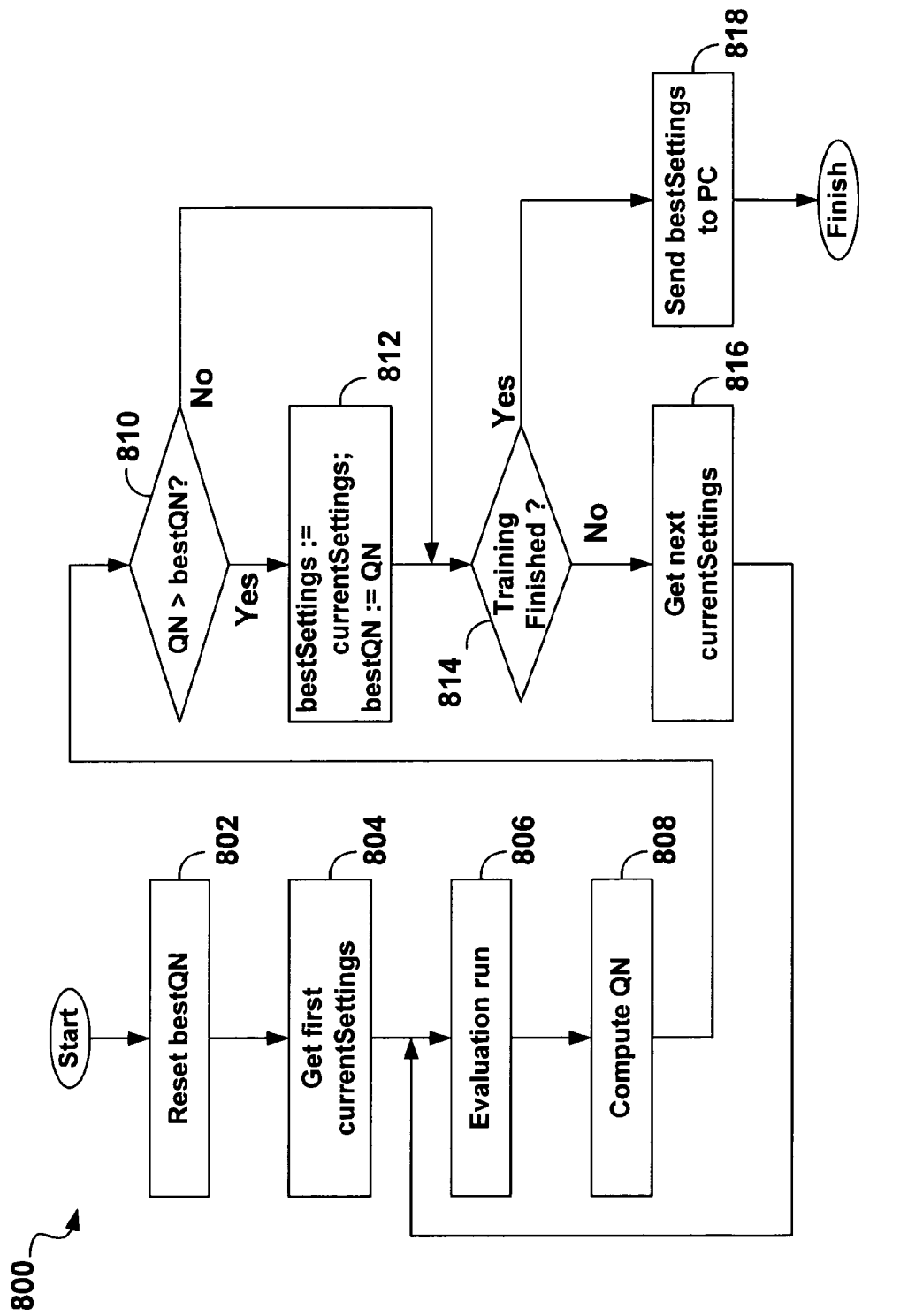
FIG. 34 shows a high level flow chart of a training run method 800, depicting the operation of the Training Function 558 of FIG. 30.

The overall operation of the Training Function 700 is controlled by the Evaluation Run Control block 730 which, briefly noted, allows the test to run (an "evaluation run") for a specific period of time (corresponding to a specific number N of received data bits) at each of the predefined sets of parameter settings ("current settings"). Each "evaluation run" of the Training Function 700 runs for a duration equivalent to the N primary data bits (an observation period of "N" bits). A "training run" is the sequence of "evaluation runs", each with a different set of "current settings". The purpose of the "Training Function" is to select the permutation of deskew and equalization settings that gives the "best" (highest) Quality Number, and report these settings to the PC over the control link 560 and the control bus 538, as the calibration result for subsequent loading into the parameter memory 102 by the PC. The Training Function may be invoked (started) by a trigger received from the PC over the control link 560. The operation of the "training run" is further described with the help of a flow chart (FIG. 34 below). The functions of the individual blocks of the Training Function 700 shown in FIG. 33 are briefly explained first.

The Bit Length Detection block 702 receives the 24-sample digital samples signal 234 indicating an oversampled received bit (nominally in the middle 12 samples) and samples of adjacent bits, as described above (FIG. 32), and treating it as a digital word of 24 bits (samples); and detects within each such digital word clusters (runs) of adjacent "1s", bracketed by at least one "0" sample at each end. For example the 24-sample word 608 of FIG. 32 "000000111111111100000000" contains a run of ten "1s" samples. The function of the Bit Length Detection block 702 is to classify each arriving 24-sample word 608 by the lengths of the "1s" run (if any) contained in it and increment the corresponding Length-i counter (704 to 718) accordingly. In the example above the Length-10 counter 714 would be incremented.

Note that there are no counters for lengths below 5 or above 15; these lengths are ignored.

The Length-i counters 704 to 718 thus, record and accumulate the number of occurrences of the corresponding run lengths of "1s" in the stream of 24-sample words in the digital samples signal 234, for each evaluation run.

At the end of each evaluation run, the outputs of the Length-i counters 704 to 718 are fed into the Bit Quality Calculator 720, which computes a Quality Number from the ensemble of accumulated length counts according to a heuristic algorithm. Recall that the purpose of "training" the analog front end is to find the "best settings", that is the settings which results in the most appropriate equalization setting (see the Equalization block 206, FIGS. 2 and 22) and which "optimally" removes any differential skew that might exist by adjusting the Differential Deskew 204. An ideal data signal of alternating "1s" and "0s", that was perfectly phase aligned (see Linear Phase Compensator 210, FIG. 23) would after oversampling result in successive 24-sample words of:

000000111111111111000000
111111000000000000111111 . . .

and result in high counts for the run length 12. The runs of length 6 would not be counted, as only contiguous runs of "1" samples with "0" samples on either side of the run are counted. Thus, the six samples located at the end of the window are not counted—they are part of a bit that was or will be counted in the previous or subsequent bit period respectively.

If the signal shape was perfect (twelve "1" samples per bit) but phase alignment was skewed by one or a few samples, the result would be that the same high counts for the run length 12 would be recorded. If the signal was distorted (imperfect differential deskewing, high ISI, or non-optimal equalization setting), other lengths may be recorded.

At the end of an evaluation run the Quality Number is computed by the Bit Quality Calculator 720, by multiplying the contents of each Length-i counter 704 to 718, with a length specific weight, and summing the products:

for i=5 to 12, Bit Quality Number =SUM(Length.sub.i count×Weight.sub.i)

The following set of weights have been used in the embodiment of the invention, but other weights may also give good results:
Weight.sub.5=−2
Weight.sub.6=−2
Weight.sub.7=−1
Weight.sub.8=1
Weight.sub.9=1
Weight.sub.10=2
Weight.sub.11=4
Weight.sub.12=8

The selected weight numbers suggest, as may be expected, that a run length of 12 being indicative of a perfect pulse has the highest weight, while run lengths below 8 may be indicative of severe distortion, resulting in a negative contribution to the Bit Quality Number.

The Bit Quality Number from each evaluation run with a particular set of settings (the current settings) is compared with the currently stored Best Quality Number (in the register 722). If it exceeds the previous Best Quality Number, the Best Quality Number 722 is updated with the higher number, and the current settings is saved in the Best Settings Memory 724. This functionality is indicated in FIG. 33 where the output of the Bit Quality Calculator 720 (the "save best settings enable" control signal 736) is ANDed with the "end-of-calculation" signal 738 from the Evaluation Run Control block 730 in the write-enable gate EN 726 to generate a write signal ("W" input) for the Best Settings Memory 724 while at the same time, the current settings (the "current settings" signal 742 from the Current Settings Memory 728) is presented at the data input "D" of the Best Settings Memory 724, causing it to store the current settings.

If on the other hand with a given current settings, a Bit Quality Number is obtained that is not higher than the Best Quality Number already stored in the register 722, the write-enable gate EN 726 is not enabled, and the current settings is not stored in the Best Settings Memory 724.

The Evaluation Run Control block 730, for each evaluation run, chooses a current settings permutation and stores it in the Current Settings Memory 728 for the duration of the each evaluation run. During each evaluation run, the "current settings" 742 are fed through the selector MUX 732 to provide the deskew and equalization parameters (126 and 128 over the parameter links 561) to the Differential Deskew and Equalization blocks (110 and 112 respectively).

After all permutations are exhausted, that is at the end of the "training run", the "end-of-search" signal 744 is asserted by the Evaluation Run Control block 730 which then causes the selector MUX 732 to send the "best settings" into the deskew and equalization parameter signals (126 and 128 over the parameter links 561).

The number of received data bits N for which each evaluation run is held, may be determined under control of the PC, which also determines the data pattern to be sent by the Data Pattern Generator during calibration. The number N may range from about 256 to 10000 depending on the length of the cable and the nature of the data pattern.

Due to present technology limitations, the blocks 702 to 718 of the Training Function circuit 700 are duplicated (duplication not shown in FIG. 33). Each of these blocks operates at half speed, processing the 24-sample digital samples signal 566 for alternate received data bits with the Bit Quality Number simply computed at the end of each evaluation run from the contents of the Length-i counters of both sets of counters. Thus in effect, a total of 2N bits are processed for each evaluation run.

Alternative implementations of the Training Function 558 are also envisaged which may differ in the details from the embodiment 700. For example, the number of clock phases for oversampling the received data signal may be less or more than 24, and the window of oversampling may include at least one bit period (the middle samples), but be narrower or wider with respect to adjacent bits. Instead of counting run lengths of "1" samples, run lengths of "0" samples may be accumulated, and different weightings may be applied to the run length counts. These and other variations that may occur to skilled persons are included in the scope of the invention.

FIG. 34 shows a high level flow chart of a training run 800, depicting the operation of the Training Function 558 (corresponding to the embodiment 700 of FIG. 33). The training run 800 is a finite process that may be invoked to run from "Start" to "Finish" through a number of steps that are either actions or logic decisions:

802: "Reset the best Quality Number (bestQN)";
804: "Get the first current Settings";
806: "Do an Evaluation run";
808: "Compute a Quality Number (QN)";
810: "Is the computed Quality Number greater than the best Quality Number (QN>bestQN)?", Yes or No;
812: "Set the best Settings to the current Settings, and set the best Quality Number to the computed Quality Number (bestSettings:=currentSettings; bestQN:=QN);
814: "Is Training Finished ?", Yes or No;
816: "Get the next current Settings"; and
818: "Send the best Settings to the PC".

The current Settings refers to the parameters that may be controlled, that is the differential deskew and equalization parameters 126 and 128, FIG. 30. At the start of the training run, a stored variable "best Quality Number" (bestQN) is initialized ("reset bestQN" 802) and a first set of the parameters is created ("Get first currentSettings" 804). This is followed by a loop over the steps 806 ("Do an Evaluation run") to 816 ("Get the next current Settings") which is executed until all settings (permutations of the parameters) have been exhausted and training is finished, as indicated by the step 814 ("Is Training Finished ?"). The training run 800 ends with the step 818 ("Send the best Settings to the PC").

Within the loop (steps 806 to 816), the step 806 ("Do Evaluation run") is followed by the step 808 ("Compute a Quality Number") which computes the Quality Number from the results of the evaluation run. This step 808 may be performed by the Bit Quality Calculator 720 of FIG. 33, for example. In the next step 810 "Is the computed Quality Number greater than the best Quality", a comparison is made between the last computed quality number (QN) and the stored "best Quality Number" (bestQN). If QN is greater than bestQN then the current settings is assigned and stored in a variable "best Settings", and also the stored variable "bestQN" is updated with the last computed QN (the step 812). In the step 814 "Is Training finished?", it is determined if all valid permutations of the parameters have been evaluated. If training is NOT finished, the next permutation is created in the step 816 "Get next current settings", and the loop continues with the evaluation run (step 806). If there are no more permutations to evaluate, training is finished ("Yes" in the step 814 "Is Training finished ?"), the current settings are abandoned, and the best Settings are sent to the PC in the step 818, before the training run 800 exits.

Figure 35:
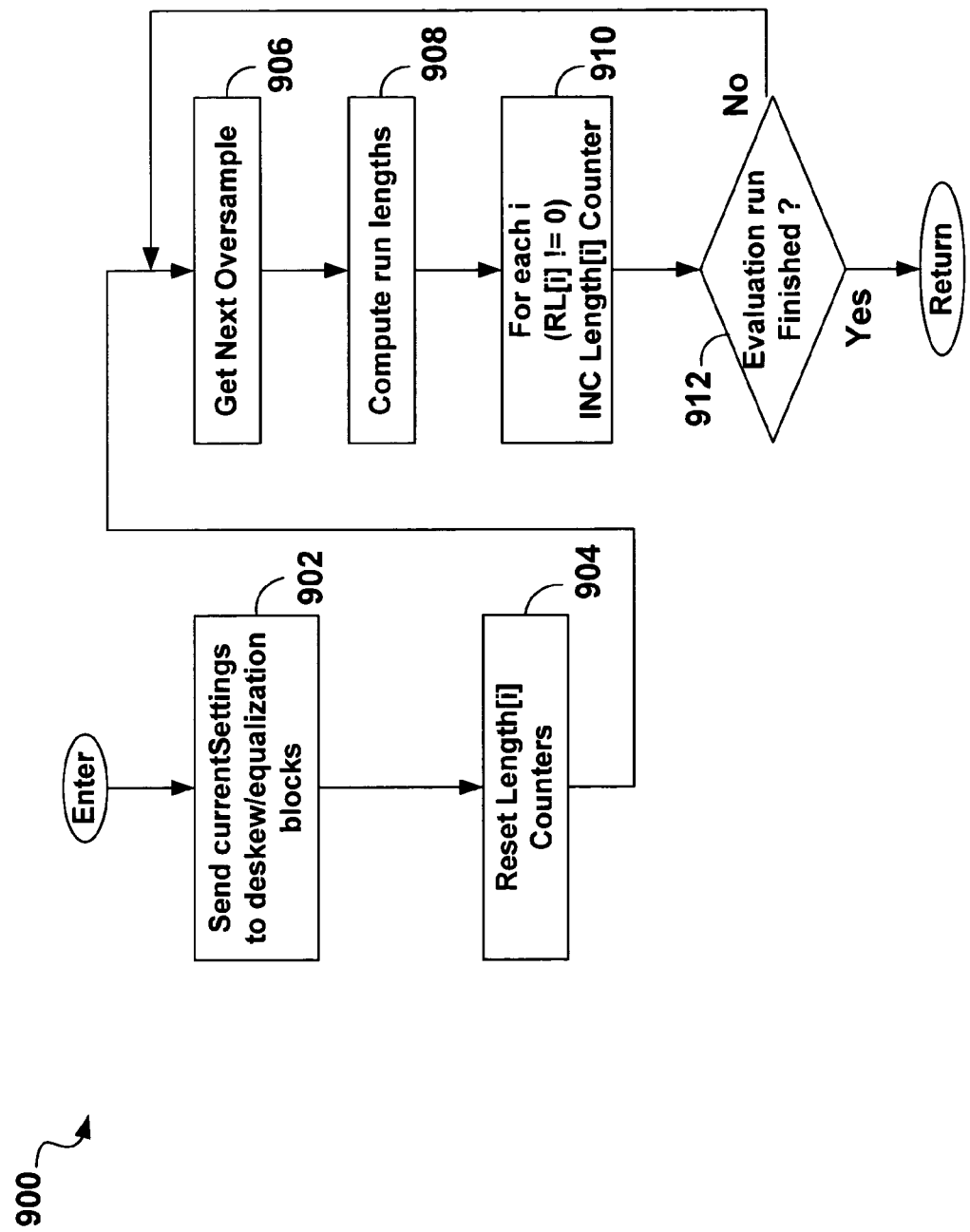
FIG. 35 shows a flow chart of an exemplary evaluation run method 900 further detailing the step 806 of the training run method 800 of FIG. 34.

The Evaluation run of the step 806 is further detailed in a subroutine flow chart of an exemplary evaluation run method 900 that is shown in FIG. 35. The evaluation run 900 runs from "Enter" to "Return" through a number of steps that are either actions or logic decisions: 902: "Send the current Settings to the differential deskew and equalization blocks";
904: "Reset the Length[i] counters";
906: "Get the next oversampled bit";
908: "Compute the run lengths (RL)";
910: "for each i for which RL[i] is not 0, increment the Length[i] counter"; and
912: "Is Evaluation run finished ?".

The current settings (see the flow chart of the "Training run" 800) are sent to the differential deskew block 110 and the equalization block 112 (over the parameter links 561) in the step 902, and remain constant for the duration of the evaluation run 900. The run is initialized by resetting all Length counters to 0 (zero) in the step 904. These counters correspond to the Length counters 704 to 718 of the embodiment 700 (FIG. 33). Only counters for i=5 to 15 (selected run length 5 to 15) are provided in the present embodiment of the invention, but other ranges may be used.

The next oversampled data bit and adjacent samples is obtained in the step 906. This "Oversample" corresponds to the 24-sample digital samples signal 566 of the earlier description (FIG. 30). In the next step 908 ("Compute run lengths"), the received oversample is analyzed to determine run lengths of "1s" as described earlier (the Bit Length Detection 702, FIG. 33). This step produces an indication for each run length (only run lengths of 5 to 15 are covered) that is found in the oversample. In the next step 910 ("for each i for which RL[i] is not 0, increment the Length[i] counter"), each Length[i] counter for which a run length was indicated in the previous step is incremented.

The end of the evaluation run is indicated in the step 912 "Is Evaluation run finished?" if a sufficient number of data bits (oversamples) have been processed, in other words, a simple loop count is maintained, the evaluation run exits, that is it returns to the next step 808 in the training run 800 where the contents of the Length counters are converted into the Quality Number.

Alternative implementations of the Real Time Cable Calibration method are also envisaged which may differ in the details from the embodiment 540 with the embodiment 700 of the training function. For example, some functions of the training function such as the bit quality calculation could be performed in the PC instead of within the expanded boost device 544, which would require the contents of the Length-i counters (704 to 718) to be periodically communicated from the expanded boost device 544 to the PC over the control bus. These and other variations that may occur to skilled persons are included in the scope of the invention.

Figure 36:
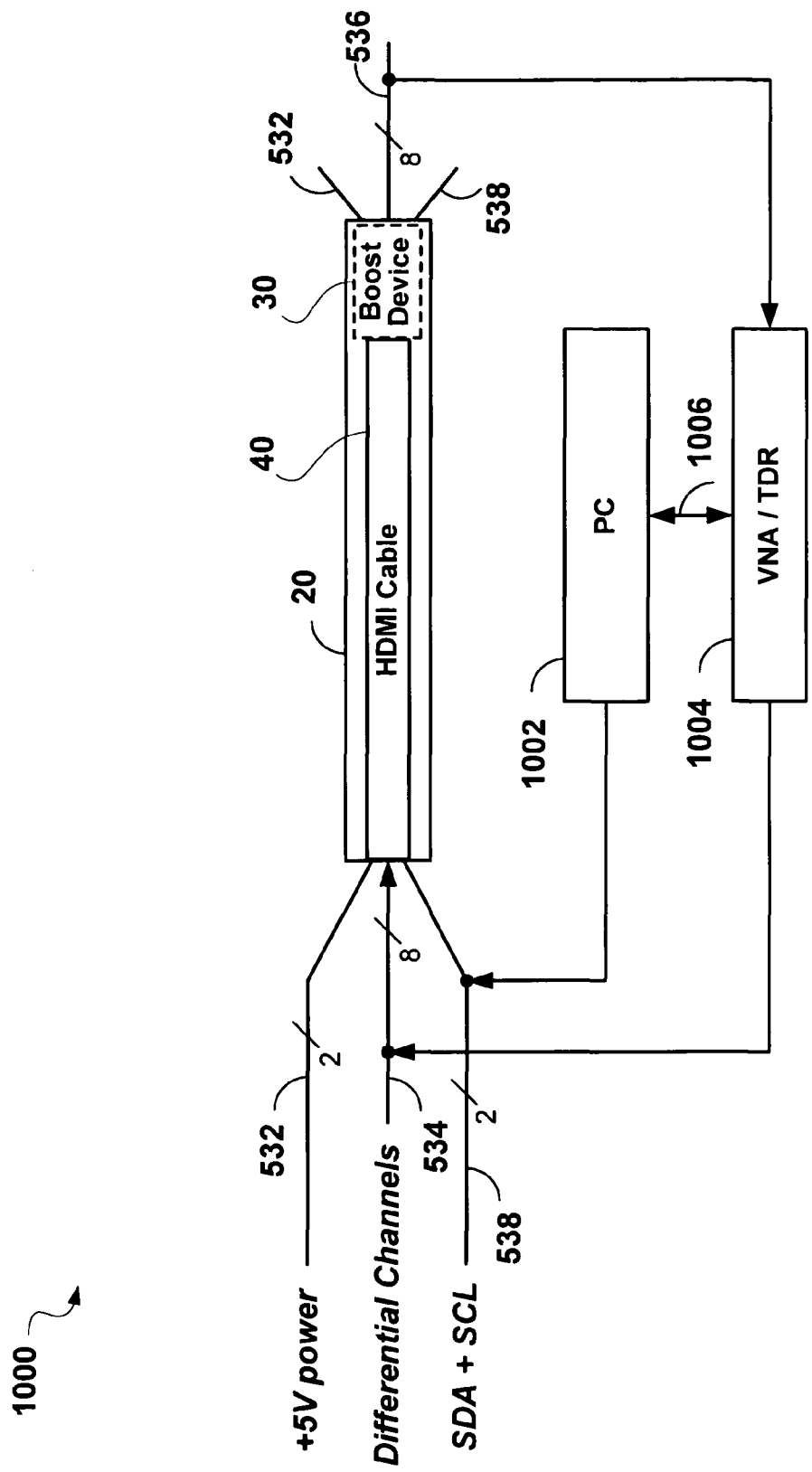
FIG. 36 shows a generic test set up 1000 for Frequency Domain and Time Domain Calibration methods.

FIG. 36 shows a generic test set up 1000 for the Frequency Domain and the Time Domain Calibration methods. The generic test set up 1000 includes the improved HDMI (High-Definition Multi-Media Interface) cable 20 (see FIG. 28), a PC 1002, and a test equipment 1004 that is either a VNA (Vector Network Analyzer) or a TDR (Time Domain Reflectometer). The PC 1002 is attached to the control bus (SDA+SCL) 538 of the cable. The test equipment 1004 is connected to the differential channels at both ends of the cable, that is the four differential channel inputs (8 wires) 534 and the four differential channel outputs (8 wires) 536.

The test equipment 1004 is controlled by the PC 1002 over a standard PC-interface 1006 to send stimulus signals into the cable inputs (534) and to receive measurement results from the cable outputs (536). The results are passed back to the PC over the standard PC-interface 1006 for evaluation.

It is possible with the test equipment 1004 being either a VNA or a TDR to obtain both frequency attenuation and delay characteristics of the cable, although well-known mathematical transformations are required to convert between the frequency and time domain results obtained with the VNA or the TDR respectively.

Figure 37:
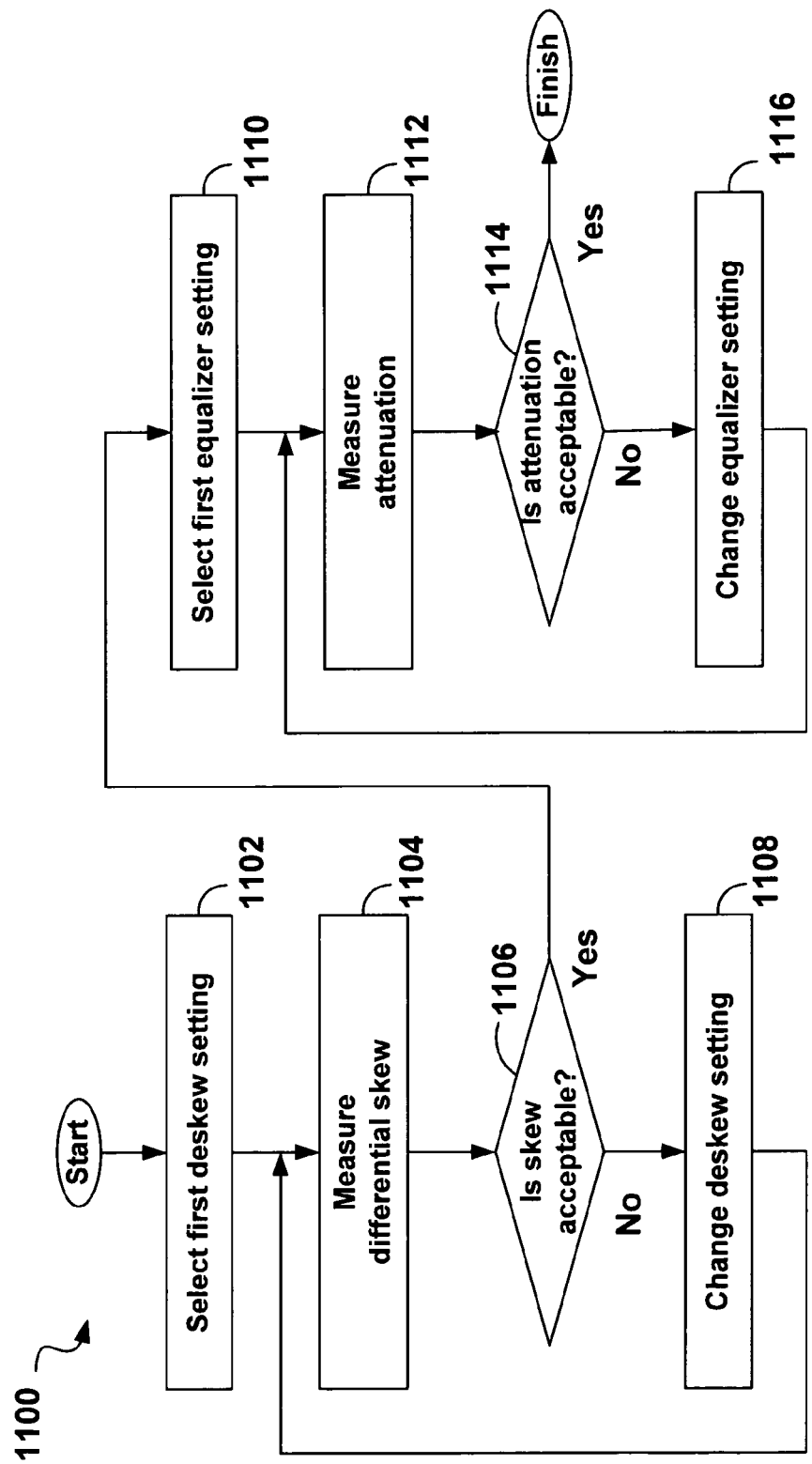
FIG. 37 shows a simplified high level flow chart of an calibration method 1100 that may be used with the generic test set up 1000 of FIG. 36 in calibrating the Boost Device 30 in the improved HDMI cable 20 of FIG. 4.

FIG. 37 shows a simplified high level flow chart of a calibration method 1100 that may be used with the generic test set up 1000 in calibrating the Boost Device 30 in the improved HDMI cable 20, including a number of steps:
1102: "Select a first deskew parameter setting";
1104: "Measure differential skew";

1106: "Is skew acceptable?" (YES: goto step 1110, NO: goto step 1108);
1108: "Change deskew parameter setting";
1110: "Select a first equalizer parameter setting";
1112: "Measure attenuation";
1114: "Is attenuation acceptable?" (YES: goto finish, NO: goto step 1116); and
1116: "Change equalizer parameter setting".

The calibration method 1100 includes two loops, a first loop (the steps 1104 to 1108) for setting the deskew parameter, and a second loop (the steps 1112 to 1116) for setting the equalizer parameter. The calibration method starts with an (arbitrary) first deskew parameter setting (the step 1102), in which the PC 1002 loads a first deskew setting into the parameter memory 102 of the boost device 30 (FIG. 36).

In the step 1104, the end-to-end differential skew of the differential channel that is being calibrated (from the input 534 to the output 536 through the improved HDMI cable 20 including the boost device 30) is measured by the test equipment 1004 and reported to the PC 1002.

In the step 1106, the measured result is processed in the PC, and compared with a skew threshold set for the test, and with previous test results. If the result proves to be acceptable, below the skew threshold (and ideally minimized), the calibration method proceeds to the step 1110, otherwise the deskew parameter setting is changed (in the step 1108), and the calibration method loops back to the step 1104.

In the unlikely event that an acceptable differential skew measurement is not found after all deskew settings have been tried, the cable is deemed to be defective.

In the step 1110, the calibration method continues with an (arbitrary) first equalizer parameter setting, in which the PC 1002 loads a first equalizer setting into the parameter memory 102 of the boost device 30 (FIG. 36). It may also be desirable to set the same equalizer values for all cable from the same lot, in that all cable in the same lot will have similar characteristics, thus saving time in production.

In the step 1112, the end-to-end attenuation of the differential channel that is being calibrated (from the input 534 to the output 536 through the improved HDMI cable 20 including the boost device 30) is measured by the test equipment 1004 and reported to the PC 1002. In order to ensure a near optimal setting of the equalization parameters, it is necessary to measure attenuation at frequencies up to about the frequency of the fastest signal to be transmitted in the differential channel to up to about a frequency of 2/(bit time)–4(bit time) of the data.

In the step 1114, the measured result (the measured gain figures for all frequencies in the range of interest) is processed in the PC 1002, and compared with a requirement of being within a predetermined range, that is close to 0 db or greater (a minimum requirement of the HDMI specification), and less than a predetermined limit. If the result proves to be acceptable, i.e. within the predetermined range, the calibration method finishes, otherwise the equalizer parameter setting is changed (in the step 1116), and the calibration method loops back to the step 1112.

In the unlikely event that an acceptable attenuation (gain) measurement is not found after all equalizer settings have been tried, the cable is deemed to be defective.

This calibration method has to be successfully run for each of the four differential channels of the cable, after which the cable is considered to be calibrated and meeting HDMI specifications.

Figure 38:
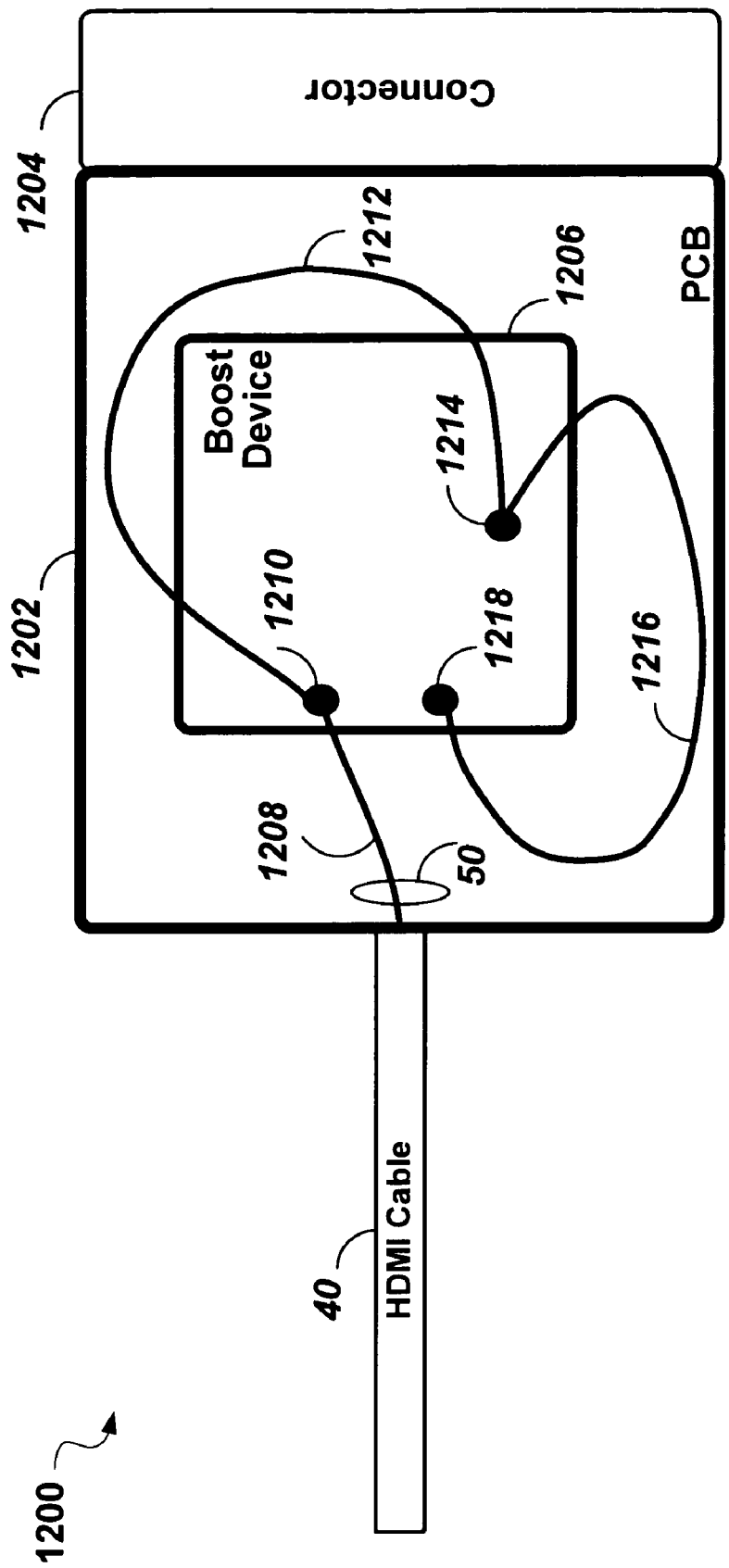
FIG. 38 shows an alternative embodiment of the invention, in the form of a modified improved HDMI cable 1200.

FIG. 38 shows an alternative embodiment of the invention, in the form of a modified improved HDMI cable 1200. The modified improved HDMI cable 1200 comprises the basic HDMI cable 40 (unchanged from its use in the improved HDMI cable 20); a small printed circuit board (PCB) 1202; a connector 1204; and a modified boost device 1206 mounted on the PCB 1202.

The PCB 1202 provides physical support for the modified boost device 1206, as well as connectivity (PCB tracks) to the conductors of the basic HDMI cable.

The modified boost device 1206 is based on the boost device 30, with additional inputs provided.

It may be recalled that the boost device 30 provides a number of functions, including the differential deskew circuit 110 (FIG. 5) for adjusting an existing time skew of the polarities of differential signals propagating through the basic HDMI cable 40.

In the boost device 30, each of the polarities of each of the differential signals (the HDMI inputs 50, FIG. 6) is directly connected to the boost device 30.

In the modified improved HDMI cable 1200, each of the polarities of each of the differential signals is connected to two or more (preferably three) selectable inputs of the modified boost device 1206 through tracks of the PCB 1202 as shown in FIG. 38. For clarity, only the positive polarity of an example one of the HDMI inputs 50, connected to three inputs of the modified boost device 1206 is illustrated:

a single polarity signal lead 1208 is directly, or via a short PCB track, connected from the basic cable 40 to a first input terminal 1210 of the modified boost device 1206;

the first input terminal 1210 is connected through a first PCB track 1212 to a second input terminal 1214 of the modified boost device 1206; and the second input terminal 1214 is connected through a second PCB track 1216 to a third input terminal 1218 of the modified boost device 1206.

The negative polarity of the example one of the HDMI inputs 50, and both polarities of the other HDMI inputs 50 as well, are routed similarly through short PCB tracks, each to a separate set of three terminals of the modified boost device 1206.

The PCB tracks 1212 and 1216 (shown symbolically and not to scale) are designed to each provide a small delay of the signal arriving from the basic HDMI cable 40. The modified boost device 1206 thus receives three copies of the same signal, each delayed by a small amount (preferably 100 picoseconds, corresponding to approximately 2 cm of PCB track), at the three input terminals 1210, 1214, and 1218. In the modified boost device 1206 any one of the three signals from any of the input terminals can be independently selected for each polarity of each of the differential HDMI inputs. After selection, the signals are processed in the modified boost device 1206 in the same manner as was described for the boost device 30 above.

In this way, deskewing of the differential signals can be achieved by coarse and fine adjustments. The coarse adjustment is done by selecting one or two PCB delays of either polarity for each of the differential signals. The fine adjustment is done by adjusting the adjustable delay 300 of the Differential Deskew circuit 110 (FIG. 7). Thus a wider range of deskewing can be achieved, or conversely, less on-chip circuitry (fewer delay stages 306) need be provided in the modified boost device 1206, compared with the boost device 30.

Figure 39:
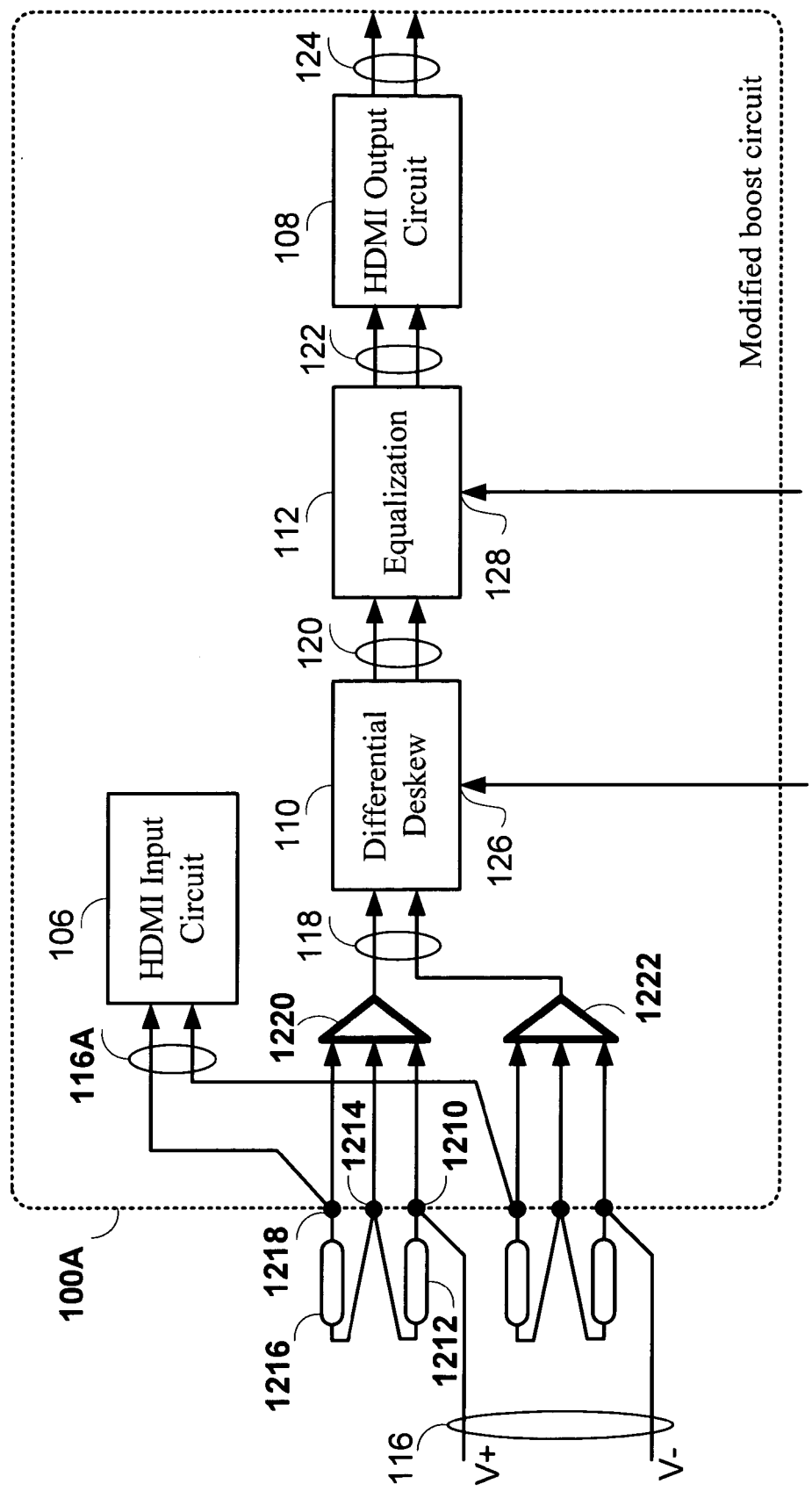
FIG. 39 shows a modified boost circuit 100A of the modified boost device 1206.

FIG. 39 shows a typical (one of four) modified boost circuit 100A of the modified boost device 1206 analogous to the boost circuit 100 of FIGS. 5 and 6, in which corresponding elements are shown with the same reference numerals. The modified boost circuit 100A includes the HDMI Input circuit 106, the Differential Deskew circuit 110, the Equalization circuit 112, and the HDMI Output circuit 108.

Also shown in FIG. 39 are the raw signal input (pair) 116 (see FIG. 6) including positive and negative polarities (V+ and V− respectively), and the PCB tracks (delay elements) 1212 and 1216 that connect the positive polarity (V+) to the three input terminals 1210, 1214, and 1218 of the modified boost device 1206 as shown in FIG. 38.

The negative polarity (V−) of the raw signal input (pair) 116 is similarly connected to three input terminals.

In addition, the modified boost circuit 100A includes two input selector circuits 1220 and 1222. The input to the HDMI Input circuit 106 is a delayed raw input signal (pair) 116A, which is the original raw input signal (pair) 116 after passing sequentially through the delay elements formed by the PCB tracks (1212 and 1216 in the positive polarity signals, and equivalent delays in the negative polarity). The HDMI Input circuit 106 functions as the termination of the HDMI cable. The undelayed positive polarity V+ of the raw input signal 116 and its delayed versions (input terminals 1210, 1214, and 1218) are input to the input selector circuit 1220, and analogously for the negative polarity V− into the input selector circuit 1222. A "selected recovered signal" (pair) 118A, equivalent to the "recovered signal" (pair) 118 of the boost circuit 100 is generated by the input selector circuits 1220 and 1222 and input to the Differential Deskew circuit 110. The "selected recovered signal" (pair) 118A may already be partially deskewed by selecting appropriate settings of the input selector circuits 1220 and 1222.

The remaining circuitry of the modified boost circuit 100A is unchanged from the boost circuit 100: the Differential Deskew circuit 110 outputs the "deskewed signal" (pair) 120 that is input to the Equalization circuit 112; the Equalization circuit 112 outputs the "equalized signal" pair 122 that is input to the HDMI Output circuit 108; and finally, the HDMI Output circuit 108 outputs the "boosted signal" (pair) 124 that is one of the HDMI Outputs 52 (FIG. 5).

As indicated above, the implementation of the Differential Deskew circuit 110 may remain unchanged (e.g. having eight on-chip delay stages 306, see FIG. 8), or it may include fewer (for example three) delay stages 306, thus conserving on-chip area. The control of the input selector circuits 1220 and 1222 may be handled along with the control of the analog selector stage 308 (FIG. 8), to generate a corresponding range of adjustable delay that is a combination of the adjustable delay 300 (FIG. 8) and the delay provided by the selected PCB tracks.

As an example, with two PCB track delays of 100 psec each, and three on-chip delay stages of 25 psec each, a delay range of 0 to 275 psec, in steps of 25 psec may be achieved with the modified boost device 1206. Other combination, more or fewer selectable PC track delays, and more or fewer on-chip delay stages, and longer or shorter delay increments may be readily designed as may be required depending on the type and range (length) of HDMI cable.

Although embodiments of the invention have been described in detail, it will be apparent to one skilled in the art that variations and modifications to the embodiments may be made within the scope of the following claims.

What is claimed is:

1. A cable for connecting a transmitting data source device to a receiving data sink device, and carrying differential data signals, the cable comprising:
   a boost device for boosting at least one of the differential data signals, comprising:
      a differential input circuit for receiving one of the differential data signals from the data source device;
      a processing block having a transfer function for processing the differential data signal received by the differential input circuit and producing a processed signal;
      a differential output circuit for receiving the processed signal, boosting and transmitting a boosted one of the differential data signals to the data sink device, the differential output circuit comprising means for providing electrical power to the processing block; and
      an electronic circuit for obtaining at least some electrical power required to operate the processing block from at least one of the differential data signals.

2. The cable as described in claim 1, wherein the differential data signals are differential High Definition Multi-Media Interface (HDMI) signals, including a plurality of Transition Minimized Differential Signaling (TMDS) encoded data channels and a clock channel.

3. The cable as described in claim 1, wherein the differential output circuit and the processing block are connected in series so as to conduct a current from the data sink device to a common ground.

4. The cable as described in claim 1, wherein the boost device further includes a voltage dropper circuit for reducing an available higher voltage and providing a reduced supply voltage for the differential input circuit.

5. The cable as described in claim 4, wherein the voltage dropper circuit comprises one or more diodes connected in series between the available higher voltage and the reduced supply voltage.

6. The cable as described in claim 4, wherein the voltage dropper circuit includes switched capacitors, the capacitors used for periodically transferring energy from the available higher voltage node to the reduced supply voltage.

7. The cable as described in claim 1, wherein the boost device further includes
   a voltage generator circuit for obtaining a current from the boosted differential data signal to provide electrical power to the processing block.

8. The cable as described in claim 1, wherein the electronic circuit includes a voltage generator circuit for obtaining at least one current from the boosted differential signal to provide electrical power to the differential input circuit.

9. The cable as described in claim 8, wherein the voltage generator circuit includes means for combining the at least one current and adjusting an output voltage of the provided electrical power.

10. The cable as described in claim 1, wherein the electronic circuit comprises a voltage generator circuit for providing the electrical power to the differential input circuit and the processing block.

11. The cable as described in claim 1, wherein the processing block includes an equalization circuit for equalizing a frequency response of the cable.

12. The cable as described in claim 1, wherein the differential output circuit includes means for providing electrical power to the processing block.

13. A boost device for boosting differential data signals sent trough a cable from a transmitting data source device to a receiving data sink device, the boost device comprising:
   a differential input circuit for receiving one of the differential data signals from the data source device;
   a processing block having a transfer function for processing the differential signal received by the differential input circuit and producing a processed signal;
   a differential output circuit for receiving the processed signal, boosting and transmitting a boosted one of the differential data signals to the data sink device, the differential output circuit comprising providing electrical power to the processing block; and an electronic circuit for obtaining at least some electrical power required to operate the processing block from at least one of the differential data signals.

14. The boost device as described in claim 13, wherein the differential output circuit and the processing block are connected in series so as to conduct a current from the data sink device to a common ground.

15. The boost device as described in claim 13, further comprising a voltage dropper circuit for reducing an available higher voltage and providing a reduced supply voltage for the differential input circuit.

16. The boost device as described in claim 15, wherein the voltage dropper circuit comprises one or more diodes connected in series between the available higher voltage and the reduced supply voltage.

17. The boost device as described in claim 15, wherein the voltage dropper circuit includes switched capacitors, the capacitors used for periodically transferring energy from the available higher voltage node to the reduced supply voltage.

18. The boost device as described in claim 13, wherein the boost device further includes
a voltage generator circuit for obtaining a current from the boosted differential signal to provide electrical power to the processing block.

19. The boost device as described in claim 13, wherein the processing block includes an equalization circuit for equalizing a frequency response of the cable.

20. The boost device as described in claim 13, wherein the differential output circuit includes means for providing electrical power to the processing block.

* * * * *